US010469743B2

(12) United States Patent
Okazawa et al.

(10) Patent No.: US 10,469,743 B2
(45) Date of Patent: Nov. 5, 2019

(54) DISPLAY CONTROL APPARATUS, DISPLAY CONTROL METHOD, AND PROGRAM

(71) Applicant: Sony Corporation, Tokyo (JP)

(72) Inventors: Kae Okazawa, Kanagawa (JP); Keiichi Yoshioka, Tokyo (JP)

(73) Assignee: Sony Corporation (JP)

( * ) Notice: Subject to any disclaimer, the term of this patent is extended or adjusted under 35 U.S.C. 154(b) by 354 days.

(21) Appl. No.: 14/888,840

(22) PCT Filed: May 1, 2014

(86) PCT No.: PCT/JP2014/002395
§ 371 (c)(1),
(2) Date: Nov. 3, 2015

(87) PCT Pub. No.: WO2014/181531
PCT Pub. Date: Nov. 13, 2014

(65) Prior Publication Data

US 2016/0080650 A1 Mar. 17, 2016

(30) Foreign Application Priority Data

May 10, 2013 (JP) ................................. 2013-099791

(51) Int. Cl.

| | |
|---|---|
| ***H04N 5/232*** | (2006.01) |
| ***H04N 9/82*** | (2006.01) |
| ***H04N 5/77*** | (2006.01) |
| ***H04N 5/265*** | (2006.01) |
| ***H04N 21/431*** | (2011.01) |

(Continued)

(52) U.S. Cl.
CPC ..... *H04N 5/23238* (2013.01); *H04N 5/23229* (2013.01); *H04N 5/23293* (2013.01); *H04N 5/265* (2013.01); *H04N 5/772* (2013.01); *H04N 9/8205* (2013.01); *H04N 21/4312* (2013.01); *H04N 21/4318* (2013.01); *H04N 21/4325* (2013.01); *H04N 21/47217* (2013.01);
(Continued)

(58) Field of Classification Search
None
See application file for complete search history.

(56) References Cited

U.S. PATENT DOCUMENTS 6,559,846 B1 5/2003 Uyttendaele et al.
8,493,477 B2 * 7/2013 Kubota .................. H04N 5/232 348/240.3

(Continued)

FOREIGN PATENT DOCUMENTS

EP 1672546 A1 6/2006
JP H11-331827 A 11/1999

(Continued)

OTHER PUBLICATIONS

"Wide-angel lens—Wilipedia", Mar. 31, 2013; URL: https://en.wilkipedia.org/w/index.php?title=Wide-angle_lens&oldid=547990727 [retrieved on Nov. 29, 2016].

(Continued)

*Primary Examiner* — Christopher Braniff
(74) *Attorney, Agent, or Firm* — Lerner, David, Littenberg, Krumholz & Mentlik, LLP

(57) ABSTRACT

A display control unit of an illustrative embodiment simultaneously displays a plurality of cut-out images cut out from respective ranges of a wide-angle moving image.

20 Claims, 50 Drawing Sheets

(51) Int. Cl.

| | |
|---|---|
| ***H04N 21/81*** | (2011.01) |
| ***H04N 21/482*** | (2011.01) |
| ***H04N 21/472*** | (2011.01) |
| ***H04N 21/432*** | (2011.01) |
| ***H04N 5/907*** | (2006.01) |

(52) U.S. Cl.
CPC ......... *H04N 21/482* (2013.01); *H04N 21/816* (2013.01); *H04N 5/907* (2013.01)

(56) References Cited

U.S. PATENT DOCUMENTS

2006/0256131 A1 11/2006 Trepess
2009/0268079 A1* 10/2009 Motomura ......... H04N 5/23212 348/347
2010/0002070 A1* 1/2010 Ahiska ............. G08B 13/19691 348/36
2010/0262911 A1 10/2010 Kaplan et al.
2010/0262912 A1 10/2010 Cha
2010/0277620 A1* 11/2010 Iijima ................ H04N 5/23232 348/240.1
2013/0155100 A1* 6/2013 Sang ...................... H04N 1/212 345/619
2013/0251335 A1 9/2013 Cha
2013/0259443 A1 10/2013 Cha

FOREIGN PATENT DOCUMENTS

JP 2010034812 A 2/2010
JP 2012129689 A 7/2012
WO 2009-028768 A1 3/2009
WO 2009097449 A1 8/2009

OTHER PUBLICATIONS

"Wide-angel lens—Wilipedia", Nov. 5, 2016; URL: https://en.wilkipedia.org/wiki/Wide-angle_lens [retrieved on Nov. 29, 2016].
EP Office Action for EP14726211.7 dated Dec. 5, 2016.
Japanese Office Action for Application No. 2013-099791, dated Mar. 14, 2017. (Machine generated translation is attached).
European Office Action for Application No. 14726211.7, dated Jun. 20, 2017.
International Search Report from International Publication No. PCT/JP2014/002395 dated Jul. 25, 2014.

* cited by examiner

FIG. 11

CLIP DATA

1. WIDE ANGLE OF VIEW MOVING IMAGE (10 MINUTES)

2. AUDIO

3. SENSOR DATA
   - PHOTOGRAPHING LOCATION
   - ACCELERATION/ANGULAR VELOCITY

4. METADATA
   - CLIP NAME
   - PHOTOGRAPH DATE AND TIME
   - EVENT ID
   - EVENT NAME
   - PERSON ID
   - PERSON LOCATION

5. THUMBNAIL (STILL IMAGE/MOVING IMAGE)

11

301

302

DISPLAY CONTROL APPARATUS, DISPLAY CONTROL METHOD, AND PROGRAM

TECHNICAL FIELD

The present technology relates to a display control apparatus, a display control method, and a program, and more particularly, to a display control apparatus, a display control method, and a program allowing an image having a wide angle of view to be effectively viewed.

CROSS-REFERENCE TO RELATED APPLICATIONS

This application is a national phase entry under 35 U.S.C. § 371 of International Application No. PCT/JP2014/002395 filed May 1, 2014, published on Nov. 13, 2014 as WO 2014/181531 A1, which claims the benefit of Japanese Priority Patent Application JP 2013-099791, filed in the Japanese Patent Office on May 10, 2013, the entire contents of which are incorporated herein by reference.

BACKGROUND ART

Recently, various digital cameras having a panoramic photographing function built therein are available in the market. The panoramic photographing function is a function for generating one image having a wide angle of view by composing a plurality of images captured while a digital camera main body is operated in a constant direction by a user.

In addition, there are digital cameras each having a lens that has a very wide angle of view built therein and being capable of photographing an image having a wide angle of view without composing images. Among such digital cameras, there are cameras capable of performing photographing in directions of 360 degrees.

CITATION LIST

Patent Literature

PTL 1: JP H11-331827 A

SUMMARY OF INVENTION

Technical Problem

Although such digital cameras can photograph images having a wide angle of view, there are many cases where a range actually desired to be viewed by a user is limited to a part of the range. Accordingly, in a case where such an image having a wide angle of view is displayed as it is, the user does not know a range of the image to be focused on.

The present technology is contrived in consideration of such situations and is to allow an image having a wide angle of view to be effectively viewed.

Solution to Problem

According to an illustrative embodiment, a display control unit simultaneously displays a plurality of cut-out images cut out from respective ranges of a wide-angle moving image.

Advantageous Effects of Invention

According to the present technology, a user can effectively view an image having a wide angle of view.

BRIEF DESCRIPTION OF DRAWINGS

FIG. 11 is a diagram illustrating an example of clip data.

DESCRIPTION OF EMBODIMENTS

Basic Function of Information Processing Apparatus

<External Configuration of Apparatus>

Figure 1:
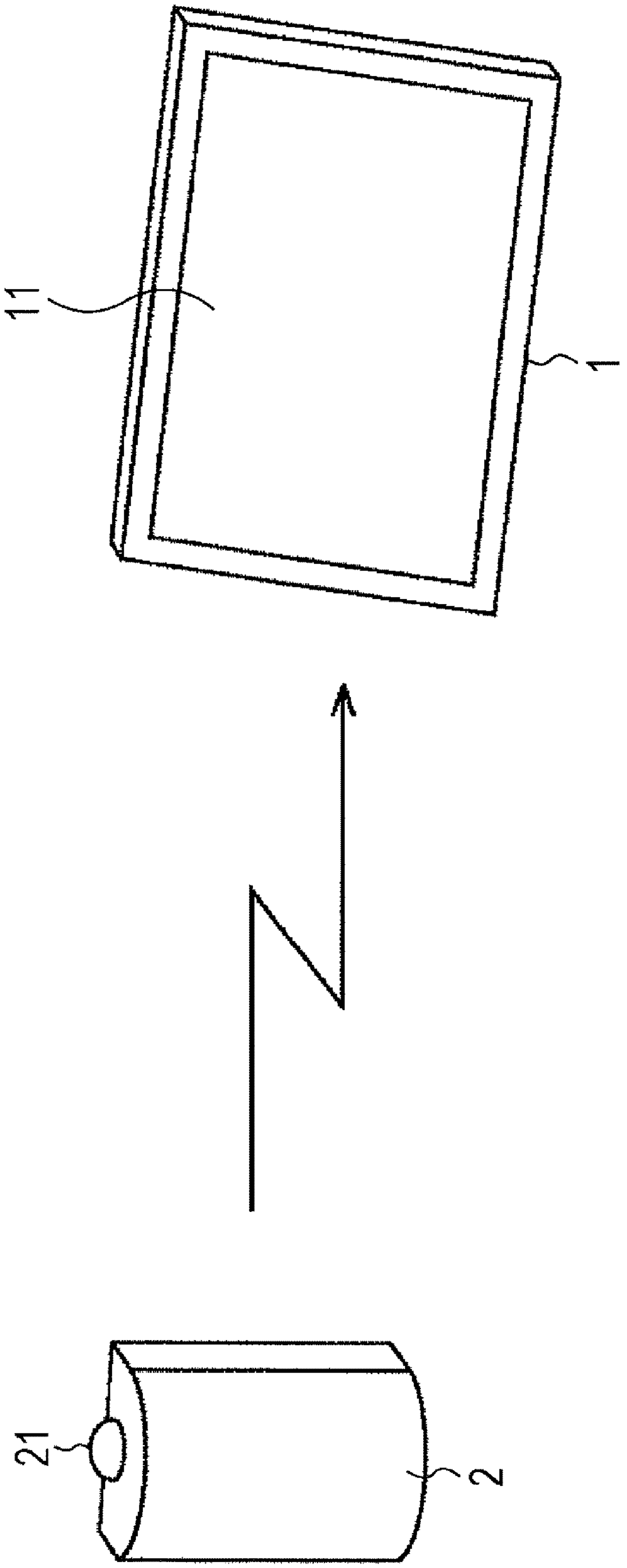
FIG. 1 is a diagram illustrating an information processing apparatus and a digital camera.

FIG. 1 is a diagram illustrating an information processing apparatus 1 according to an embodiment of the present technology and a digital camera 2 that communicates with the information processing apparatus 1.

The information processing apparatus (display control apparatus) 1 is so-called a tablet-type portable information terminal. The information processing apparatus 1 has a plate-shaped casing, and a display 11 such as a liquid crystal display (LCD) is disposed on the surface of the casing. A touch panel is disposed on the display 11. A user can operate the information processing apparatus 1 by bringing his finger into direct contact with a button that is displayed on the display 11 or the like.

The digital camera 2 is a photographing apparatus that has a function for capturing a moving image. The digital camera 2 has a thin-type casing that has a substantially long rectangular parallelepiped shape, and a wide angle lens 21 is disposed on the upper face of the casing. For example, as illustrated in FIG. 1, the capturing of a moving image using the digital camera 2 is performed in a state in which the optical axis of the wide angle lens 21 faces the upper side.

Figure 2:
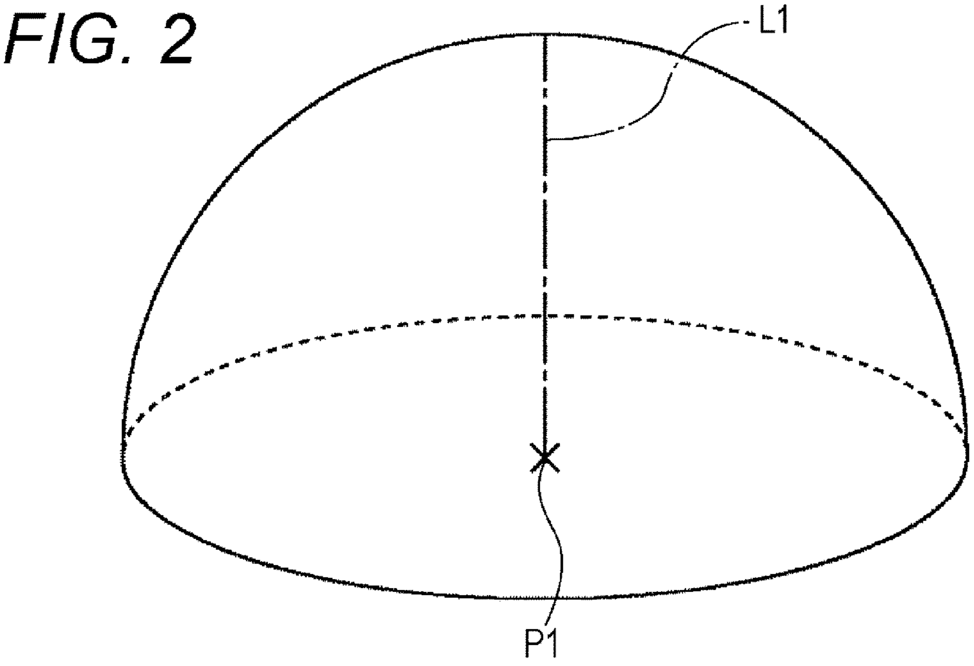
FIG. 2 is a diagram illustrating an example of the angle of view of a digital camera.

FIG. 2 is a diagram illustrating an example of the angle of view of the digital camera 2.

When photographing is performed at a location P1 with the wide angle lens 21 facing the upper side, as illustrated in FIG. 2, a moving image that is in the range of a half celestial sphere shape at which an optical axis L1 denoted by a dashed line and the zenith meets is photographed. In other words, a moving image having the angle of view of 360 degrees in the horizontal direction and 180 degrees in the vertical direction is photographed.

Figure 3:
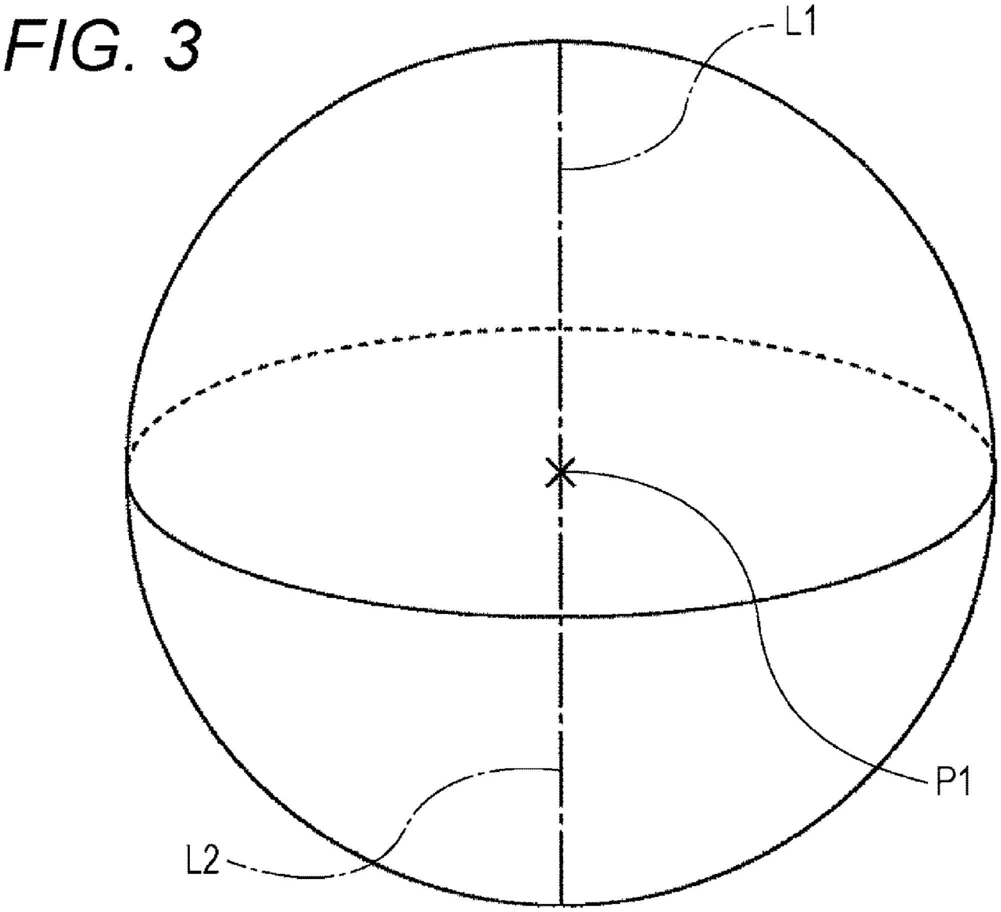
FIG. 3 is a diagram illustrating another example of the angle of view of the digital camera.

In addition, by disposing a wide angle lens also on the lower face of the casing of the digital camera 2, a moving image of the range of the whole celestial sphere, as illustrated in FIG. 3, may be configured to be photographed. An optical axis L2 is an optical axis of the wide angle lens that is disposed on the lower face of the casing of the digital camera 2. In such a case, a moving image that is photographed through the wide angle lens 21 disposed on the upper face and a moving image that is photographed through the wide angle lens disposed on the lower face are combined such that frames thereof photographed at the same time are combined, whereby a moving image is generated which has the range of one whole celestial sphere as the photographing range.

Hereinafter, a case will be described in which a wide-angle moving image photographed by the digital camera 2 has the range of a half celestial sphere illustrated in FIG. 2 as the photographing range.

The photographing of a wide-angle moving image using the digital camera 2 is continuously performed for a relatively long time such as one hour or two hours. By fixing the digital camera 2 to a part of the body of a user or the like and moving the body, the user can photograph a scene in all directions (a direction of 360 degrees in the horizontal direction and 180 degrees in the vertical direction) of his destination as a moving image.

A wide-angle moving image management application that is an application managing a wide-angle moving image captured by the digital camera 2 is installed to the information processing apparatus 1. The wide-angle moving image management application communicates with the digital camera 2 in a wired or wireless manner, thereby acquiring data of the wide-angle moving image captured by the digital camera 2. The data of the wide-angle moving image acquired from the digital camera 2, for example, is stored in an internal memory of the information processing apparatus 1.

In the information processing apparatus 1, a long-time wide-angle moving image acquired from the digital camera 2 is divided for every predetermined time such as ten minutes and is managed as clips. In addition, a plurality of clips are managed with being arranged for each event based on a photographing interval or the like.

<Example of User Interface (UI)>

Figure 4:
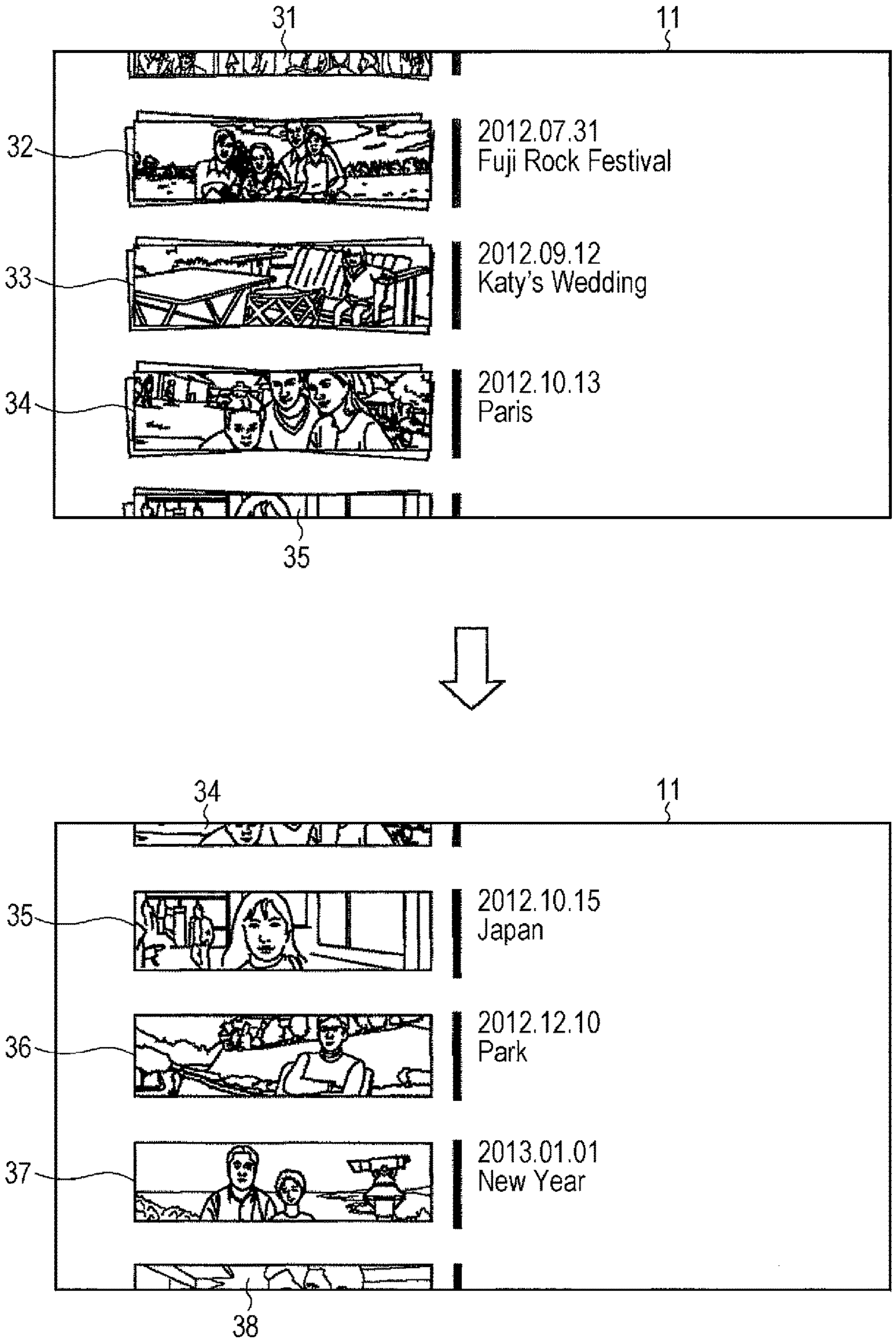
FIG. 4 is a diagram illustrating an example of an event selection screen.

FIG. 4 is a diagram illustrating an example of an event selection screen.

The event selection screen is a screen that is used for selecting an event to which a clip, that is a reproduction target, belongs. The event selection screen illustrated in FIG.

4 is displayed on the display 11 when an instruction for starting the wide-angle moving image management application is made, for example, by tapping on an icon that is present on a menu screen.

On the left side of the event selection screen illustrated in the upper side of FIG. 4, thumbnail images 31 to 35 having a band shape (horizontally-long rectangular shape) are displayed to be vertically aligned by leaving a predetermined interval therebetween. Only an approximately lower half part of the thumbnail image 31 is displayed, and only an approximately upper half part of the thumbnail image 35 is displayed. On the right side of each thumbnail image, information such as the photographing date and an event name is displayed.

The thumbnail image is a still image that is generated by cutting out a part of the range from a wide-angle moving image of a clip and deploying the cut-out moving image in a band shape. As will be described later, for example, a range in which a person is shown up is cut out for a wide-angle moving image of each clip as a target, whereby a thumbnail image is generated.

As above, in the information processing apparatus 1, a still image having a band-shaped frame form is generated by cutting out an arbitrary part of the range from a wide-angle moving image of one frame and deploying the cut-out part, and the still image is used as a thumbnail image. As the thumbnail image, not a still image but a moving image may be used.

Hereinafter, a moving image for which thumbnail display is performed will be described as a thumbnail moving image as is appropriate. Thus, when an image is denoted only as a thumbnail image, it represents that the image displayed as a thumbnail thereof is a still image. The thumbnail moving image is generated by performing cutting out of a part of the range and deploying of the cut-out part in a band-shaped frame form for each frame of a wide-angle moving image.

Under the thumbnail images 31 to 35, thumbnail images belonging to the same event are displayed in an overlapping manner with angles thereof being slightly shifted. The thumbnail images being displayed in an overlapping manner represent that there are a plurality of clips as the clips belonging to the same event.

A user can switch the display such that the event selection screen illustrated on the lower side is displayed by performing a drag operation on the event selection screen. For example, when a drag operation in the upward direction is performed, the entirety of the thumbnail images 31 to 35 is upwardly moved in accordance with the amount of the operation, and the display on the event selection screen is switched to the screen illustrated on the lower side. On the event selection screen illustrated on the lower side, a state is formed in which the thumbnail images 34 to 38 are displayed.

From the event selection screen illustrated in FIG. 4, a user can view the thumbnail images and select a preferred event.

Figure 5:
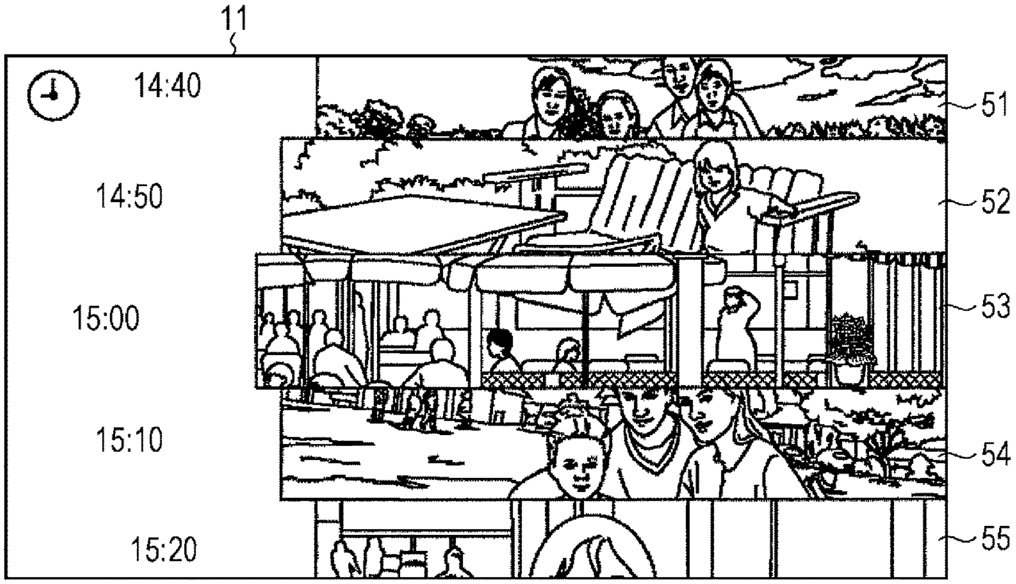
FIG. 5 is a diagram illustrating an example of a clip selection screen.
Figure 5:
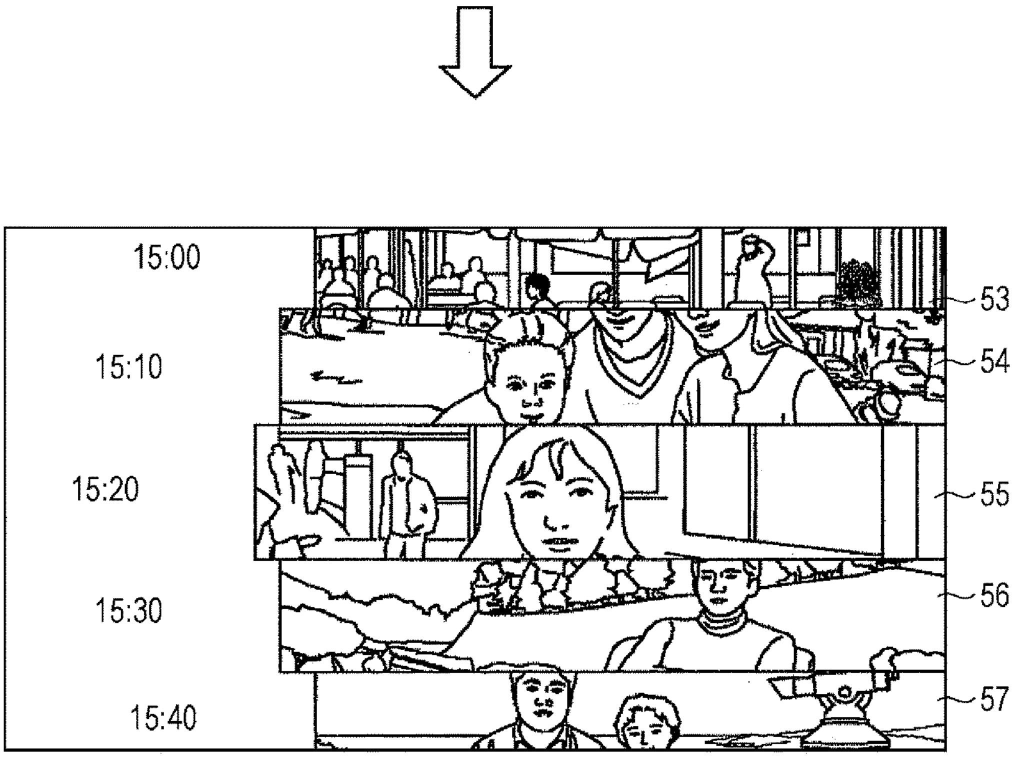

FIG. 5 is a diagram illustrating an example of a clip selection screen.

The clip selection screen is displayed when an event is selected by tapping on a predetermined thumbnail image on the event selection screen illustrated in FIG. 4.

When an event is selected, on the right side of the clip selection screen, images 51 to 55, which are band-shaped images, are displayed in the vertical direction with positions thereof being slightly shifted such that the image 53 is located at the center. The images 51 to 55 are images that represent clips belonging to the selected event. On the left side of the images 51 to 55, photographing time of each clip is displayed. When the event is selected, the event selection screen illustrated in FIG. 4 is switched to the clip selection screen illustrated in FIG. 5 through an animation such as spreading a bundled band on the screen.

The image 51 is a thumbnail image that represents a clip of which the photographing time is "14:40". The image 52 is a thumbnail image that represents a clip of which the photographing time is "14:50".

In addition, the image 53 disposed at the center that is in a state being focused on is a thumbnail moving image that represents a clip of which the photographing time is "15:00". For example, only the image 53 that is a moving image being focused on is displayed in colors, and the other thumbnail images (still images) are displayed in gray.

The image 54 is a thumbnail image that represents a clip of which the photographing time is "15:10". The image 55 is a thumbnail image that represents a clip of which the photographing time is "15:20".

When the position of the image 53 positioned at the center is used as the reference, the image 52 that is disposed on the upper side is displayed such that a part of the lower side of the image 52 is hidden under the image 53 and the image 52 is slightly shifted to the right side from the image 53. In addition, the image 54 disposed on the lower side is displayed such that a part of the upper side of the image 54 is hidden under the image 53 and the image 54 is slightly shifted to the right side from the image 53.

The image 51 disposed on the uppermost side is displayed such that a part of the lower side of the image 51 is hidden under the image 52 and the image 51 is slightly shifted to the right side from the image 52. In addition, the image 55 disposed on the lowermost side is displayed such that a part of the upper side of the image 55 is hidden under the image 54 and the image 55 is slightly shifted to the right side from the image 54.

A user may switch the display to the clip selection screen illustrated on the lower side by performing a drag operation on the clip selection screen. For example, when a drag operation in the upward direction is performed, the entirety of the images 51 to 55 is moved upwardly in accordance with the amount of the operation, and the display of the clip selection screen is switched to the screen illustrated on the lower side. On the clip selection screen illustrated on the lower side, a state is formed in which the images 53 to 57 are displayed at positions on which the images 51 to 55 have been displayed.

Since the image 53 is not displayed at the center, the image is not a moving image but a thumbnail image that represents a clip of which the photographing time is "15:00". The image 54 is a thumbnail image that represents a clip of which the photographing time is "15:10".

The image 55 positioned at the center that is focused on is a thumbnail moving image that represents a clip of which the photographing time is "15:20". A moving image that is cut out from a wide-angle moving image of a clip of which the photographing time is "15:20" is displayed as the image 55.

The image 56 is a thumbnail image that represents a clip of which the photographing time is "15:30". In addition, the image 57 is a thumbnail image that represents a clip of which the photographing time is "15:40".

The user can check the content of each clip belonging to the selected event in the order of time scales from the clip selection screen illustrated in FIG. 5.

Figure 6:
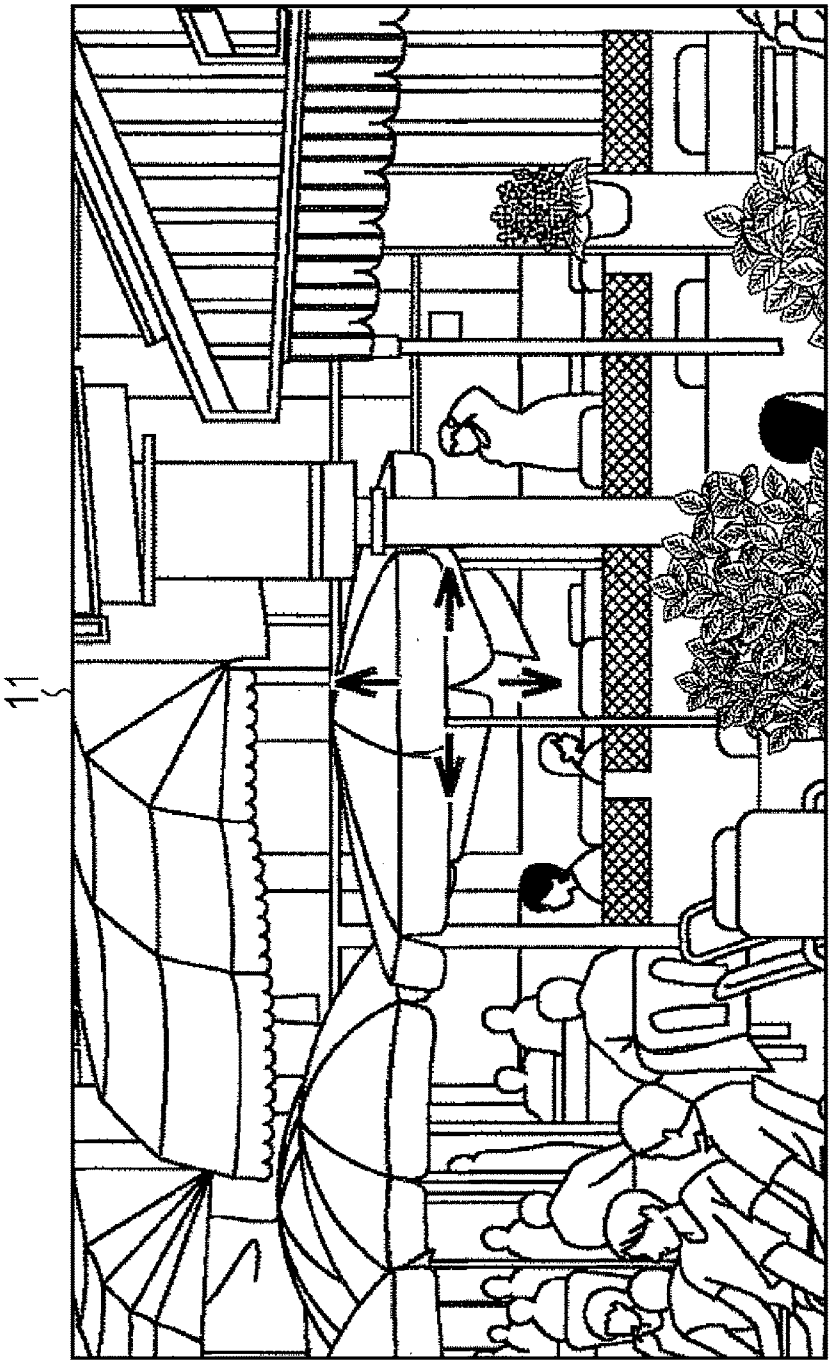
FIG. 6 is a diagram illustrating an example of a clip reproduction screen.

FIG. 6 is a diagram illustrating an example of a clip reproduction screen.

The clip reproduction screen is displayed when a clip is selected from the clip selection screen illustrated in FIG. 5. When a clip is selected by tapping on the thumbnail moving image that is focused on, the mode of the information processing apparatus 1 becomes a moving image view mode, and the reproduction of the selected clip is started. On the clip reproduction screen, a moving image of a predetermined range that is cut out from a wide-angle moving image of the clip is displayed.

As denoted by arrows on the center of the screen illustrated in FIG. 6, the user can freely change the cutting-out range of the moving image by performing a drag operation toward the upper, lower, left, or right side and can display the range in which a preferred subject is shown up.

Figure 7:
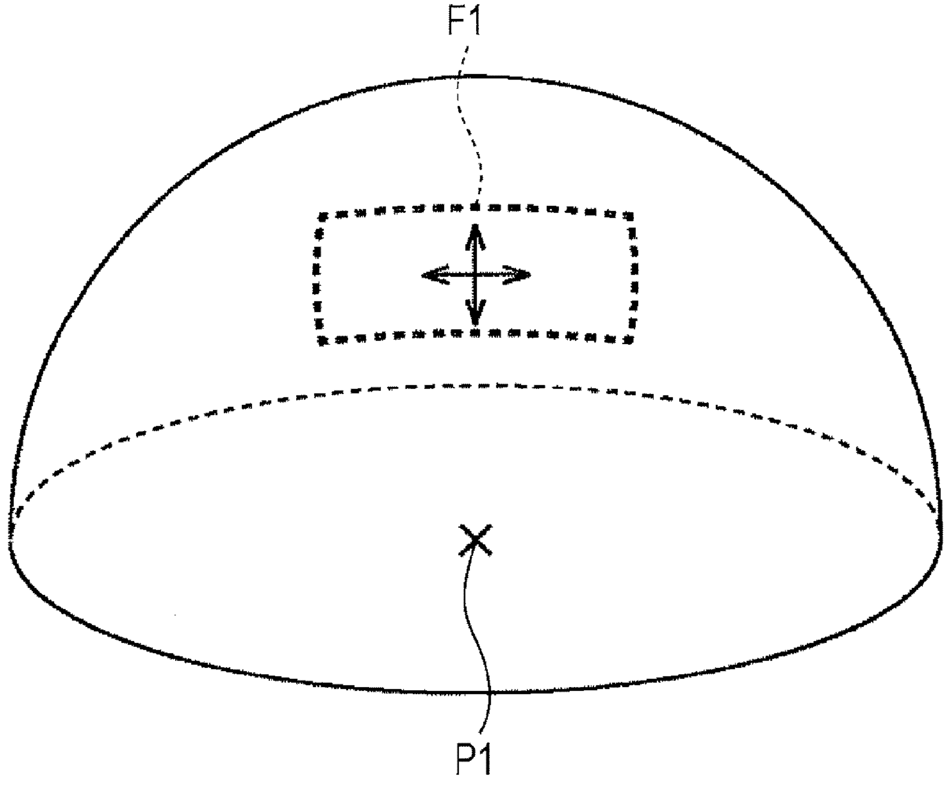
FIG. 7 is a diagram illustrating an example of the cutting-out range of the moving image.

FIG. 7 is a diagram illustrating an example of the cutting-out range of a moving image.

A half-celestial sphere illustrated in FIG. 7 represents the whole photographing range of one frame of a wide-angle moving image of the clip that is selected by the user. A location P1 is a photographing position of the wide-angle moving image, in other words, the location of the digital camera 2 at the time of performing photographing. This applies the same to the other diagrams used for description of the cutting-out range.

A frame F1 denoted by broken lines on the sphere surface represents the cutting-out range from a wide-angle moving image. On the clip reproduction screen, an image within the range denoted by the frame F1 is cut out from each frame of the wide-angle moving image and is displayed as a moving image. Although a subject positioned in the direction of 360 degrees in the horizontal direction and 180 degrees in the vertical direction with respect to the location P1 as the reference is shown up in the wide-angle moving image, only a part of the subject is displayed.

When a drag operation is performed by the user, the frame F1 moves in accordance with the user's operation, and accordingly, the cutting-out range is changed, whereby the subject displayed on the clip reproduction screen is changed as well. In addition, it may be configured such that enlargement/reduction of the subject displayed on the clip reproduction screen is performed with the size of the frame F1 being changed in accordance with pinch-in/pinch-out.

For example, the default position of the frame F1 right after the start of reproduction of the clip is set to cut out a range in which a person is shown up. In a case where a plurality of persons are shown up, the frame F1 may be set to cut out a range (a range in which the density of persons is higher than a threshold) in which persons are concentrated.

The cutting-out range may be set by using data other than image data as in a case where the direction of a sound source is specified based on audio data of a clip, and the frame F1 is set to cut out the range in the direction of the sound source. The setting of the cutting-out range of a moving image will be described later in detail.

As above, in the information processing apparatus 1, a long-time wide-angle moving image photographed by the digital camera 2 is managed with being divided for each clip and is reproduced. In addition, a moving image of the range of a part cut out from the wide-angle moving image is displayed.

Accordingly, the user can efficiently view the moving image having a wide angle of view. In a case where a long-time wide-angle moving image is displayed as it is, it is necessary for the user to view a moving image in which a subject observed by the user is not shown up or a moving image of the range in which an observed subject is not shown up. However, such a situation can be prevented.

The process of the information processing apparatus 1 that performs the screen display as described above will be described later with reference to a flowchart.

<Internal Configuration of Apparatus>

Figure 8:
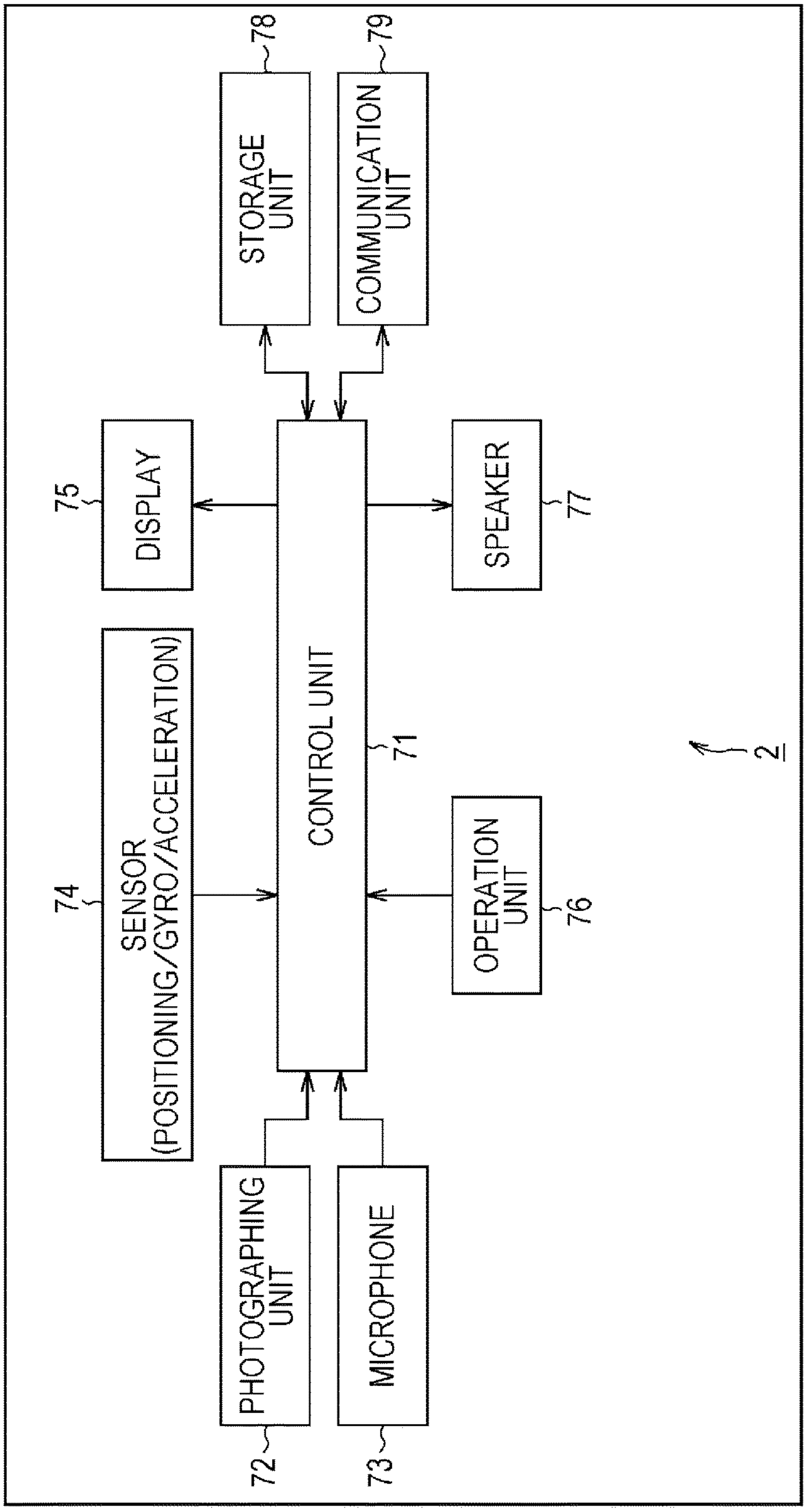
FIG. 8 is a block diagram illustrating an example of the hardware configuration of a digital camera.

FIG. 8 is a block diagram illustrating an example of the hardware configuration of the digital camera 2.

The digital camera 2 is configured by connecting a photographing unit 72, a microphone 73, a sensor 74, a display 75, an operation unit 76, a speaker 77, a storage unit 78, and a communication unit 79 to a control unit 71.

The control unit 71 is configured by a central processing unit (CPU), a read only memory (ROM), a random access memory (RAM), and the like. The control unit 71 executes a predetermined program and controls the overall operation of the digital camera 2 in accordance with a user's operation.

For example, the control unit 71 stores data of a wide-angle moving image photographed by the photographing unit 72 in the storage unit 78 together with audio data supplied from the microphone 73 and sensor data supplied from the sensor 74. Information such as photographing date and time is added to the data of the wide-angle moving image. In addition, the control unit 71 communicates with the information processing apparatus 1 by controlling the communication unit 79 and transmits the data of the wide-angle moving image to the information processing apparatus 1.

The photographing unit 72 includes an imaging sensor such as a complementary metal oxide semiconductor (CMOS) image sensor. The photographing unit 72 performs photoelectric conversion of light acquired therein through the wide angle lens 21, performs A/D conversion of an analog signal, and the like and outputs the data of the wide-angle moving image to the control unit 71.

The microphone 73 collects sound at the same time when the photographing of the wide-angle moving image is performed and outputs the audio data to the control unit 71.

The sensor 74 is configured by a global positioning system (GPS) sensor, a gyro sensor, an acceleration sensor, and the like. The sensor 74 performs positioning and detection of angular velocity and acceleration at the same time when the photographing of a wide-angle moving image is performed and outputs the sensor data to the control unit 71. In the sensor data, information of the photographing location, the angular velocity, and the acceleration at each time during the photographing of the wide-angle moving image is included.

The display 75 is configured by an LCD or the like and displays various kinds of information such as a menu screen and a wide-angle moving image being photographed under the control of the control unit 71.

The operation unit 76 is configured by operation buttons, a touch panel, and the like disposed on the surface of the casing of the digital camera 2. The operation unit 76 outputs information that represents the content of a user's operation to the control unit 71.

For example, during the reproduction of a wide-angle moving image, the speaker 77 outputs a sound based on an audio signal supplied from the control unit 71.

The storage unit 78 is configured by a flash memory and a memory card inserted into a card slot disposed in the casing. The storage unit 78 stores various kinds of data such as the data of a wide-angle moving image supplied from the control unit 71.

The communication unit 79 communicates with the information processing apparatus 1 through wireless or wired communication. The communication unit 79 transmits various kinds of data such as the data of the wide-angle moving image supplied from the control unit 71 to the information processing apparatus 1.

Figure 9:
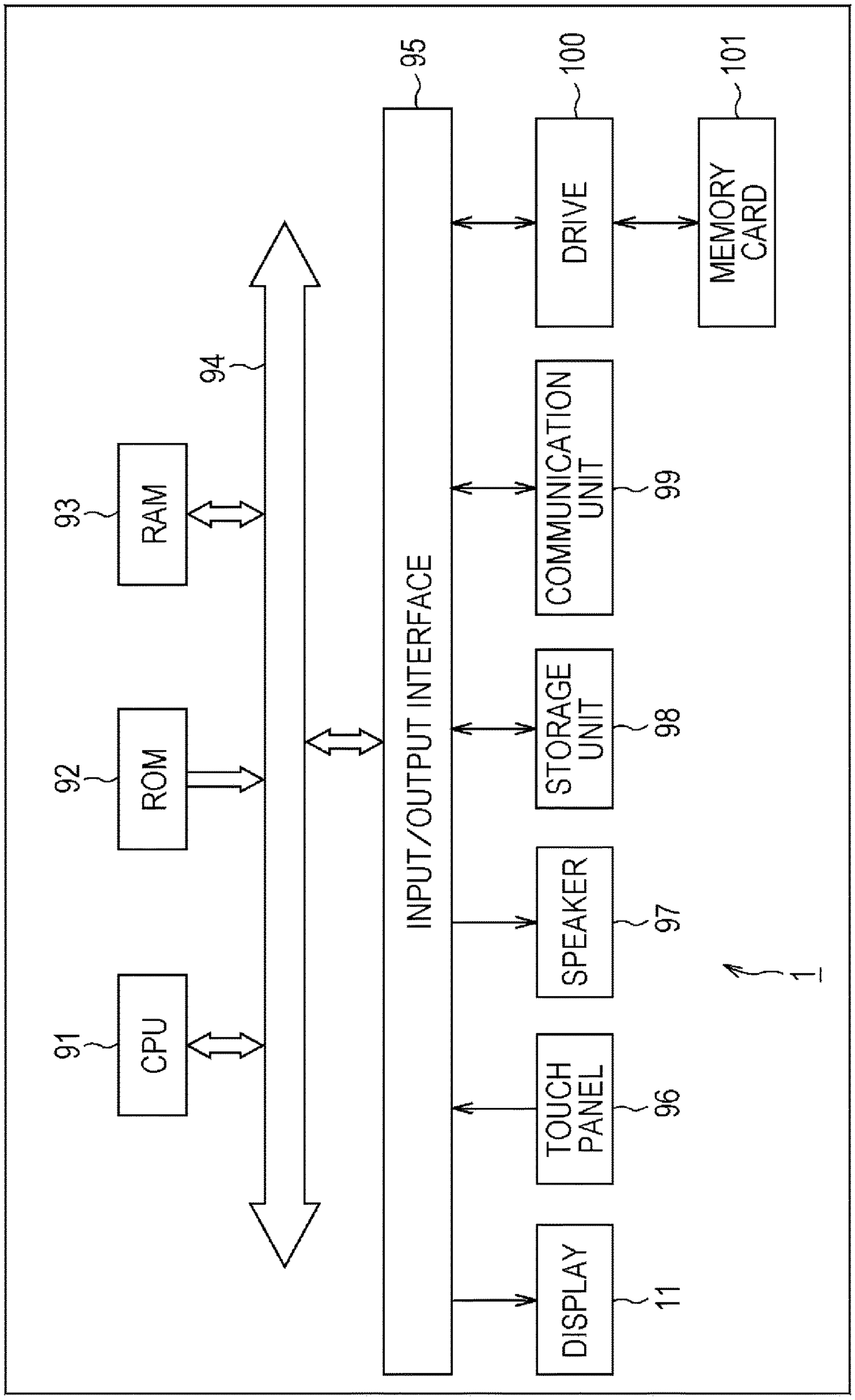
FIG. 9 is a block diagram illustrating an example of the hardware configuration of an information processing apparatus.

FIG. 9 is a block diagram illustrating an example of the hardware configuration of the information processing apparatus 1.

A CPU 91, a ROM 92, and a RAM 93 are interconnected through a bus 94. The CPU 91 controls each unit of the information processing apparatus 1 by executing a predetermined program. For example, the CPU 91 performs various processes relating to the reproduction of a wide-angle moving image by executing a wide-angle moving image managing application that operates on a predetermined operating system (OS).

An input/output interface 95 is connected to the bus 94, and the display 11, a touch panel 96, a speaker 97, a storage unit 98, a communication unit 99, and a drive 100 are connected to the input/output interface 95. The transmission/reception of data between each unit connected to the input/output interface 95 and the CPU 91 is performed through the bus 94 and the input/output interface 95.

The touch panel 96 detects a user's operation for the surface of the display 11 and outputs a signal that represents the content of the operation to the CPU 91.

The speaker 97 outputs various kinds of sounds such as a sound of a wide-angle moving image.

The storage unit 98 is configured by a storage medium such as a flash memory. The storage unit 98 stores various kinds of data such as the data of a wide-angle moving image. The data stored in the storage unit 98 is read by the CPU 91 as is appropriate.

The communication unit 99 communicates with the digital camera 2 in a wireless or wired manner. The communication unit 99 receives the data of the wide-angle moving image that has transmitted from the digital camera 2 and supplies the received data to the storage unit 98 so as to be stored therein.

The drive 100 drives a memory card 101 that is inserted into the card slot. The drive 100 performs writing of various kinds of data into the memory card 101 and reading of various kinds of data from the memory card 101.

Figure 10:
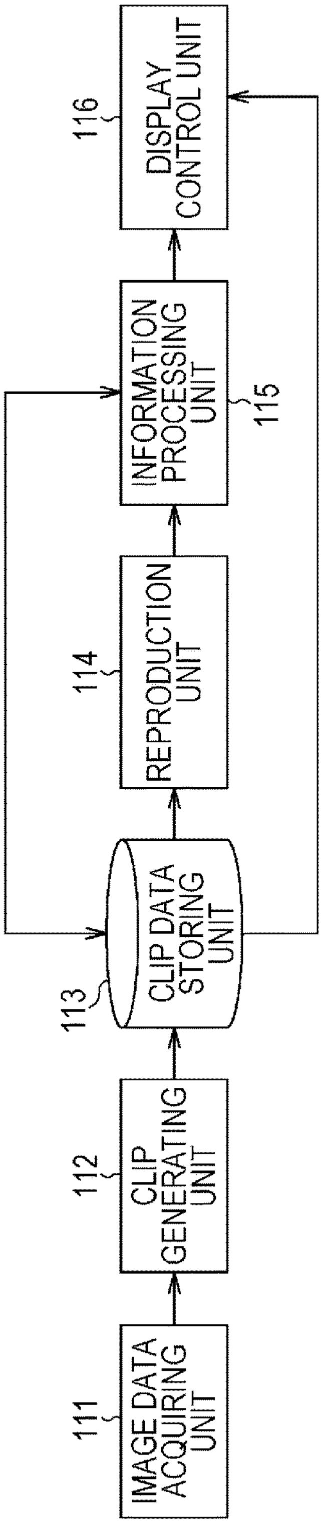
FIG. 10 is a block diagram illustrating an example of the functional configuration of an information processing apparatus.

FIG. 10 is a block diagram illustrating an example of the functional configuration of the information processing apparatus 1.

At least some of the functional units illustrated in FIG. 10 are realized by executing the wide-angle moving image managing application using the CPU 91 illustrated in FIG. 9. In the information processing apparatus 1, an image data acquiring unit 111, a clip generating unit 112, a clip data storing unit 113, a reproduction unit 114, an information processing unit 115, and a display control unit 116 are realized.

The image data acquiring unit 111 acquires the data of a wide-angle moving image that is transmitted from the digital camera 2 and is received by the communication unit 99. In the data of the wide-angle moving image that is acquired by the image data acquiring unit 111, audio data, sensor data, and metadata such as photographing date and time, and a file name are added. The image data acquiring unit 111 outputs the acquired data to the clip generating unit 112.

The data of a wide-angle moving image may be configured to be acquired in real time in association with the photographing of the wide-angle moving image using the digital camera 2.

The clip generating unit 112 generates clips by dividing a long time wide-angle moving image supplied from the image data acquiring unit 111 for every short time interval of ten minutes or the like. The clip generating unit 112 stores data of each clip that includes a wide-angle moving image, audio data, sensor data, and metadata in the clip data storing unit 113.

In addition, the clip generating unit 112 arranges a plurality of clips for each event and sets information such as identification information, and an event name of an event to which the clip belongs as the metadata of each clip. The event of each clip is determined by arranging clips of which the photographing intervals are within a predetermined time or arranging clips of which the photographing date is the same date. In addition, the event of each clip may be determined by analyzing a wide-angle moving image and arranging clips in which the same scene is shown up. The event name is set by being input by the user or the like.

For example, the clip data storing unit 113 is realized by the storage unit 98. The clip data storing unit 113 stores the data of each clip that is supplied from the clip generating unit 112. In addition, the clip data storing unit 113 stores the information that is supplied from the information processing unit 115. Identification information of a person shown up in each clip, information representing the location of the person, and the like are supplied from the information processing unit 115 to the clip data storing unit 113.

FIG. 11 is a diagram illustrating an example of clip data.

The data of each clip is configured by data of a wide-angle moving image that is divided for every ten minutes or the like, audio data, sensor data, metadata, and thumbnail data.

In the sensor data, information of a photographing location, acceleration, and angular velocity of a clip detected by the digital camera 2 at the time of performing photographing is included.

In the metadata, a clip name, photographing date and time, an event ID, an event name, a person ID, and person location information are included.

For example, the clip name is set by combining a file name that is set to the data of a wide-angle moving image in the digital camera 2 and the photographing date and time of the clip or using another method. For example, the photographing date and time represents photographing date and time of a clip.

The event ID is identification of an event to which a clip belongs. The event name is the name of an event to which a clip belongs. For example, the event ID and the event name are generated by the clip generating unit 112.

The person ID is identification information that is assigned to a person shown up in the wide-angle moving image of a clip. The person location information represents the location of a person, who is shown up in the wide-angle moving image, within the photographing range. The person ID and the person location information are set by the information processing unit 115. For example, the person ID and the person location information are managed in association with the reproduction time of the clip. The information processing apparatus 1 can specify a location in which a specific person is shown up at a specific timing during the reproduction of the clip based on the metadata.

In the thumbnail data, a thumbnail image that is a still image being cut out from one frame of a wide-angle moving image of the clip and a thumbnail moving image that is a moving image generated by being cut from each frame of the wide-angle moving image are included.

The clip data storing unit 113 stores such various kinds of data as the data of each clip. The data of each clip that is stored in the clip data storing unit 113 is read by the reproduction unit 114, the information processing unit 115, and the display control unit 116 as is appropriate.

The reproduction unit 114 reads the data of a wide-angle moving image of a clip that is a reproduction target from the clip data storing unit 113 and reproduces the read data of the wide-angle moving image. The reproduction unit 114 outputs the data of each frame of the wide-angle moving image acquired through the reproduction process to the information processing unit 115.

In addition, together with the reproduction of a wide-angle moving image using the reproduction unit 114, audio data is reproduced by a reproduction unit that is not illustrated in the figure. Based on an audio signal acquired by reproducing the audio data, the sound of the clip is output from the speaker 97 illustrated in FIG. 9.

The information processing unit 115 performs image processing such as cutting out a part of the range of the wide-angle moving image that is supplied from the reproduction unit 114. The information processing unit 115 outputs a moving image cut out from the wide-angle moving image of the clip that is a reproduction target to the display control unit 116. In addition, the information processing unit 115 outputs a still image cut out from the wide-angle moving image to the clip data storing unit 113 as a thumbnail image at the time of analyzing the clip.

The display control unit 116 displays the moving image that is supplied from the information processing unit 115 on the display 11. In addition, for example, when the event selection screen is displayed, the display control unit 116 reads a thumbnail image or a thumbnail moving image of each clip set as the metadata from the clip data storing unit 113 and displays the thumbnail image or the thumbnail moving image that has been read.

Figure 12:
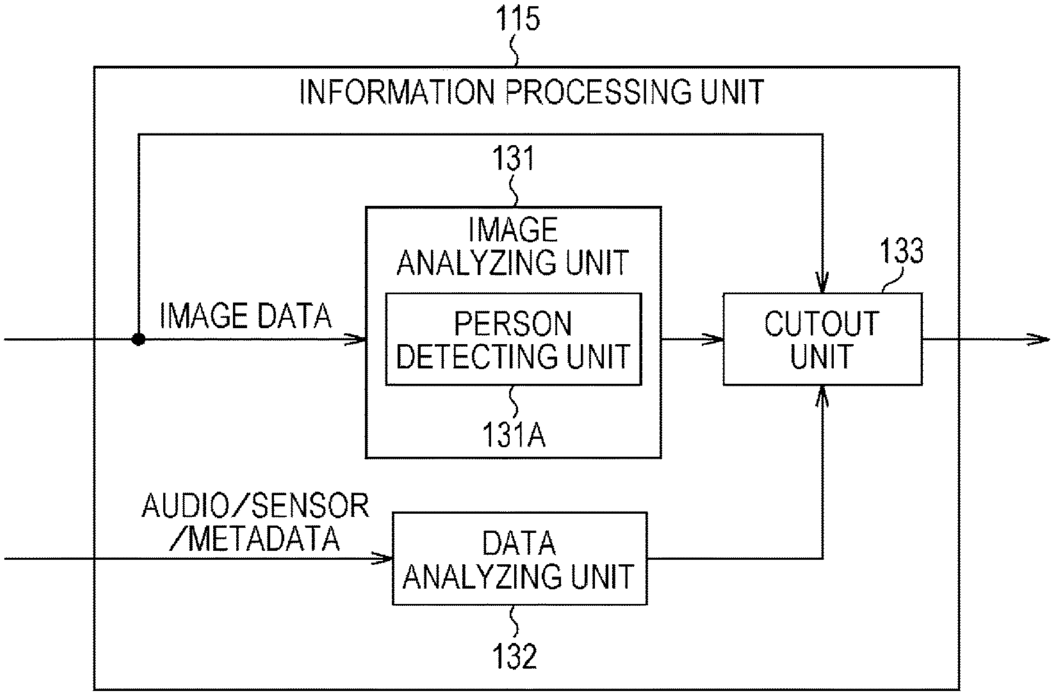
FIG. 12 is a block diagram illustrating an example of the configuration of an information processing unit illustrated in FIG. 10.

FIG. 12 is a block diagram illustrating an example of the configuration of the information processing unit 115 illustrated in FIG. 10.

The information processing unit 115 is configured by an image analyzing unit 131, a data analyzing unit 132, and a cutout unit 133. In the image analyzing unit 131, a person detecting unit 131A is included. The data of a wide-angle moving image that is supplied from the reproduction unit 114 is input to the image analyzing unit 131 and the cutout unit 133. In addition, the audio data, the sensor data, and the metadata read from the clip data storing unit 113 are input to the data analyzing unit 132.

The image analyzing unit 131 performs various analyses of a wide-angle moving image as a target and outputs results of the analyses to the cutout unit 133.

The person detecting unit 131A of the image analyzing unit 131 detects a person from the entire photographing range of each frame of a wide-angle moving image as a target. In the detection of a person, for example, a face detection technology is used. In a case where a plurality of persons are shown up in the wide-angle moving image, each one of the persons is detected. The image analyzing unit 131 outputs information that represents the location of a person to the cutout unit 133. In addition, the image analyzing unit 131 outputs the person ID and the person location information to the clip data storing unit 113.

The data analyzing unit 132 analyzes the audio data, the sensor data, and the metadata of a clip and outputs a result of the analysis to the cutout unit 133.

For example, the data analyzing unit 132 specifies the direction of a sound source included in the photographing range of a wide-angle moving image by analyzing the audio data and outputs information of the direction of the sound source. In addition, the data analyzing unit 132 specifies the traveling direction of the digital camera 2 at the time of photographing a wide-angle moving image and the like by analyzing the data of angular velocity and acceleration included in the sensor data and outputs information relating to the traveling direction of the digital camera 2. The data analyzing unit 132 analyzes the metadata and outputs the person ID and the person location information of a person shown up in a clip that is a reproduction target.

The cutout unit 133 sets a cutting-out range of the moving image based on the results of analyses performed by the image analyzing unit 131 and the data analyzing unit 132. The cutting-out range is set also based on a position designated by a user.

When a clip selected by the user is reproduced, the cutout unit 133 outputs a moving image cut out from the wide-angle moving image to the display control unit 116 so as to be displayed. In addition, when the clip is analyzed, the cutout unit 133 outputs a still image cut out from the wide-angle moving image as a thumbnail image and a moving image as a thumbnail moving image to the clip data storing unit 113.

Figure 13:
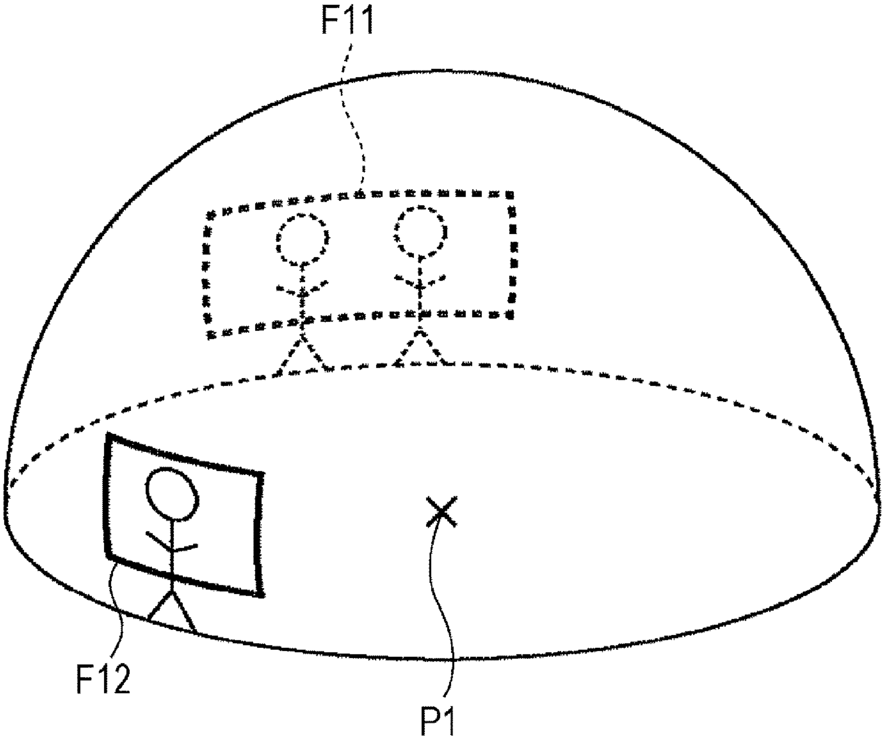
FIG. 13 is a diagram illustrating an example of the cutting-out range of the moving image.

FIG. 13 is a diagram illustrating an example of the cutting-out range of a moving image.

In the example illustrated in FIG. 13, three persons are shown up in the photographing range of the wide angle range and are detected by the person detecting unit 131A. In this case, for example, as represented by a frame F11, a range including two persons and, as represented by a frame F12, a range including one person is set as cutting-out ranges.

In this way, a plurality of moving images can be cut out from a wide-angle moving image of one frame. In addition, the position, the size (the angle of view), the aspect ratio, and the like of the cutting-out range are arbitrary.

<Operation of Information Processing Apparatus>

Here, the process of the information processing apparatus 1 having the configuration as described above will be described.

Figure 14:
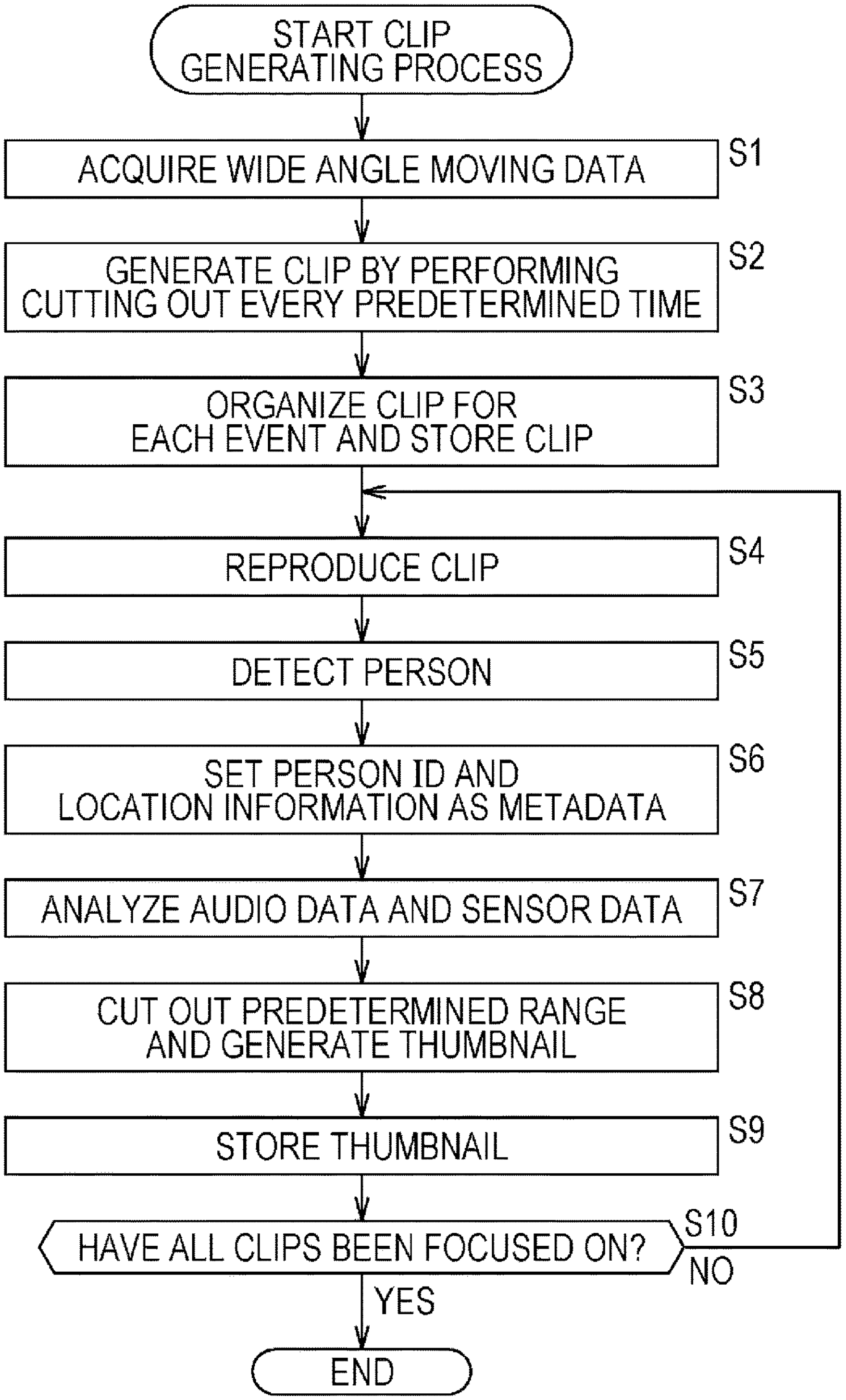
FIG. 14 is a flowchart illustrating a clip generating process.

First, the clip generating process of the information processing apparatus 1 will be described with reference to a flowchart illustrated in FIG. 14. For example, the process illustrated in FIG. 14 is started when the data of a wide-angle moving image transmitted from the digital camera 2 is received by the communication unit 99.

In Step S1, the image data acquiring unit 111 acquires the data of the wide-angle moving image and outputs the acquired data of the wide-angle moving image to the clip generating unit 112 together with the audio data, the sensor data, and the metadata.

In Step S2, the clip generating unit 112 generates clips by dividing a long-time wide-angle moving image supplied from the image data acquiring unit 111 for every short time interval.

In Step S3, the clip generating unit 112 arranges a plurality of clips for each event and stores the data of each clip in the clip data storing unit 113. In the clip data storing unit 113, the data of the wide-angle moving image, the audio data, the sensor data, and the metadata including the clip name, the photographing date and time, the event ID, and the event name are stored as data of each clip. Thereafter, the clip is analyzed.

In Step S4, the reproduction unit 114 focuses on one clip and reproduces the clip.

The reproduction unit 114 outputs the data of the wide-angle moving image acquired through the reproduction process to the information processing unit 115.

In Step S5, the person detecting unit 131A detects a person from the entire photographing range of each frame of the wide-angle moving image as a target.

In Step S6, the person detecting unit 131A outputs the person ID and the person location information of the detected person to the clip data storing unit 113 and sets them as metadata.

In Step S7, the data analyzing unit 132 reads the audio data and the sensor data of the focused clip from the clip data storing unit 113 and analyzes the audio data and the sensor data that have been read. For example, the data analyzing unit 132 specifies the direction of a sound source and the volume of each sound source by analyzing the audio data. In addition, the data analyzing unit 132 specifies the traveling direction, the moving speed, and the like at the time of performing photographing by analyzing the sensor data. The data analyzing unit 132 outputs the results of the analyses to the cutout unit 133.

In Step S8, the cutout unit 133 generates a thumbnail image by cutting out a part of the range from one frame of the wide-angle moving image based on the detection result acquired by the person detecting unit 131A and the analysis results acquired by the data analyzing unit 132. In addition, the cutout unit 133 cuts out a part of the range from each frame of the wide-angle moving image based on the results of the analyses acquired by the person detecting unit 131A and the data analyzing unit 132, thereby generating a thumbnail moving image.

For example, a range in which a person is shown up much, a range in the direction of a sound source having a high volume level, and the like are determined as ranges in which highlighted subjects are shown up and are cut out from the wide-angle moving image. In addition, a range in the traveling direction at the time of performing photographing, a range in the forward direction of the digital camera 2, and the like are cut out from the wide-angle moving image.

In Step S9, the cutout unit 133 stores the thumbnail images and thumbnail moving images that have been cut out in the clip data storing unit 113 as data of the focused clip.

In Step S10, the reproduction unit 114 determines whether or not all the clips have been focused on. In a case where it is determined that all the clips have not been focused on in Step S10, the process is returned to Step S4, and the reproduction unit 114 changes a clip to be focused on and repeats the above-described process. On the other hand, in a case where it is determined that all the clips have been focused on in Step S10, the process ends.

In the description presented above, after the generation of clips, each clip is assumed to be analyzed so as to generate thumbnail images and the like, but the generation of thumbnail images may be performed at different timing as long as the timing is before the display of the event selection screen as described with reference to FIG. 4.

Figure 15:
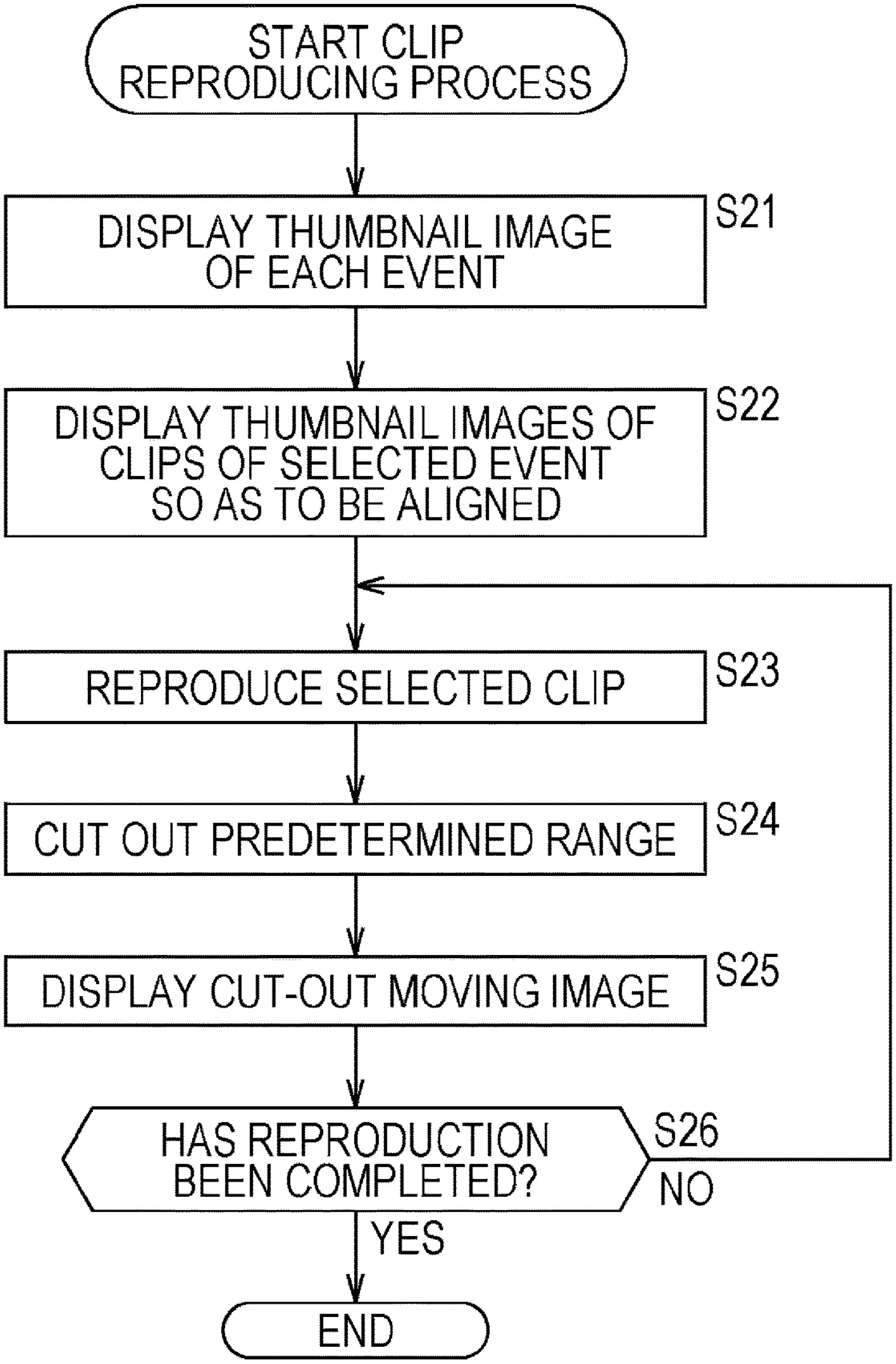
FIG. 15 is a flowchart illustrating a clip reproducing process.

Next, the clip reproducing process of the information processing apparatus 1 will be described with reference to a flowchart illustrated in FIG. 15. For example, the process illustrated in FIG. 15 is started when an instruction for starting the wide-angle moving image managing application is made by tapping on an icon displayed on the menu screen.

In Step S21, the display control unit 116 reads thumbnail images of each event from the clip data storing unit 113 and displays the thumbnail images to be aligned. For example, the display control unit 116 displays the thumbnail images of one clip selected from clips belonging to the event for each event.

In this way, the event selection screen as described with reference to FIG. 4 is displayed. The user switches the display of thumbnail images by performing a drag operation in the upward direction or the downward direction and can select a preferred event by tapping on a thumbnail image.

When the event is selected, in Step S22, the display control unit 116 reads thumbnail images of each clip belonging to the selected event from the clip data storing unit 113 and displays the read thumbnail images to be aligned. For a clip positioned at the center when being aligned in the order of photographing time, the display control unit 116 reads thumbnail moving images from the clip data storing unit 113 and displays the read thumbnail moving images.

In this way, the clip selection screen as described with reference to FIG. 5 is displayed. The user switches the display of thumbnail images or thumbnail moving images by performing a drag operation in the upward direction or the downward direction and can select a preferred clip by performing a tap operation.

When the clip is selected, in Step S23, the reproduction unit 114 reproduces the selected clip and outputs the data of the wide-angle moving image to the information processing unit 115.

In Step S24, the cutout unit 133 cuts out a part of the range of a moving image from the wide-angle moving image and outputs data of the moving image that is formed by frames that have been cut out to the display control unit 116.

In Step S25, the display control unit 116 displays moving images cut out from the wide-angle moving image on the display 11.

In this way, the clip reproduction screen as described with reference to FIG. 6 is displayed. The user can switch the display range (the cutting-out range of the wide-angle moving image) by performing a drag operation, or enlarge or reduce the display range by performing a pinch-out/pinch-in operation.

According to the above-described process, compared to a case where a moving image having a wide angle of view is displayed from the start, the user can display only a preferred range of the clip of a preferred interval and can efficiently view a moving image having a wide angle of view.

<Another Example of Clip Reproduction Screen>

Figure 16:
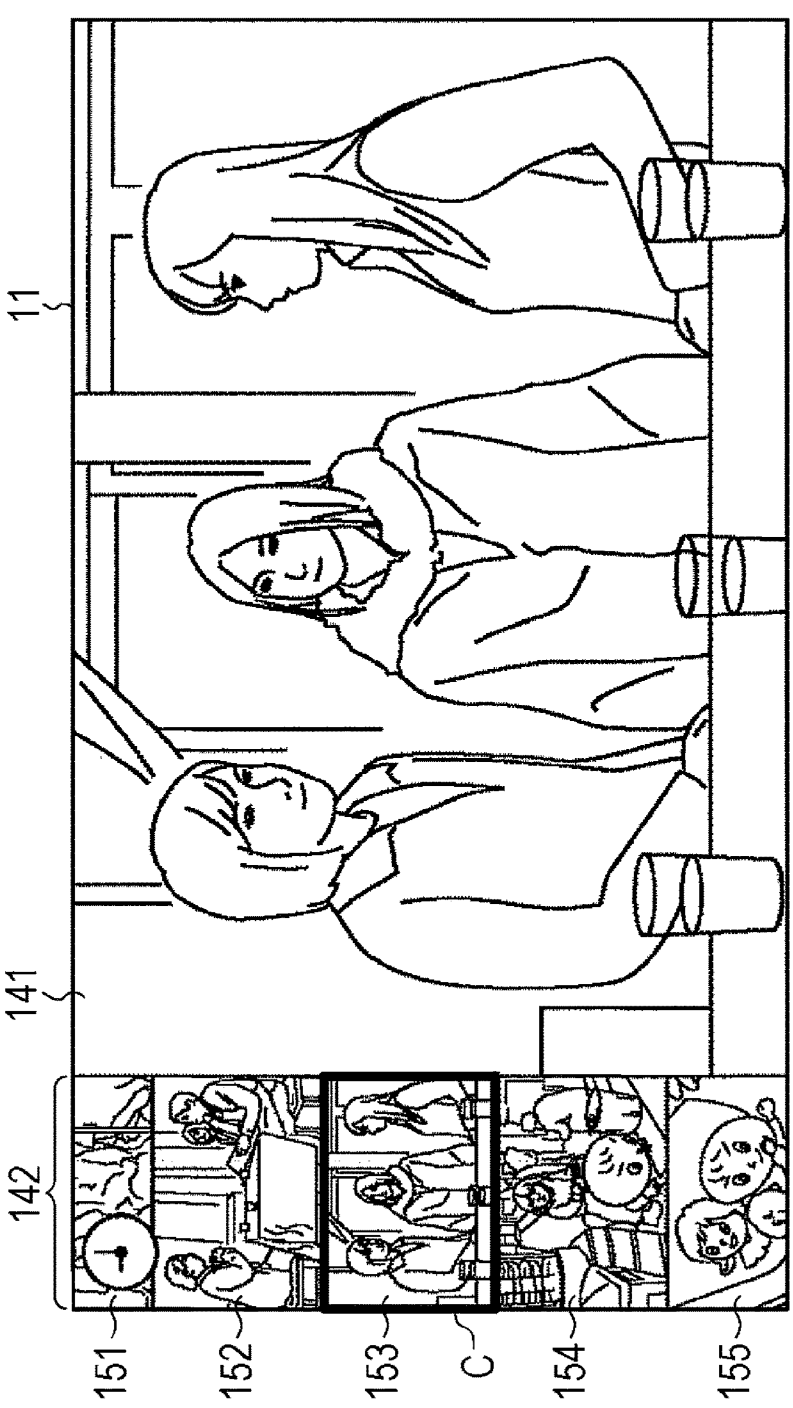
FIG. 16 is a diagram illustrating another example of the clip reproduction screen.

FIG. 16 is a diagram illustrating another example of the clip reproduction screen. For example, the clip reproduction screen illustrated in FIG. 16 is displayed when an event is selected from the event selection screen illustrated in FIG. 4.

The clip reproduction screen illustrated in FIG. 16 is configured by a moving image display area 141 that is a wide area having a horizontally-long rectangular parallelepiped shape and a thumbnail display area 142 that is a vertically-long rectangular parallelepiped shape. The moving image display area 141 is formed on the right side of the display 11 so as to occupy an about ⅚ range of the display 11. The thumbnail display area 142 is formed on the left side of the moving image display area 141.

In the moving image display area 141, a moving image cut out from a wide-angle moving image of a clip that is in the middle of a reproduction process is displayed. In the thumbnail display area 142, thumbnail images 151 to 155 that represent clips are displayed to be vertically aligned in the order of time scales. To the thumbnail image 153 positioned at the center, a cursor C is applied. The moving image displayed in the moving image display area 141 is cut out from the wide-angle moving image of the clip of which the content is represented by the thumbnail image 153.

A user can perform switching between displays of thumbnail images by performing a drag operation in the vertical direction on the thumbnail display area 142. In addition, the user can view a preferred range of the clip that is in the middle of the reproduction process by changing the cutting-out range of the moving image by performing a drag operation on the moving image display area 141.

Figure 17:
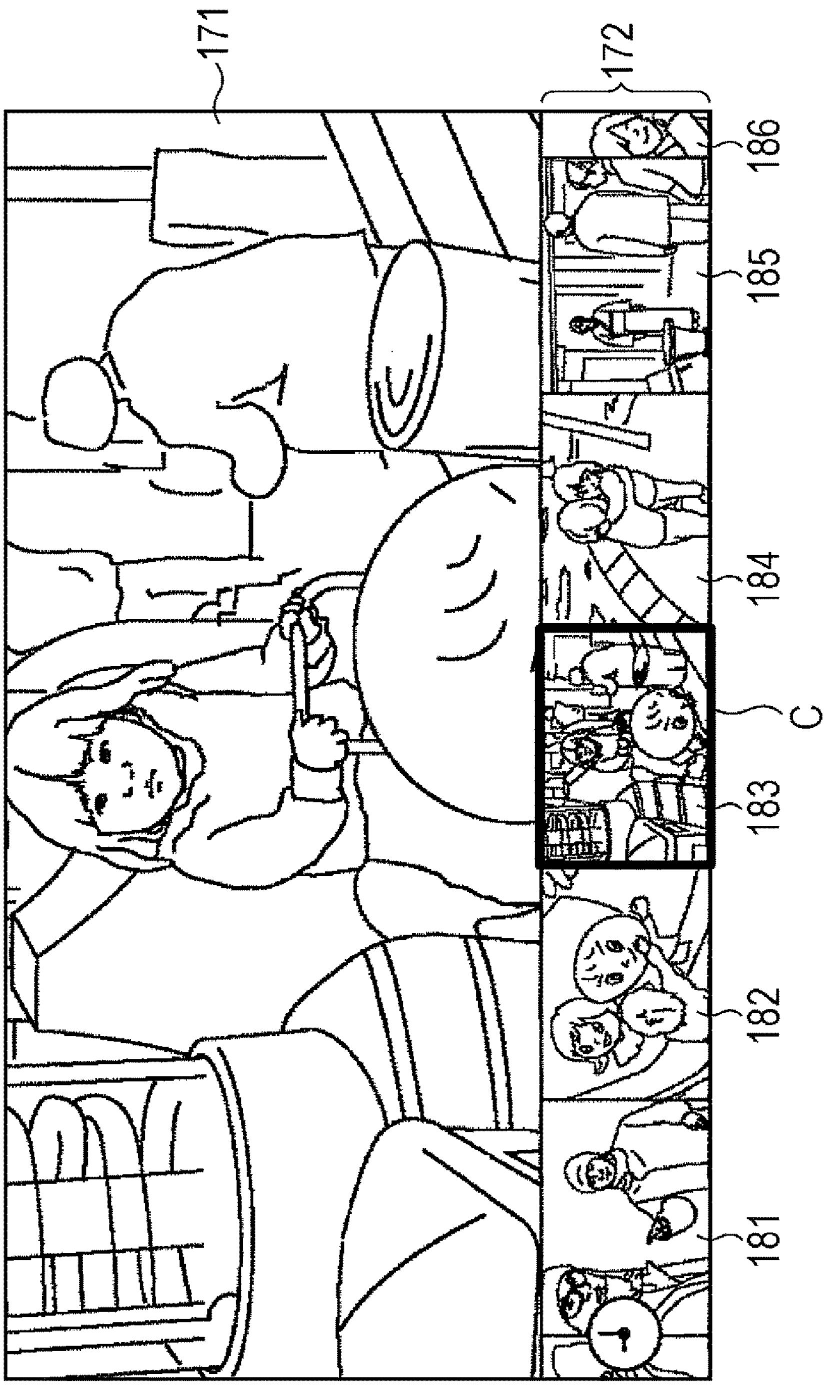
FIG. 17 is a diagram illustrating a further another example of the clip reproduction screen.

FIG. 17 is a diagram illustrating a further another example of the clip reproduction screen. When being compared with the screen illustrated in FIG. 16, the arrangement of the thumbnail image display area and the moving image display area is changed in the clip reproduction screen illustrated in FIG. 17.

The clip reproduction screen illustrated in FIG. 17 is configured by a moving image display area 171 and a thumbnail display area 172. The moving image display area 171 is formed on the upper side of the display 11 so as to occupy an about ¾ range of the display 11. The thumbnail display area 172 is formed on the lower side of the moving image display area 171.

In this way, the configuration of the clip reproduction screen can be appropriately changed. It may be configured such that switching between the displays illustrated in FIGS. 16 and 17 can be made or switching between the displays illustrated in FIGS. 6 and 16 and the displays illustrated in FIGS. 6 and 17 can be made.

<Time Shift Reproduction>

Next, time shift reproduction will be described.

<Regarding Time Shift Reproduction>

Figure 18:
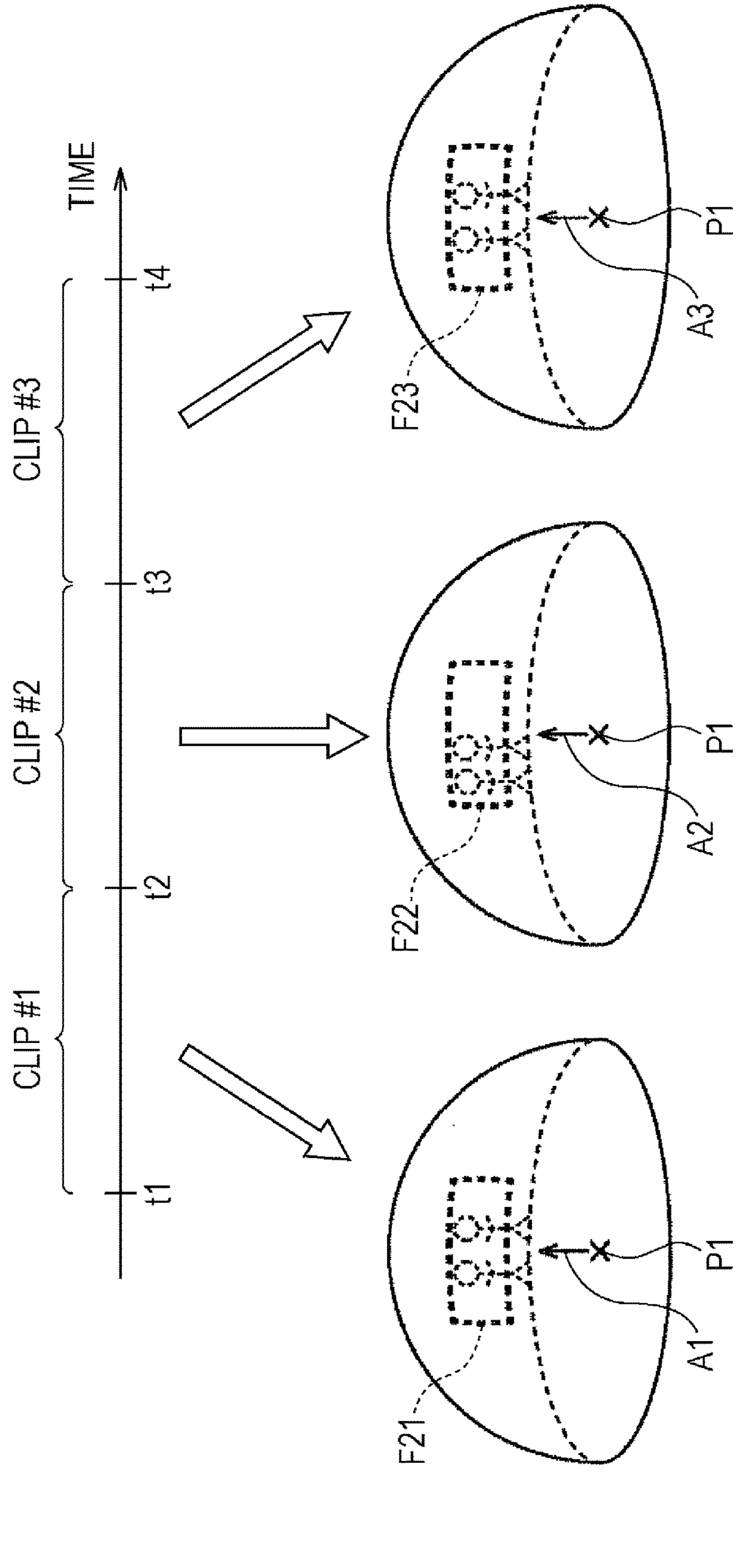
FIG. 18 is a diagram illustrating the concept of time shift reproduction.

FIG. 18 is a diagram illustrating the concept of the time shift reproduction.

The time shift reproduction is a function starting reproduction of a plurality of clips of which the photographing times are continuous from the start at the same time and displaying moving images cut out from wide-angle moving images of the clips to be aligned on one screen.

In the example illustrated in FIG. 18, three clips which are clip #1 to clip #3 are reproduced from start time t1, t2, and t3 at the same time.

In addition, as indicated by the tips of white arrows, moving images of the ranges represented by frames F21 to F23 are cut out from the wide-angle moving images of clips #1 to #3 and are displayed to be aligned on one screen. The ranges represented by the frames F21 to F23 are ranges, which have the same size, disposed in the same direction.

A solid-line arrow A1 illustrated on the left side in FIG. 18 represents the traveling direction when clip #1 is photographed. A solid-line arrow A2 illustrated on the center in FIG. 18 and a solid-line arrow A3 illustrated on the right side therein represent traveling directions when clips #2 and #3 are photographed. The traveling direction is specified, for example, based on data of the acceleration or the angular velocity included in the sensor data. All the ranges represented by the frames F21 to F23 are the same range in the traveling direction at the time of performing photographing.

Since the clips are divided at each same time interval, moving images of the same range each acquired by shifting the time by a time that is the same as the reproduction time of a corresponding clip are aligned to be displayed on one screen.

The direction that is used as the reference for the cutting-out range of a moving image is not limited to the traveling direction at the time of performing photographing. For example, the moving image may be configured to be cut out with the direction of the sound source being used as the reference, or the moving image may be configured to be cut out with the direction in which a specific person is present being used as the reference.

<Example of UI of Time Shift Reproduction>

Figure 19:
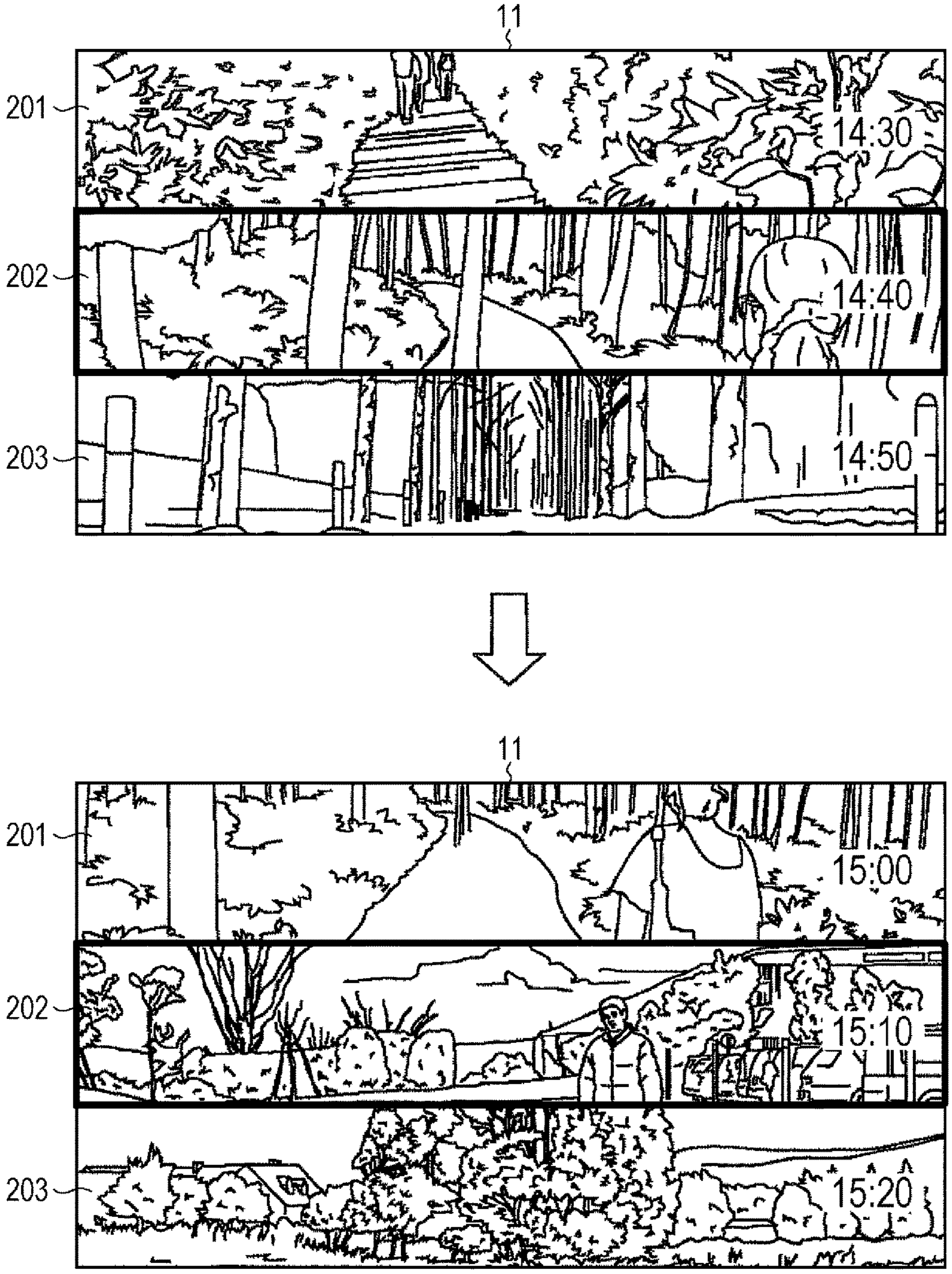
FIG. 19 is a diagram illustrating an example of a time shift reproduction screen.

FIG. 19 is a diagram illustrating an example of the time shift reproduction screen.

The time shift reproduction screen illustrated in FIG. 19 is displayed, for example, when a predetermined event is selected from the event selection screen illustrated in FIG. 4. When the event is selected, for example, reproduction of three clips, of which the photographing times are continuous, among clips belonging to the event is started.

In the time shift reproduction screen illustrated on the upper side in FIG. 19, the display 11 is divided in the vertical direction into three parts, and band-shaped moving image display areas 201 to 203 are sequentially formed from the upper side.

In the moving image display area 201, a moving image cut out from a wide-angle moving image of a clip of which the photographing time is “14:30” is displayed. In addition, in the moving image display area 202, a moving image cut out from a wide-angle moving image of a clip of which the photographing time is “14:40” is displayed. In the moving image display area 203, a moving image cut out from a wide angle moving image of a clip of which the photographing time is “14:50” is displayed. On the right end of each display area, information of the photographing time is displayed to overlap the moving image.

When a predetermined time elapses after the start of reproduction of each clip, each moving image is upwardly scrolled, and, as represented on the screen illustrated on the lower side, the moving images displayed in the moving image display areas 201 to 203 are switched.

In the moving image display area 201 of the time shift reproduction screen illustrated on the lower side, a moving image cut out from a wide-angle moving image of a clip of which the photographing time is “15:00” is displayed. The clip of which the photographing time is “15:00” is a clip that is continuous to the clip that is displayed in the bottommost moving image display area 203 of the time shift reproduction screen illustrated on the upper side.

In addition, in the moving image display area 202 of the time shift reproduction screen illustrated on the lower side, a moving image cut out from a wide-angle moving image of a clip of which the photographing time is “15:10” is displayed. Furthermore, in the moving image display area 203, a moving image cut out from a wide-angle moving image of a clip of which the photographing time is “15:20” is displayed.

The switching between the moving images may be configured to be performed when the reproduction of each clip completed up to the end or when a predetermined time such as three minutes elapses. Furthermore, the timing for switching between moving images may be set by the user.

For example, the moving images displayed in the moving image display areas 201 to 203 are switched also when a drag operation in the vertical direction is performed by the user. When a drag operation in the upward direction corresponding to three moving images is performed in the state in which the time shift reproduction screen illustrated on the upper side of FIG. 19 is displayed, the display of the time shift reproduction screen is switched to the screen illustrated on the lower side of FIG. 19.

Figure 20:
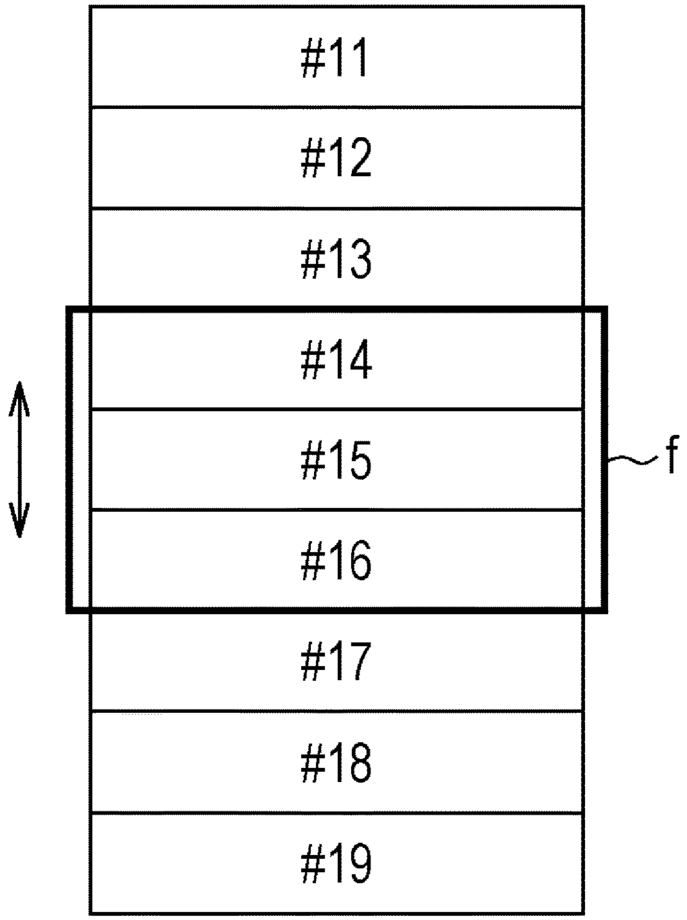
FIG. 20 is a diagram illustrating switching of the time shift reproduction screen.

FIG. 20 is a diagram illustrating switching of the time shift reproduction screen.

The switching of the time shift reproduction screen is performed by vertically aligning moving images cut out from a wide-angle moving image of each clip in the order of time scale and moving a frame f enclosing three moving images thereof in the vertical direction in accordance with a user's operation or in the downward direction for every predetermined time. The moving images enclosed by the frame f are respectively displayed in the moving image display areas 201 to 203.

For example, when a predetermined time elapses after the start of the display of moving images cut out from the wide-angle moving images of clips #11 to #13, moving images cut out from wide-angle moving images of clips #14 to #16 represented to be enclosed by the frame f are displayed. In addition, when a predetermined time elapses after the start of the display of moving images cut out from the wide-angle moving images of clips #14 to #16, moving images cut out from wide-angle moving images of clips #17 to #19 displayed. The clips #11 to #19 are clips of which the photographing times are continuous.

By using the above-described time shift reproduction function, the user can view a plurality of clips concurrently. Thus, compared to a case where one clip is viewed at one time, the user can efficiently view wide-angle moving images.

In a case where one of clips is selected by tapping on a moving image displayed in the time shift reproduction process, a moving image cut out from the wide-angle moving image of the selected clip is displayed on the entire display 11 as illustrated in FIG. 6.

For example, in a case where a tapping operation is performed for a moving image displayed in the moving image display area 201 of the time shift reproduction screen illustrated on the upper side of FIG. 19, a moving image cut out from the wide-angle moving image of a clip of which the photographing time is "14:30" is displayed as illustrated in FIG. 6. The cutting-out range from the wide-angle moving image, for example, is a range that includes the range displayed in the moving image display area 201.

In this way, the user can display the moving image of a selected clip on the display 11 in an enlarged scale by viewing the time shift reproduction screen illustrated in FIG. 19 and selecting a clip when there is the clip desired to be checked in detail.

<Time Shift Reproduction Process>

Figure 21:
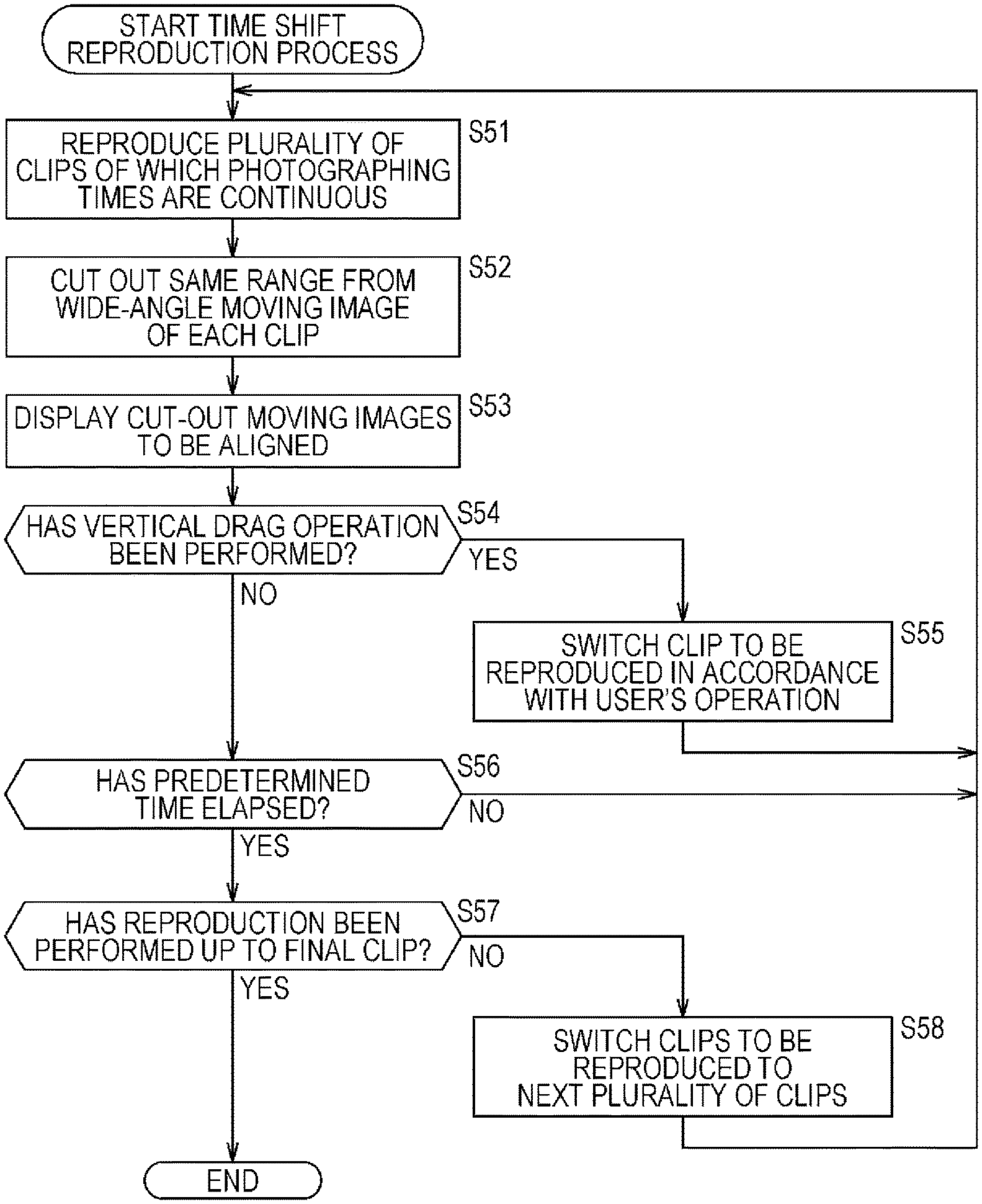
FIG. 21 is a flowchart illustrating a time shift reproducing process.

Here, the time shift reproduction process of the information processing apparatus 1 will be described with reference to a flowchart illustrated in FIG. 21. The process illustrated in FIG. 23, for example, is started when a predetermined event is selected from the event selection screen illustrated in FIG. 4.

In Step S51, the reproduction unit 114 sequentially selects a plurality of clips of which the photographing times are continuous in the ascending order of the photographing time from among a plurality of clips belonging to the selected event and sequentially reproduces the selected clips. The reproduction unit 114 outputs the data of the wide-angle moving image of each clip acquired through the reproduction process to the information processing unit 115.

In Step S52, the cutout unit 133 cuts out a moving image of the same range from the wide-angle moving image of each clip. The data of the moving image cut out from the wide-angle moving image of each clip is supplied to the display control unit 116.

In Step S53, the display control unit 116 displays moving images cut out from the wide-angle moving images of the clips, as illustrated in FIG. 19, to be aligned in the moving image display areas.

In Step S54, the reproduction unit 114 determines whether or not a drag operation in the vertical direction is performed by the user.

In a case where it is determined that the drag operation in the vertical direction has been performed in Step S54, the reproduction unit 114 switches a clip to be reproduced in accordance with a user's operation in Step S55. The reproduction unit 114 returns the process to Step S51, starts the reproduction of a plurality of clips that are newly selected and performs the subsequent process.

On the other hand, in a case where it is determined that the drag operation in the vertical direction has not been performed in Step S54, the reproduction unit 114 determines whether or not a predetermined time has elapsed after the start of reproduction in Step S56. In a case where it is determined that the predetermined time has not elapsed after the start of reproduction in Step S56, the reproduction unit 114 returns the process to Step S51 and resumes the reproduction of the clip that is in the middle of the reproduction process.

On the other hand, in a case where it is determined that the predetermined time has elapsed after the start of reproduction in Step S56, the reproduction unit 114 determines whether or not the reproduction has been performed up to the last clip belonging to the event selected by the user in Step S57.

In a case where it is determined that the reproduction has not been performed up to the last clip in Step S57, the reproduction unit 114 switches a clip to be reproduced to a plurality of clips following the clip that has been reproduced until then in Step S58.

Thereafter, the reproduction unit 114 returns the process to Step S51, starts to reproduce a plurality of clips that have been newly selected, and performs the subsequent process. On the other hand, in a case where it is determined that the reproduction has been performed up to the last clip in Step S57, the process ends.

According to the process described above, compared to a case where one clip is viewed at a time, the user can efficiently view the moving image having a wide angle of view.

Instead of displaying the moving images cut out from the wide-angle moving images at the time of performing the time shift reproduction, a screen as illustrated in FIG. 19 may be displayed by using thumbnail moving images of the clips that have been generated in advance.

<Another Example of UI for Time Shift Reproduction>

Figure 22:
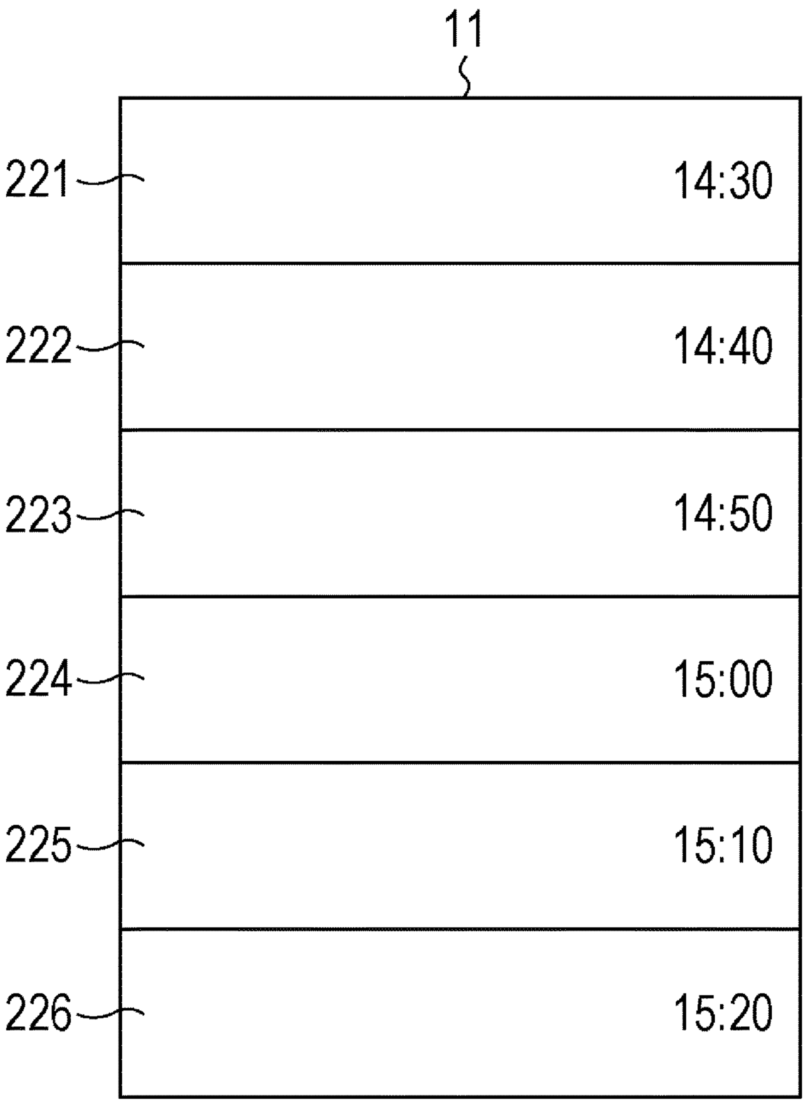
FIG. 22 is a diagram illustrating another example of the time shift reproduction screen.

FIG. 22 is a diagram illustrating another example of the time shift reproduction screen.

In the example illustrated in FIG. 22, the display 11 is divided into 6 parts in the vertical direction, whereby moving image display areas 221 and 226 are formed. In the moving image display areas 221 to 226, moving images cut out from wide-angle moving images of six clips of which the photographing times are continuous are displayed. For example, a moving image cut out from a wide-angle moving image of a clip of which the photographing time is "14:30" is displayed in the uppermost moving image display area 221, and moving images cut out from wide-angle moving images of clips following the clip are displayed in the moving image display areas 222 to 226.

In this way, the number of moving images aligned to be displayed on one screen may be configured to be three or more. For example, when the user changes the orientation of the information processing apparatus 1 from horizontal to vertical, the time shift reproduction screen is switched from the screen illustrated in FIG. 19 to the screen illustrated in FIG. 22.

Figure 23:
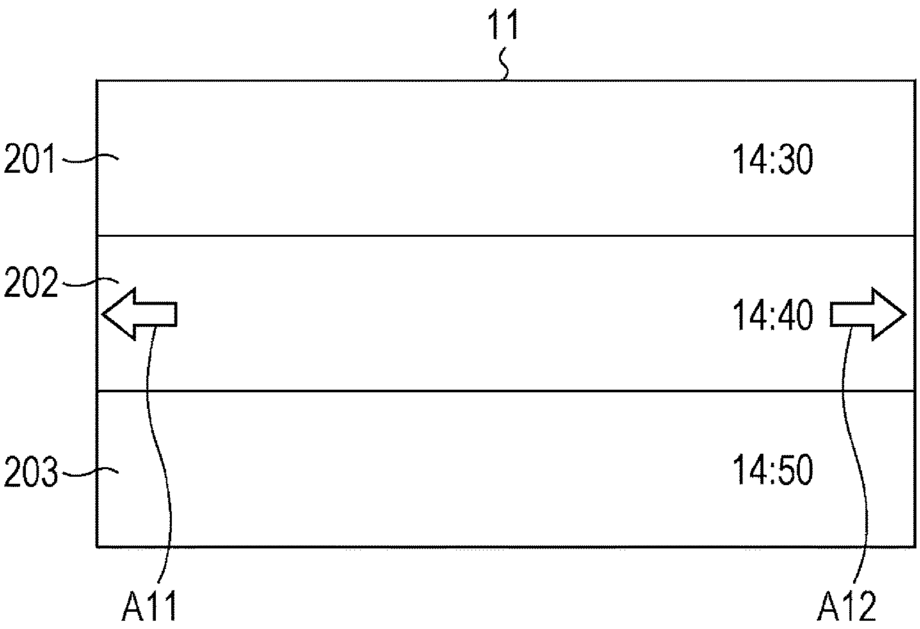
FIG. 23 is a diagram illustrating an example of changing reproduction time.

FIG. 23 is a diagram illustrating an example of changing reproduction time.

The time shift reproduction screen illustrated in FIG. 23 is the same as the screen illustrated on the upper side of FIG. 19. In a moving image display area 201, a moving image cut out from a wide-angle moving image of a clip of which the photographing time is "14:30" is displayed. In addition, in a moving image display area 202, a moving image cut out from a wide-angle moving image of a clip of which the photographing time is "14:40" is displayed. In the moving image display area 203, a moving image cut out from a wide angle moving image of a clip of which the photographing time is "14:50" is displayed.

In this state, for example, as denoted by a white arrow A11, in a case where a drag operation in the leftward direction is performed on the moving image of the clip of which the photographing time is "14:40", the reproduction time is rewound only for the clip of which the photographing time is "14:40". In addition, as denoted by a white arrow A12, in a case where a drag operation in the rightward direction is performed, fast forwarding of the reproduction time is performed only for the clip of which the photographing time is "14:40".

In this way, instead of reproducing a plurality of moving images at the same time, the reproduction time may be configured to be designated by the user. In addition, instead of performing rewinding or fast forwarding of the reproduction time only for the clip selected by the user, rewinding or fast forwarding of the reproduction times of a plurality of moving images may be configured to be performed altogether.

In addition, in the description presented above, while a band-shaped moving image cut out from the wide-angle moving image of each clip is displayed, the configuration of the display screen may be appropriately changed.

Figure 24:
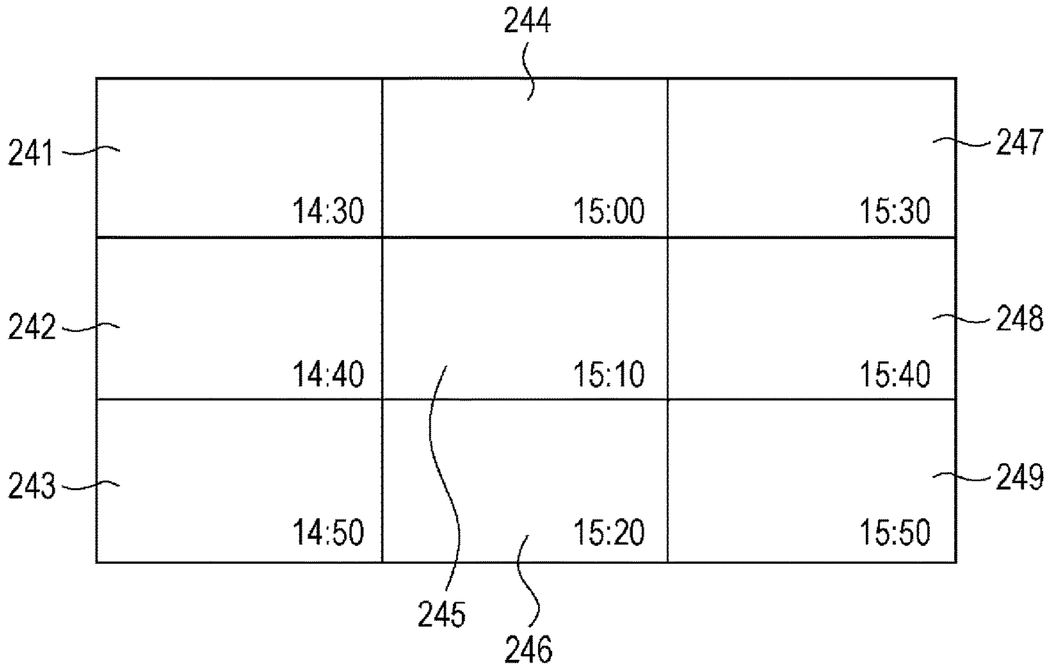
FIG. 24 is a diagram illustrating a further another example of the time shift reproduction screen.

FIG. 24 is a diagram illustrating a further another example of the time shift reproduction screen.

In the example illustrated in FIG. 24, the entire screen is divided into three parts in the vertical direction and is also divided into three parts in the horizontal direction, and nine areas of moving image display areas 241 to 249 are formed as the moving image display areas. In this case, the cutting-out range from the wide-angle moving image is a range having a horizontally-long rectangular shape in which the horizontal length is slightly longer than the vertical length, and moving images of such a range are displayed in the moving image display areas 241 to 249.

In the example illustrated in FIG. 24, a moving image cut out from a wide-angle moving image of a clip of which the photographing time is "14:30" is displayed in the moving image display area 241 disposed on the upper left side. In addition, moving images cut out from wide-angle moving images of eight clips following the clip of which the photographing time is "14:30" are displayed in the moving image display areas 242 to 249.

As above, while moving images of a plurality of clips are displayed on the time shift reproduction screen, various kinds of information relating to the clips other than the photographing time may be configured to be displayed together with the moving images.

Figure 25:
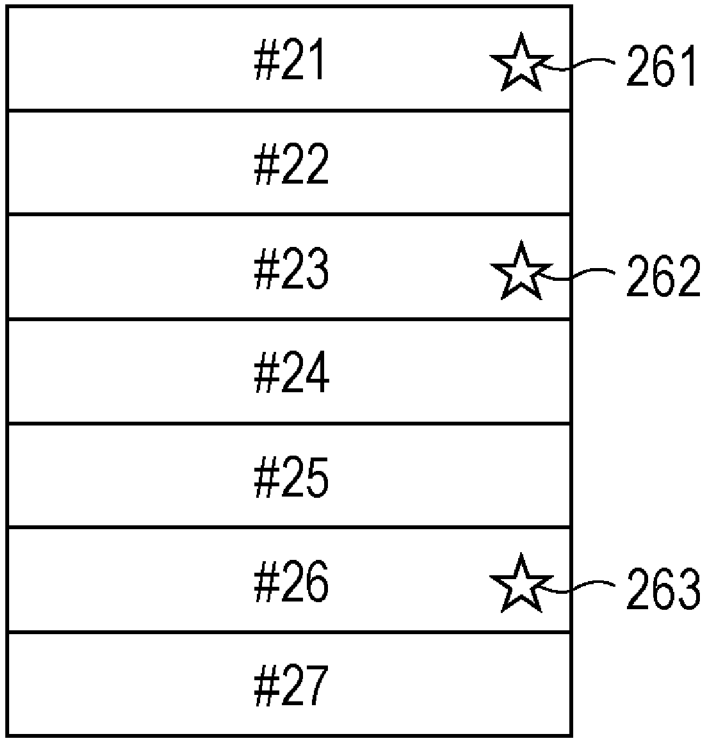
FIG. 25 is a diagram illustrating an example of a case where favorite icons are displayed to overlap moving images.

FIG. 25 is a diagram illustrating an example of a case where favorite icons are displayed to overlap moving images.

In this example, in a case where there are favorite clips while moving images aligned to be displayed are viewed, the user can set the information representing the favorite clips in the clips. The selection of a favorite clip is performed, for example, by performing a predetermined operation such as tapping on a moving image aligned to be displayed for a predetermined time or more.

In a case where a favorite clip is selected, the display control unit 116 displays an icon having a predetermined shape such as a star shape is displayed to overlap the moving image of the selected clip as a favorite icon. In addition, the information processing unit 115 sets information representing that the clip is selected as a favorite clip as metadata of the clip.

In the example illustrated in FIG. 25, favorite icons 261 to 263 are added to the moving images of the clips #21, #23, and #26 out of the clips #21 to #27.

By displaying favorite icons, for example, when viewing contents of clips by scrolling the time shift reproduction screen, the user can check that a clip was set as a favorite clip in the past.

For example, the information representing a favorite clip, which is set as the metadata, is used in a case where a digest version of the clip is generated. The content of the digest version is a moving image content that is generated by combining a predetermined number of clips selected from among clips belonging to a specific event.

For example, in a case where an event is selected, and an instruction for generating a digest version is made by the user, the information processing unit 115 generates content by allowing a clip including information representing being selected as a favorite clip in the metadata to be built therein with a high priority level.

In this way, various kinds of information tagged to the metadata of a clip may be configured to be set.

Figure 26:
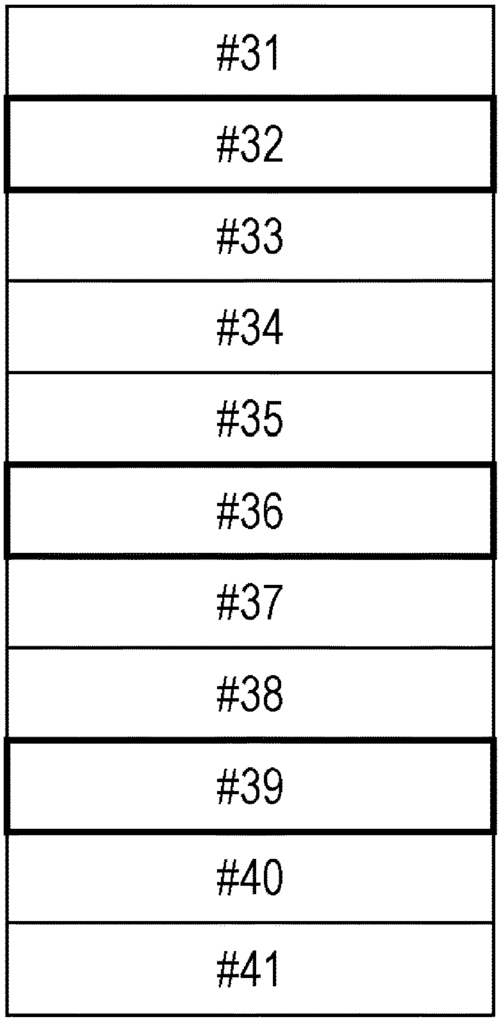
FIG. 26 is a diagram illustrating an example of a case where moving images are displayed to be highlighted.

FIG. 26 is a diagram illustrating an example of a case where moving images cut out from wide-angle moving images of clips including highlighted sections are displayed to be highlighted.

In this example, it is determined whether or not each clip is a clip that includes a highlighted section.

It is determined whether or not a clip includes a highlighted section by the information processing unit 115 based on the number of persons detected by the person detecting unit 131A, the volume level detected by the data analyzing unit 132 based on the audio data, and the like. Clips in which persons corresponding to the number that is a threshold or more are shown up and the like are determined as clips including highlighted sections. For the clip determined to include a highlighted section, the information processing unit 115 sets information representing the inclusion of a highlighted section as metadata.

The display control unit 116 adds a frame image having a predetermined color to the moving image of the clip including the highlighted section and displays the moving image to be highlighted.

In the example illustrated in FIG. 26, among clips #31 to #41, moving images of clips #32, #36, and #39 are displayed to be highlighted.

By displaying the clips to be highlighted, the user can easily check that the clips include highlighted sections at the time of viewing the contents of the clips by scrolling the time shift reproduction screen or the like.

<Multi-Screen Display>

Next, a multi-screen display will be described.

The multi-screen display is a function for setting a plurality of cutting-out ranges for a wide-angle moving image of one clip and displaying a plurality of moving images that have been cut out on one screen.

<First Example of Multi-Screen Display>

Figure 27:
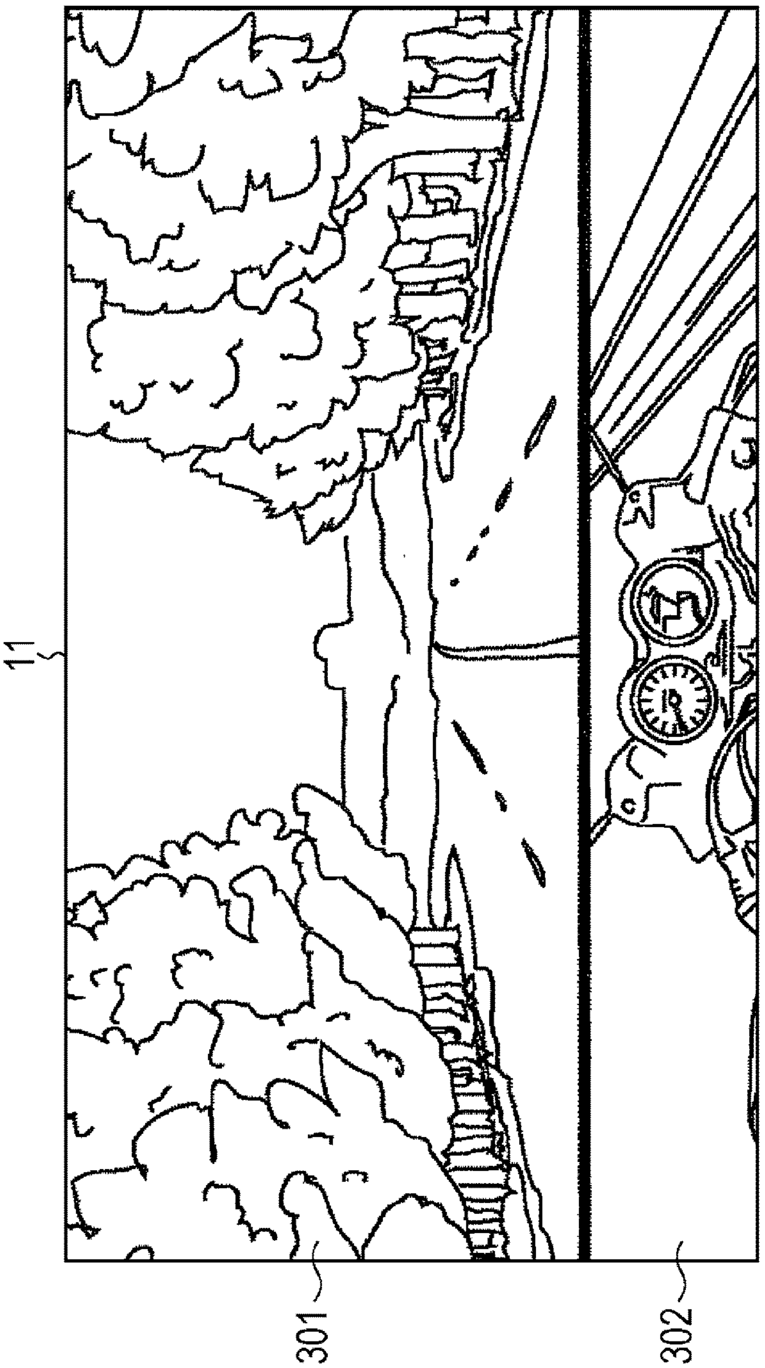
FIG. 27 is a diagram illustrating a first example of a multi-screen display.

FIG. 27 is a diagram illustrating a first example of the multi-screen display.

On the moving image reproduction screen illustrated in FIG. 27, the display 11 is vertically divided into two parts, and areas 301 and 302 are formed. The area 301 is formed on the upper side of the display 11 so as to occupy an about ¾ range of the display 11. The area 302 is formed on the lower side of the area 301.

In the area 301, a moving image having a scene in which trees are present on both sides of an almost straight road as a subject is displayed. In the area 302, a moving image having indicators disposed at the center of the handle of a motorcycle as a subject is displayed. The moving images displayed on the moving image reproduction screen illustrated in FIG. 27 are moving images cut out from wide-angle moving image of a clip photographed during the driving of the motorcycle.

Figure 28:
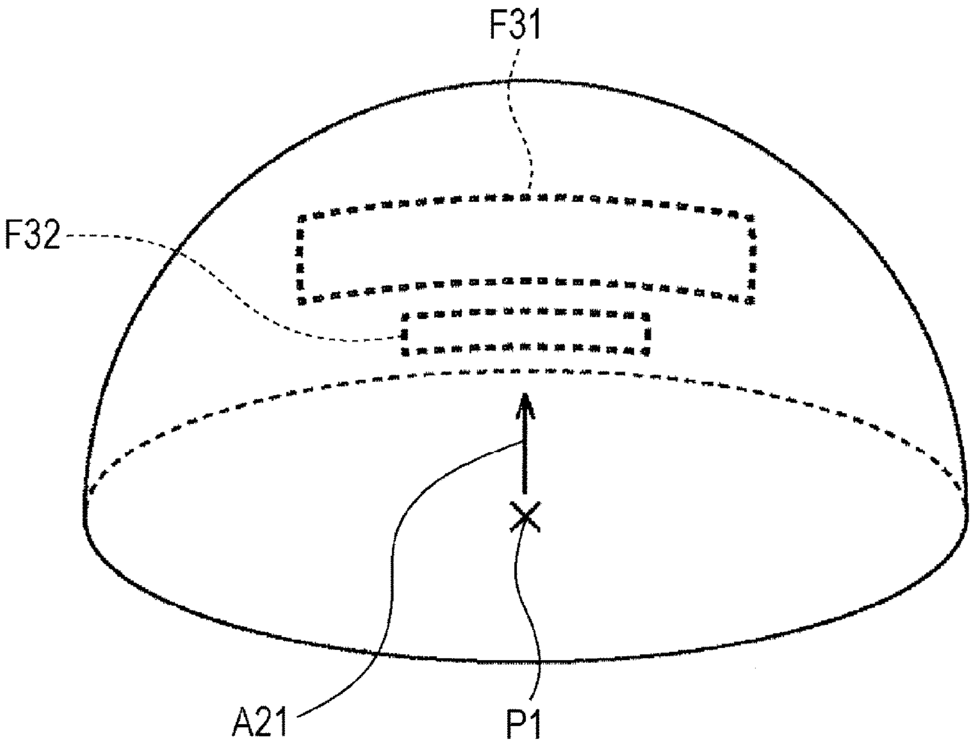
FIG. 28 is a diagram illustrating an example of the cutting-out range of the moving image.

FIG. 28 is a diagram illustrating an example of the cutting-out range of a moving image.

The location P1 that is the photographing location is a location near around the front side of the chest of the driver of the motorcycle. An arrow A21 represents the traveling direction during the photographing process.

In this case, the cutout unit 133 sets a range of a horizontally-long rectangular shape having almost the same aspect ratio as that of the area 301, as represented by a frame F31, as a cutting-out range. The cutting-out range represented by the frame F31, for example, is set to include a subject that is present in the traveling direction in the middle of a photographing process, has a large motion, and is located far. The cutout unit 133 assigns the area 301 as a moving image display area having a front scene in the traveling direction, which is cut out from the range represented by the frame F31, as a subject.

In addition, the cutout unit 133 sets a band-shaped range having almost the same aspect ratio as that of the area 302, which is represented by a frame F32, as a cutting-out range. The cutting-out range represented by the frame F32, for example, is set to include a subject that is present in the traveling direction during the photographing process, has a small motion, and is located nearby. The cutout unit 133 assigns the area 302 as a moving image display area having indicators cut out from the range represented by the frame F32 as a subject.

In this example, the setting of the cutting-out range of the moving image and the assigning of the cut-out moving image to the display area are performed based on the traveling direction during the photographing process, the amount of the motion of the subject, and a distance to the subject.

In other words, a moving image in the traveling direction during the photographing process that includes a subject having a large motion and being located far is assigned to the area 301 that is a wide area. In addition, a moving image in the traveling direction during the photographing process that includes a subject having a small motion and being located nearby is assigned to the area 302 that is a narrow area. The traveling direction during the photographing process is specified based on the sensor data including the angular velocity and the acceleration detected during the photographing process. In addition, the amount of the motion of the subject and the distance to the subject are specified by analyzing the wide-angle moving image.

In addition, the number and the shape of the cutting-out ranges, for example, are determined in accordance with the area layout of the moving image reproduction screen that is selected by the user. The user selects a preferred area layout from among a plurality of layouts prepared in advance before or after a clip that is a target for a multi-screen display is selected.

By displaying such a screen, the user can view and compare the front scene and the motions of the indicators viewed during the driving. In addition, since the front scene and the motions of the indicators are interesting subjects to the user looking back the views during the driving, compared to a case where the entire photographing range of a wide-angle moving image during the driving is displayed, the user can efficiently view the wide-angle moving image.

By performing an operation on the moving image displayed in each area, the user can change the cutting-out range of the moving image. For example, in a case where a tapping on a moving image displayed in the area 301 is made, a moving image including the range represented by the frame F31 is cut out from the same wide-angle moving image and is displayed on the entirety of the display 11 as illustrated in FIG. 6. By performing a drag operation on the screen illustrated in FIG. 6 having a front scene during the driving being displayed fully therein, the user also can check a preferred scene other than the front scene.

In addition, in a case where a drag operation is performed for the moving image displayed in the area 301, the range represented by the frame F31 moves in accordance with the drag operation, and a moving image of another range is cut out from the wide-angle moving image. The cut-out moving image is displayed in the area 301.

In a case where a pinch-out/pinch-in operation is performed for the moving image displayed in the area 301, the size of the range represented by the frame F31 is changed with the aspect ratio being maintained, and a moving image of a range having a different angle of view is cut out from the wide-angle moving image. The cut-out moving image is displayed in the area 301.

Also for the moving image displayed in the area 302, similarly, the display is switched in accordance with a user's operation. This is similarly applied to moving images of the other screens of the multi-screen display to be described later.

<Second Example of Multi-Screen Display>

Figure 29:
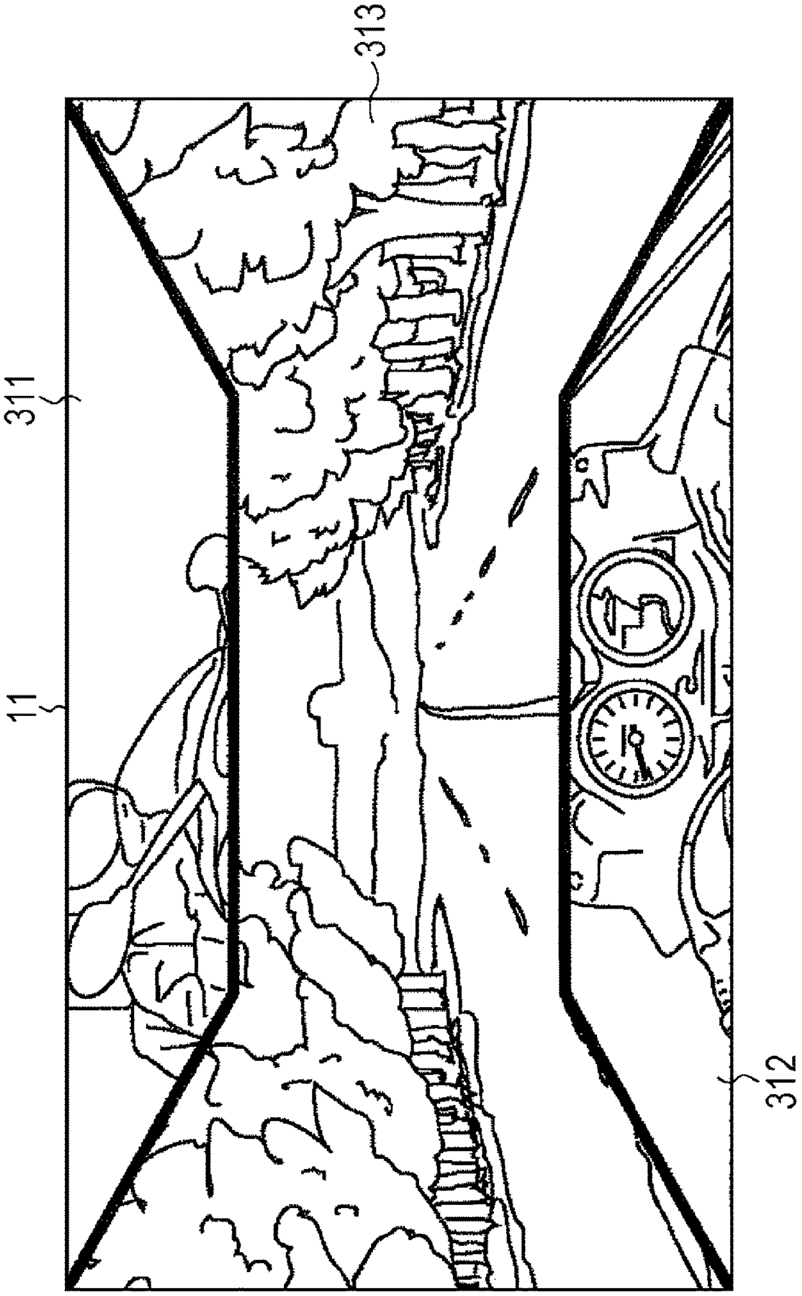
FIG. 29 is a diagram illustrating a second example of the multi-screen display.

FIG. 29 is a diagram illustrating a second example of the multi-screen display.

A moving image reproduction screen illustrated in FIG. 29 is configured by an area 311 that is a trapezoidal area, an area 312 that is a trapezoidal area facing the area 311, and an area 313 that is the other area.

The area 311 is a trapezoidal area having the upper side of the display 11 as the lower base and the upper base having a length of about a half of the lower base and is formed on the upper side of the display 11. The area 312 is a trapezoidal area having the lower side of the display 11 as the lower base and the upper base having a length of about a half of the lower base and is formed on the lower side of the display 11. The height of the areas 311 and 312 is about ¼ of the length of the display in the vertical direction, and the upper bases thereof are separated from each other by a predetermined distance.

In the area 311, a moving image having a driver of a motorcycle as a subject is displayed. In addition, in the area 312, a moving image having indicators disposed at the center of the handle of the motorcycle as a subject is displayed. In the area 313 that is an area interposed between the areas 311 and 312, a moving image having a scene on which trees are present on both sides of an almost straight road as a subject is displayed. The moving images displayed on the moving image reproduction screen illustrated in FIG. 29 are moving images cut out from a wide-angle moving image of a clip that is photographed during the driving of the motorcycle.

Figure 30:
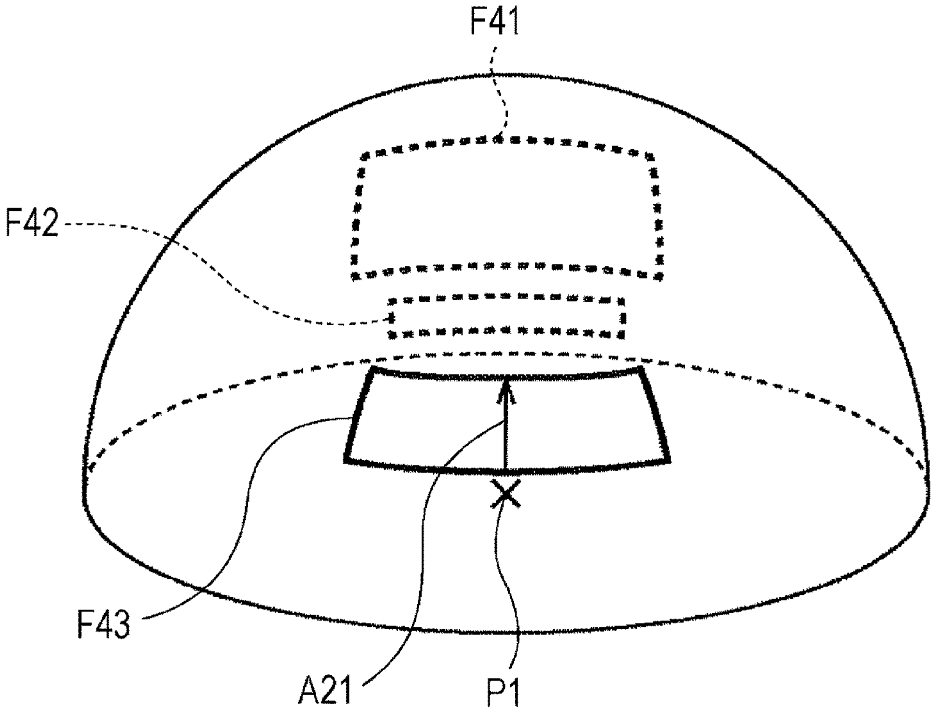
FIG. 30 is a diagram illustrating an example of the cutting-out range of the moving image.

FIG. 30 is a diagram illustrating an example of the cutting-out range of a moving image.

The location P1 that is the photographing location is a location near around the front side of the chest of the driver of the motorcycle. An arrow A21 represents the traveling direction during the photographing process.

In this case, the cutout unit 133 sets a range of a horizontally-long rectangular shape having almost the same aspect ratio as that of the display 11, as represented by a frame F41, as a cutting-out range. The cutting-out range represented by the frame F41, for example, is set to include a subject that is present in the traveling direction in the middle of a photographing process, has a large motion, and is located far. The cutout unit 133 assigns the area 313 as a moving image display area having a front scene in the traveling direction, which is cut out from the range represented by the frame F41, as a subject.

In addition, the cutout unit 133 sets a band-shaped range having almost the same aspect ratio as the ratio between the lower base and the height of the area 312, which is represented by a frame F42, as a cutting-out range. The cutting-out range represented by the frame F42, for example, is set so as to include a subject that is present in the traveling direction, which is during the photographing process, has a small motion, and is located nearby. The cutout unit 133 assigns the area 312 as a moving image display area having indicators cut out from the range represented by the frame F42 as a subject.

The cutout unit 133 sets a band-shaped range having almost the same aspect ratio as the ratio between the lower base and the height of the area 311, as represented by a frame F43, as a cutting-out range. The cutting-out range represented by the frame F43, for example, is set to include a subject that is present in a direction opposite to the traveling direction in the middle of a photographing process and is a person having a small motion and is located nearby. The cutout unit 133 assigns the area 311 as a moving image display area, which is cut out from the range represented by the frame F43, having the driver as a subject.

In this example, the setting of the cutting-out range of the moving image and the assigning of the cut-out moving image to the display area are performed based on the traveling direction during the photographing process, the amount of the motion of the subject, a distance to the subject, and the location of the person.

In other words, a moving image in the traveling direction during the photographing process that includes a subject having a large motion and being located far is assigned to the area 313 that is a wide area. In addition, a moving image in the traveling direction during the photographing process that includes a subject having a small motion and being located nearby is assigned to the area 312 that is a narrow area. Furthermore, a moving image including a subject in a direction opposite to the traveling direction during the photographing process and a person having a small motion and being located nearby is assigned to the area 311 that is a narrow area.

By displaying the screen having such an area layout, the information processing apparatus 1 can emphasize the depth feeling (speed feeling) of the clip.

In addition, the user can view and compare the front scene viewed during the driving, the motions of the indicators, and the state of the driver. Thus, compared to a case where the entire photographing range of a wide-angle moving image during the driving is viewed, the user can efficiently view the moving image having a wide angle of view.

The configuration of the screen may be configured to be changed in accordance with the moving speed during the photographing process that is specified based on the sensor data. For example, in a case where the moving speed during the photographing process is a threshold speed or more, the information processing apparatus 1 changes the configuration of the screen illustrated in FIG. 29 by broadening the trapezoidal area or the like. In this way, the information processing apparatus 1 can emphasize the impression received by the user such as a depth feeling in accordance with the moving speed.

<Third Example of Multi-Screen Display>

Figure 31:
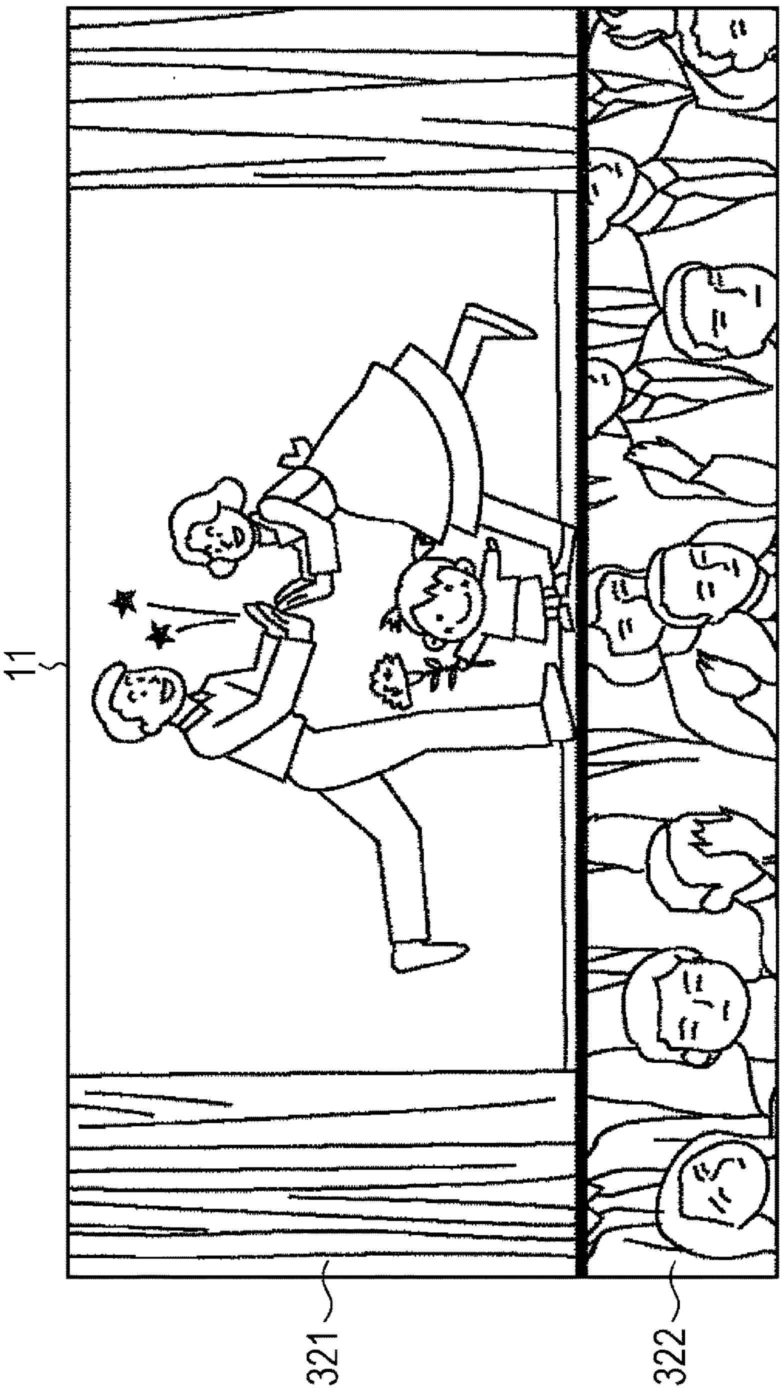
FIG. 31 is a diagram illustrating a third example of the multi-screen display.

FIG. 31 is a diagram illustrating a third example of the multi-screen display.

On the moving image reproduction screen illustrated in FIG. 31, similar to the screen illustrated in FIG. 27, the display 11 is vertically divided into two parts, and areas 321 and 322 are formed.

In the area 321, a moving image having performers of a theatrical performance as subjects is displayed. In the area 322, a moving image having audiences of the theatrical performance as subjects is displayed. In other words, the moving images displayed on the moving image reproduction screen illustrated in FIG. 31 are moving images cut out from a wide-angle moving image of a clip photographed in the middle of the theatrical performance.

Figure 32:
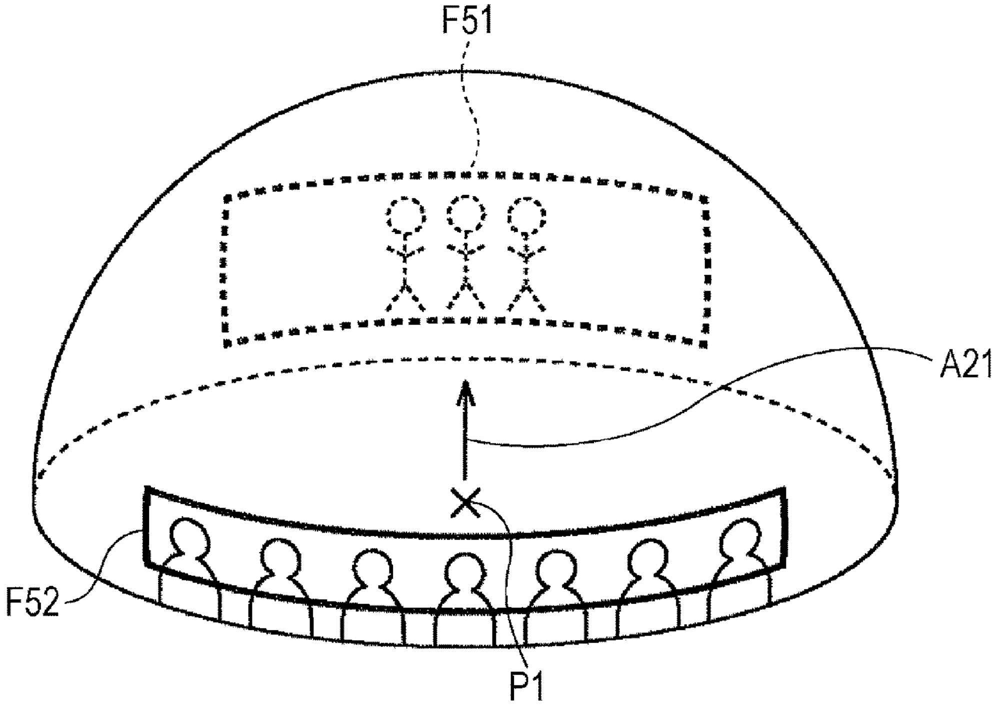
FIG. 32 is a diagram illustrating an example of the cutting-out range of the moving image.

FIG. 32 is a diagram illustrating an example of the cutting-out range of a moving image.

A location P1 that is the photographing location is a location between the stage of the theatrical performance and audience seats. An arrow A21 represents the direction of the stage.

In this case, the cutout unit 133 sets a range of a horizontally-long rectangular shape having almost the same aspect ratio as that of the area 321, as represented by a frame F51, as a cutting-out range. The cutting-out range represented by the frame F51, for example, is set to include a subject that has a large motion and is in the direction of a sound source. The cutout unit 133 assigns the area 321 as a moving image display area having the performers on the stage, which is cut out from the range represented by the frame F51, as subjects.

In addition, the cutout unit 133 sets a band-shaped range having almost the same aspect ratio as that of the area 322, which is represented by a frame F52, as a cutting-out range. The cutting-out range represented by the frame F52, for example, is set so as to include a subject that has a large motion and is present in a direction opposite to a subject that is present in the direction of a sound source and a person having a small motion as subjects. The cutout unit 133 assigns the area 322 as a moving image display area having audiences cut out from the range represented by the frame F52 as subjects.

In this example, the setting of the cutting-out range of the moving image and the assigning of the cut-out moving image to the display area are performed based on the direction of the sound source during the photographing process and the amount of the motion of the subject.

In other words, a moving image including a subject in the direction of a sound source during the photographing process and a subject having a large motion is assigned to the area 301 that is a wide area. In addition, a moving image including a subject in a direction opposite to the sound source during the photographing process and a subject having a small motion is assigned to the area 302 that is a narrow area. The direction of a sound source during the photographing process is specified based on the audio data of a clip. In addition, the amount of the motion of the subject is specified by analyzing the wide-angle moving image.

By displaying such a screen, the user can view and compare the contents of the theatrical performance and the state of the audiences. In addition, compared to a case where the entire photographing range during the theatrical performance is viewed, the user can efficiently view the wide-angle moving image.

<Fourth Example of Multi-Screen Display>

Figure 33:
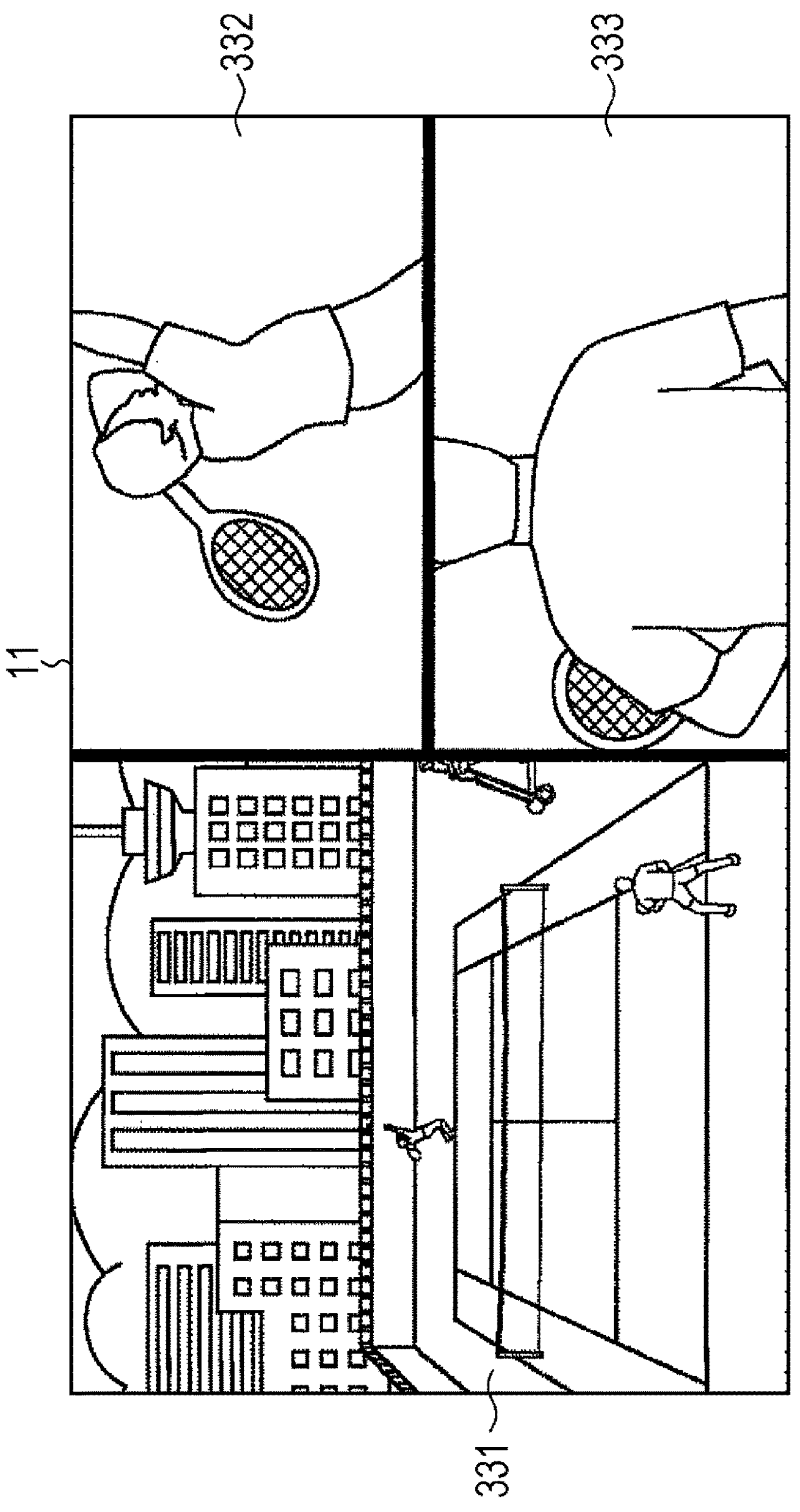
FIG. 33 is a diagram illustrating a fourth example of the multi-screen display.

FIG. 33 is a diagram illustrating a fourth example of the multi-screen display.

On a moving image reproduction screen illustrated in FIG. 33, the display 11 is horizontally divided into two parts, and only the right half thereof is vertically divided into two parts, whereby areas 331 to 333 are formed. The area 331 is formed on the left half of the display 11 so as to occupy an approximate half range of the display 11. The area 332 is formed on the upper right side of the display 11 so as to occupy an about ¼ range of the display 11. The area 333 is formed on the lower side of the area 332.

In the area 321, a moving image having a tennis court in which there are two players as a subject is displayed. In the areas 332 and 333, moving images each having the player as a subject are displayed. The moving images displayed on the moving image reproduction screen illustrated in FIG. 33 are moving images that are respectively cut out from a wide-angle moving image of a clip photographed during a tennis game.

Figure 34:
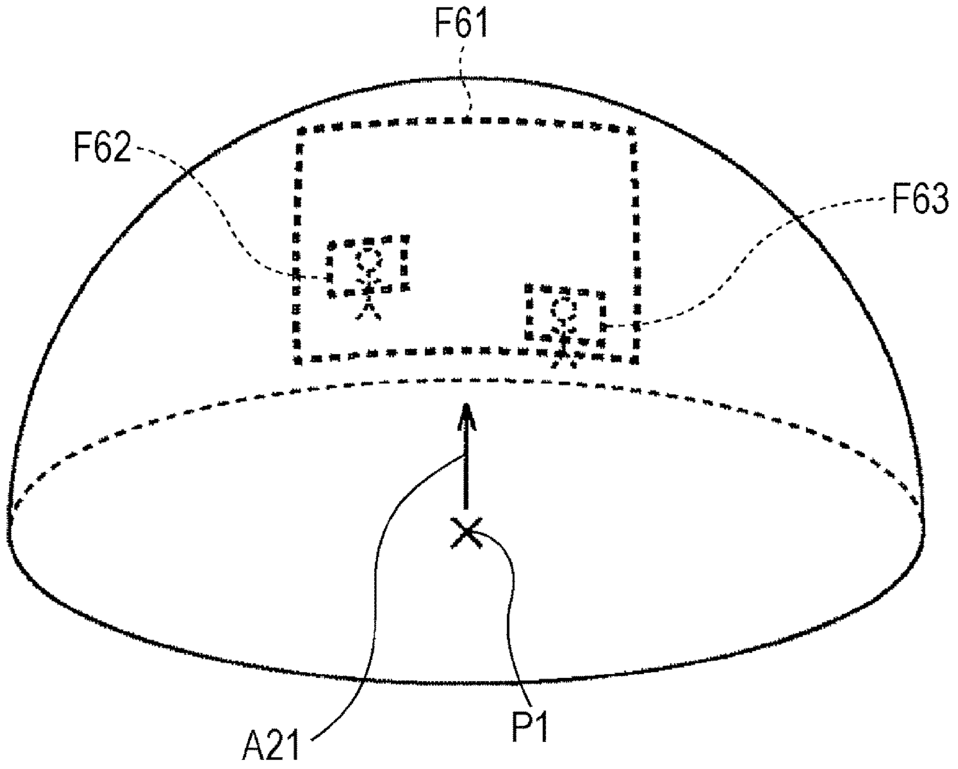
FIG. 34 is a diagram illustrating an example of the cutting-out range of the moving image.

FIG. 34 is a diagram illustrating an example of the cutting-out range of a moving image.

A location P1 that is the photographing location is a location of an audience seat from which the entire tennis court can be looked down. An arrow A21 represents the direction of the tennis court.

In this case, the cutout unit 133 sets a range of a rectangular shape having almost the same aspect ratio as that of the area 331, as represented by a frame F61, as a cutting-out range. The cutting-out range represented by the frame F61, for example, is set to include two persons having a large motion. The cutout unit 133 assigns the area 331 as a moving image display area having the entire tennis court, which is cut out from the range represented by the frame F61, as a subject.

In addition, the cutout unit 133 sets a rectangular range having almost the same aspect ratio as that of the area 332, which is represented by a frame F62, as a cutting-out range. A moving image of a part of the range within the cutting-out range represented by the frame F61 is cut out. The cutting-out range represented by the frame F62, for example, is set so as to include a person who has a large motion and is located far as a subject. The cutout unit 133 assigns the area 332 as a moving image display area having a player relatively located far out of the two players, which is cut out from the range represented by the frame F62, as a subject.

The cutout unit 133 sets a rectangular range having almost the same aspect ratio as that of the area 333, which is represented by a frame F63, as a cutting-out range. The cutting-out range represented by the frame F63, for example, is set so as to include a person who has a large motion and is located nearby as a subject. The cutout unit 133 assigns the area 333 as a moving image display area having a player relatively located nearby out of the two players, which is cut out from the range represented by the frame F63, as a subject.

In this example, the setting of the cutting-out range of the moving image and the assigning of the cut-out moving image to the display area are performed based on the amount of the motion of the subjects and the location of the persons. In addition, the cutting-out ranges are set so as to cut a wide range and a part of the range therein.

As described above, in the metadata of each clip, the person ID of a person shown up in the wide-angle moving image and the person location information are set in association with time information.

The cutting-out range represented by the frame F62 is set by tracking the motion of the same person based on the person location information. Similarly, the cutting-out range represented by the frame F63 is set by tracking the motion of the same person based on the person location information.

In this way, the same person is continuously displayed in the area 332, and the same person is continuously displayed in the area 333.

By displaying the moving image having a wide angle of view and a moving image relating to a part of the moving image to be aligned, the user can view and compare the appearance of the entire tennis court and the states of the two players. In addition, compared to a case where each one clip is viewed, the user can efficiently view the moving image having a wide angle of view as in a case where, after the moving image having a wide angle of view is viewed, the moving image relating to the player is viewed.

<Fifth Example of Multi-Screen Display>

Figure 35:
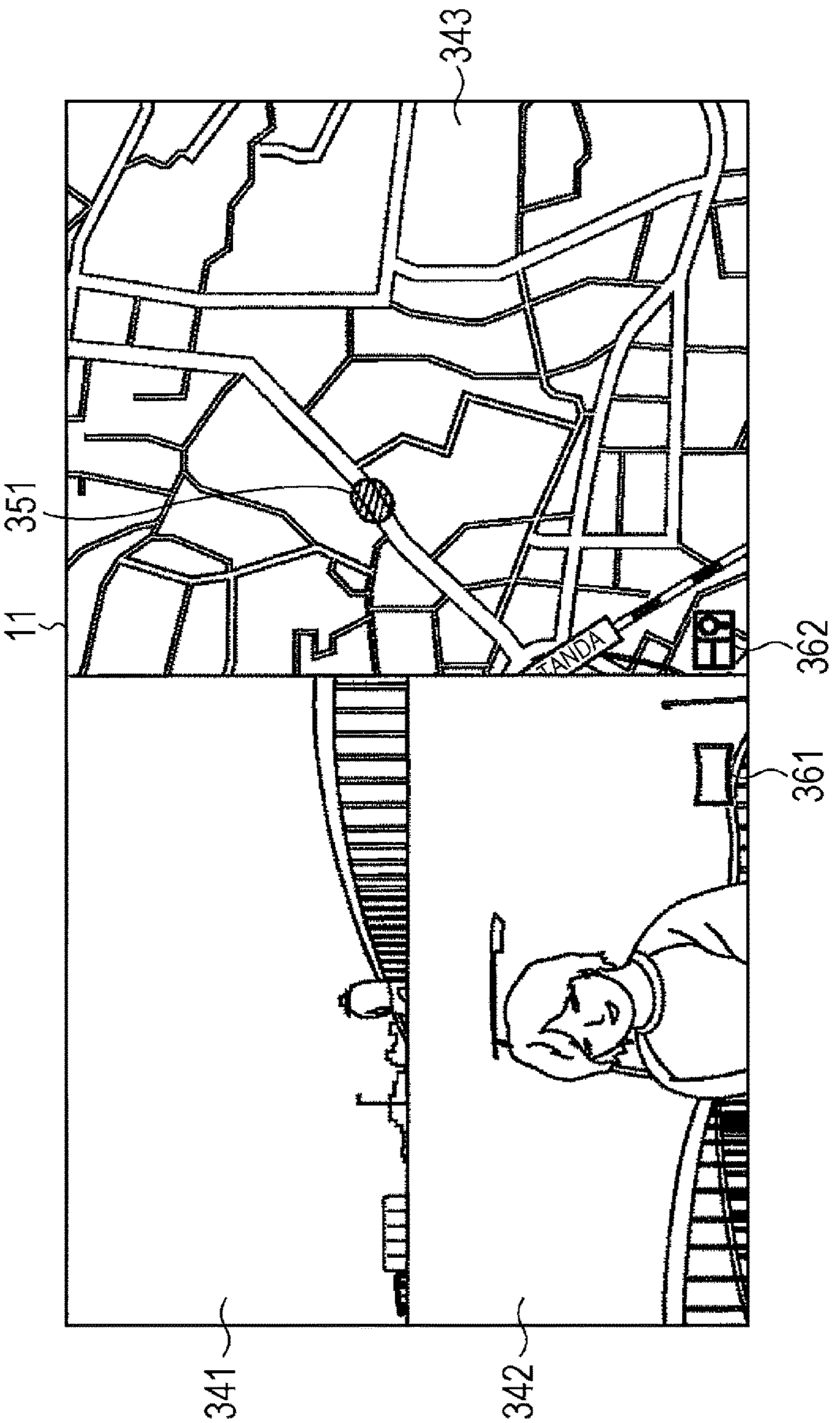
FIG. 35 is a diagram illustrating a fifth example of the multi-screen display.

FIG. 35 is a diagram illustrating a fifth example of the multi-screen display.

On a moving image reproduction screen illustrated in FIG. 35, the display 11 is horizontally divided into two parts, and only a left half thereof is vertically divided into two parts, whereby areas 341 to 343 are formed. The area 341 is formed on the upper left side of the display 11 so as to occupy an about ¼ range of the display 11. The area 342 is formed on the lower left side of the display 11 so as to occupy an about ¼ range of the display 11. In addition, the area 343 is formed on a right half of the display 11 so as to occupy an approximately half range of the entire display 11.

In the area 341, a moving image having a scene as a subject is displayed. In the area 342, a moving image having a person riding a bicycle as a subject is displayed. The moving images displayed on the moving image reproduction screen illustrated in FIG. 35 are moving images that are respectively cut out from a wide-angle moving image of a clip photographed during the driving of the bicycle.

The cutting-out ranges of the moving images are almost the same as the cutting-out ranges represented by the frames F41 and F43 illustrated in FIG. 30. A moving image of a range that includes a subject present in the traveling direction during the photographing process and a subject having a large motion and being located far is cut out from the wide-angle moving image and is assigned to the area 341. In addition, a moving image of a range including a subject present in a direction opposite to the traveling direction during the photographing process that has a small motion and being located nearby is assigned to the area 342.

In the area 343, a map downloaded from a server on the Internet or the like is displayed. On the map, an icon 351 is displayed so as to represent the location at the time of performing photographing. As described above, in the metadata of each clip, information that represents the location at the time of performing photographing is included.

In this way, together with the moving image cut out from the wide-angle moving image, various kinds of information relating to the moving image may be displayed. Accordingly, the user can efficiently view the moving image having a wide angle of view while checking the information relating to the moving image.

On the lower center side of the moving image reproduction screen illustrated in FIG. 35, icons 361 and 362 are aligned to be displayed. The icons 361 and 362 are operated when switching between display modes is performed. When the moving image reproduction screen illustrated in FIG. 35 is displayed, only the icon 361 is operable, and the icon 362 is in the non-operable state.

Figure 36:
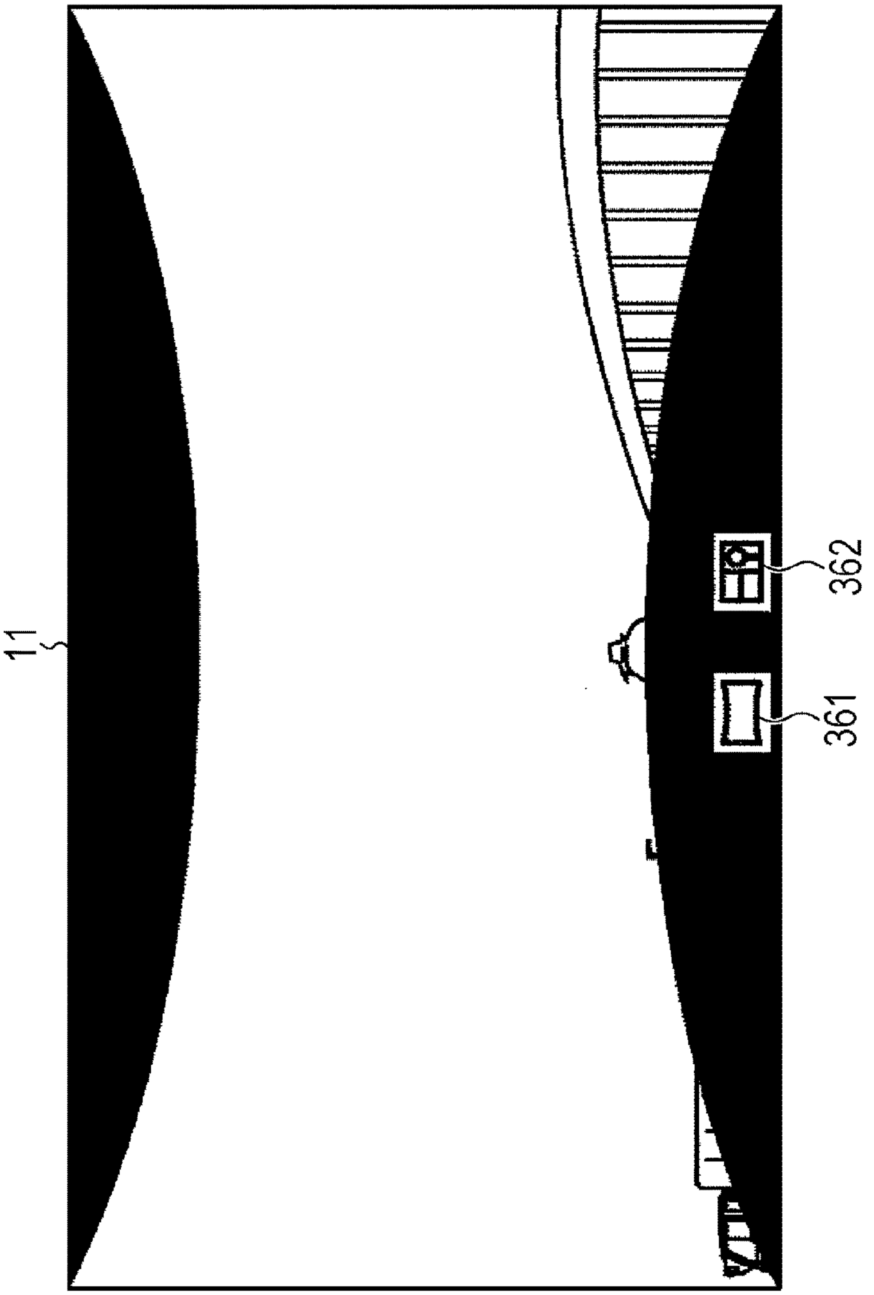
FIG. 36 is a diagram illustrating an example of switching of a moving image reproduction screen illustrated in FIG. 35.

FIG. 36 is a diagram illustrating an example of a screen displayed when the icon 361 is operated in the state in which the moving image reproduction screen illustrated in FIG. 35 is displayed.

When the icon 361 is operated, a moving image that has been displayed in the area 341 of the moving image reproduction screen illustrated in FIG. 35 is displayed on the display 11 in an enlarged scale in the form in which bow-shaped black areas are assigned to the upper and lower sides. According to such a display, the information processing apparatus 1 can also emphasize the depth feeling of a clip.

When the icon 362 is operated in the state in which the moving image reproduction screen illustrated in FIG. 36 is displayed, the display of the display 11 is switched to the moving image reproduction screen illustrated in FIG. 35. When the moving image reproduction screen illustrated in FIG. 36 is display, only the icon 362 is operable, and the icon 361 is in the non-operable state.

<Multi-Screen Display Process>

Figure 37:
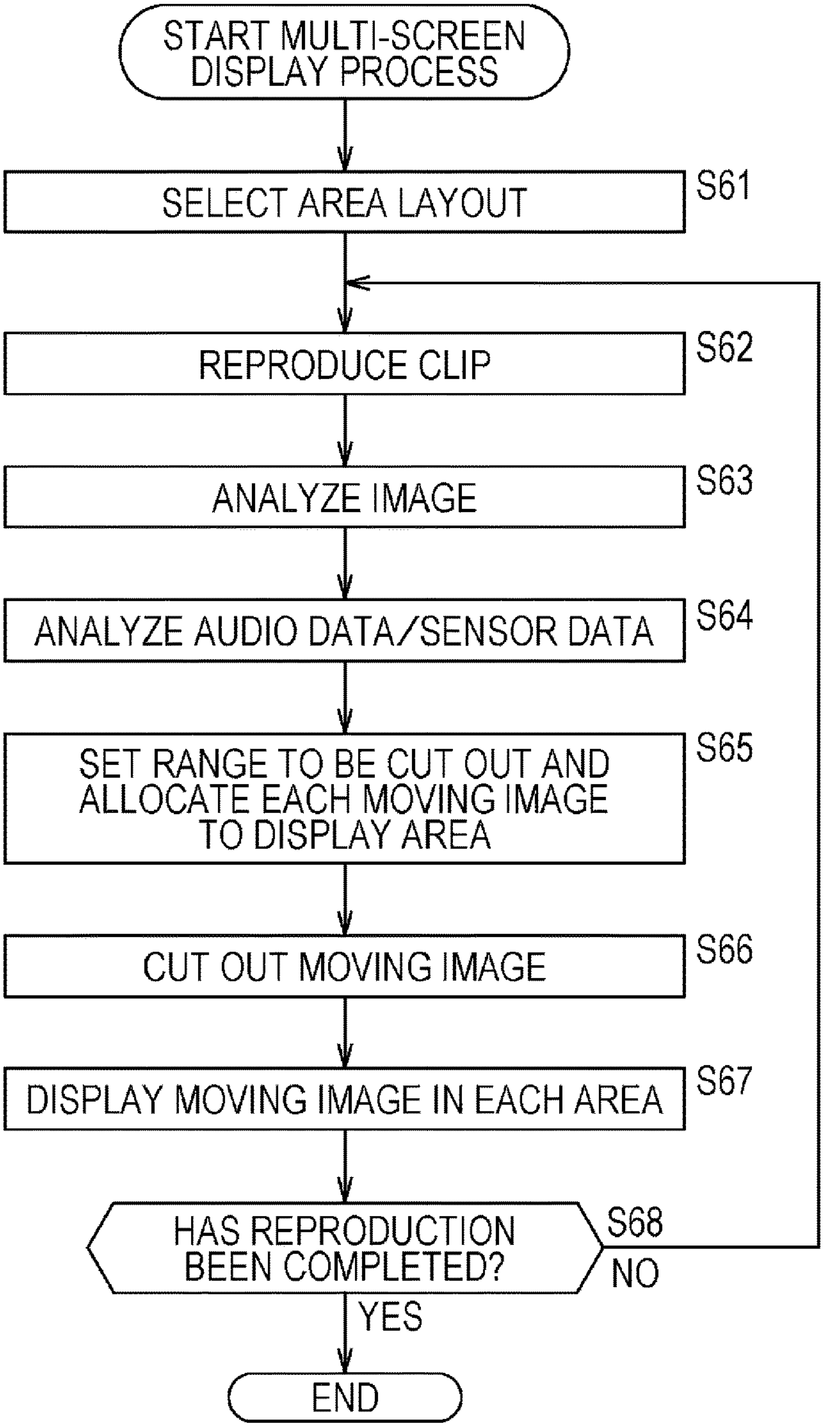
FIG. 37 is a flowchart illustrating a multi-screen display process.

Here, the multi-screen display process of the information processing apparatus 1 will be described with reference to a flowchart illustrated in FIG. 37. The process illustrated in FIG. 37, for example, is started when a clip that is a reproduction target is selected from the clip selection screen illustrated in FIG. 5.

When the clip that is the reproduction target is selected, a selection screen for the area layout is displayed on the display 11. The user can select a preferred area layout from among a plurality of kinds of area layouts displayed on the selection screen.

In Step S61, the cutout unit 133 selects an area layout in accordance with a user's operation for the selection screen. The cutout unit 133 determines the size, the shape, and the number of the ranges in which moving images are cut out from a wide-angle moving image in accordance with the area layout.

In Step S62, the reproduction unit 114 reproduces the clip that is a reproduction target and outputs the data of the wide-angle moving image to the information processing unit 115.

In Step S63, the image analyzing unit 131 analyzes the entire photographing range of the wide-angle moving image. For example, the image analyzing unit 131 specifies the recognition of a scene shown up in the wide-angle moving image, the amount of motion of each subject shown up in the wide-angle moving image, a distance to the subject, and the like. The image analyzing unit 131 outputs the data of the result of the analysis to the cutout unit 133.

In Step S64, the data analyzing unit 132 reads the audio data and the metadata of the clip that is the reproduction target from the clip data storing unit 113 and analyzes the data. For example, by analyzing the audio data, the data analyzing unit 132 specifies the direction of a sound source. In addition, the data analyzing unit 132 specifies the traveling direction during the photographing process based on the data of the angular velocity and the acceleration.

Similar to the detection of a person shown up in the clip, the analyses performed in Steps S63 and S64 may be configured to be performed in advance before the reproduction of the clip. In such a case, the data of the result of the analysis is set as the metadata of each clip.

In Step S65, the cutout unit 133 sets a cutting-out range of the moving image according to the area layout. In addition, the cutout unit 133 assigns the cut-out moving image to the display area. The setting of the cutting-out range and the assigning of the moving image to the display area are performed as described with reference to FIGS. 28, 30, 32, and 34 based on the results of the analyses performed by the image analyzing unit 131 and the data analyzing unit 132 and the information of a person included in the metadata of the clip that is the reproduction target.

In Step S66, the cutout unit 133 cuts out moving images from the wide-angle moving image of the clip in accordance with the set cut-out ranges.

In Step S67, the display control unit 116 displays the moving images cut out from the wide-angle moving image in the areas as described with reference to FIG. 27, 29, 31, or 33.

In Step S68, the reproduction unit 114 determines whether or not the reproduction has been completed. In a case where it is determined that the reproduction has not been completed, the process of Step S62 and subsequent steps is repeated. In the process that is repeatedly performed, in a case where a user's operation is performed, a case where a person is tracked, or the like, the setting of the cut-out ranges is performed again. On the other hand, in a case where it is determined that the reproduction has been completed in Step S68, the process ends.

According to the process described above, the user can efficiently view the moving image having a wide angle of view.

In the description present above, although the area layout is assumed to be selected by the user, the area layout may be configured to be automatically selected by the information processing apparatus 1 based on a result of the detection of a person, a result of the analysis of the wide-angle moving image, results of the analyses of the audio data and the sensor data, and the like.

In addition, while the setting of the cutting-out ranges and the assigning of the moving images to the display areas have been described to be performed when the clip is reproduced, for example, a clip used for displaying the moving image reproduction screen as illustrated in FIG. 27 may be configured to be generated in advance. When an instruction for the reproduction of a clip, which is generated in advance, used for the multi-screen display is made, the moving image reproduction screen as illustrated in FIG. 27 is displayed.

<Person Tracking Reproduction>

Next, person tracking reproduction will be described.

<Regarding Person Tracking Reproduction>

Figure 38:
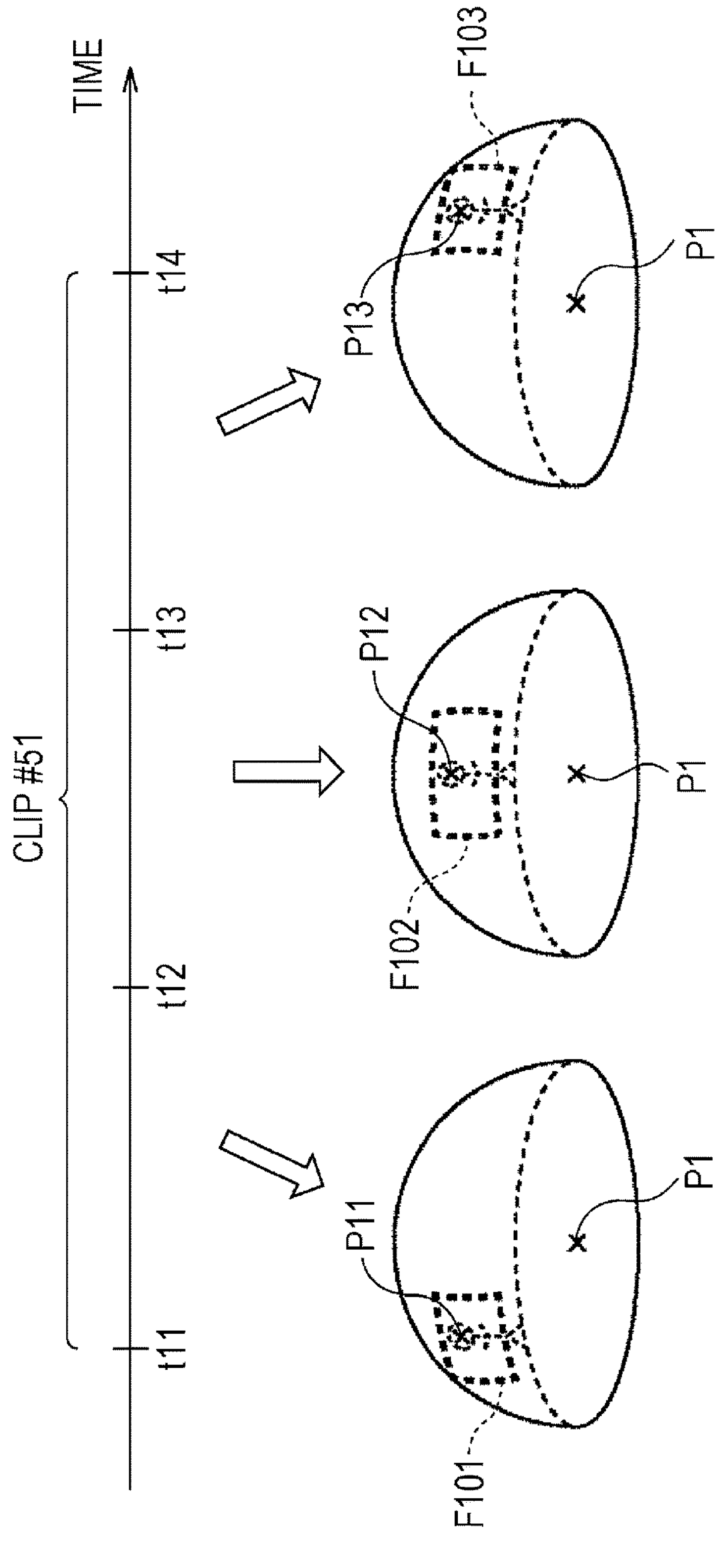
FIG. 38 is a diagram illustrating the concept of person tracking reproduction.

FIG. 38 is a diagram illustrating the concept of the person tracking reproduction.

The person tracking reproduction is a function for allowing the cutting-out range to track the motion of a specific person and continuously displaying a moving image in which the same person is shown up. The person tracking reproduction is realized by using the person ID and the person location information that are included in the metadata of the clip that is a reproduction target.

A clip #51 represented in FIG. 38 is a clip of which the reproduction time is time t11 to time t14. One person is shown up at a location P11 from time t11 to time t12 and is shown up at a location P12 from time t12 to time t13. In addition, the same person is shown up at location P13 from time t13 to time t14. Information that represents the location of the person at each time is included in the metadata.

In a case where an instruction for person tracking reproduction for a person shown up in a clip #51 as a target is made, a moving image of a range, which is represented by a frame F101, including the location P11 is cut out and is displayed from time t11 to time t12. In addition, a moving image of a range represented by a frame F102 including the location P12 is cut out and is displayed from time t12 to time t13. A moving image of a range represented by a frame F103 including the location P13 is cut out and is displayed from time t13 to time t14.

In this way, on the display 11, the same person shown up in the clip #51 is continuously displayed all the time. Thus, the user can view the clips with the selected person being focused on.

<First Example of Person Tracking Reproduction>

Figure 39:
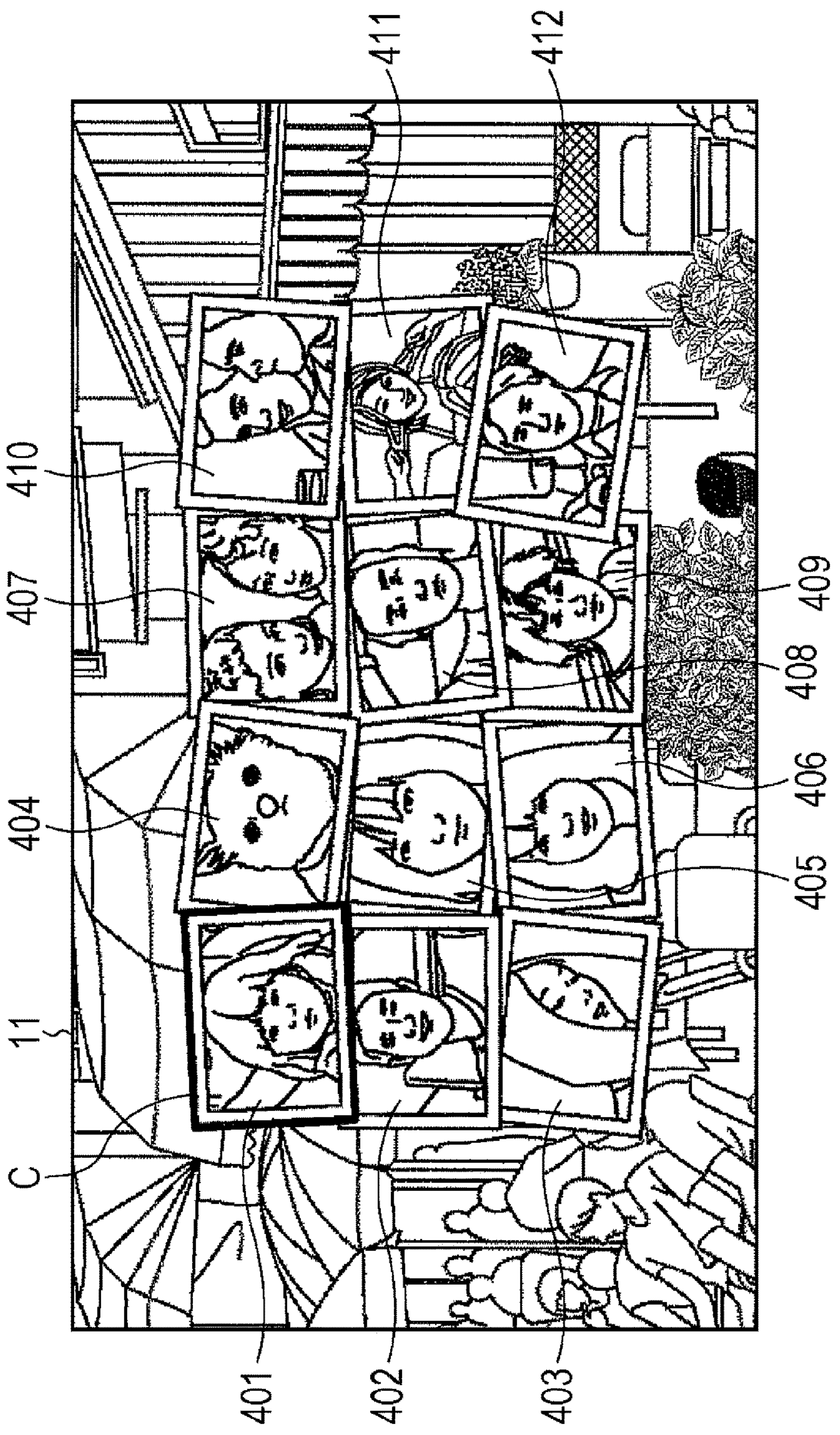
FIG. 39 is a diagram illustrating an example of the face image selection screen.

FIG. 39 is a diagram illustrating an example of a face image selection screen.

The face image selection screen is used for selecting a person who is the tracking target. On the face image selection screen illustrated in FIG. 39, face images 401 to 412 that are images of faces of persons are aligned in three rows and four columns to be displayed near the center of the screen. The face images 401 to 412 are displayed to partially overlap each other by randomly changing the angles. On the background of the face images 401 to 412, an image of the clip that is the reproduction target is displayed.

The face images 401 to 412 are the images of faces of all the persons shown up in the clip that is the reproduction target. The images of faces are cut out from the wide-angle moving image of the clip that is the reproduction target, for example, before the person tracking reproduction is started.

By tapping on the face image, the user can select a person that is a tracking target. In the example illustrated in FIG. 39, a state is formed in which the face image 401 is selected by the cursor C.

In this way, the selecting of a person that is the tracking target is performed by designating the face of the person.

Figure 40:
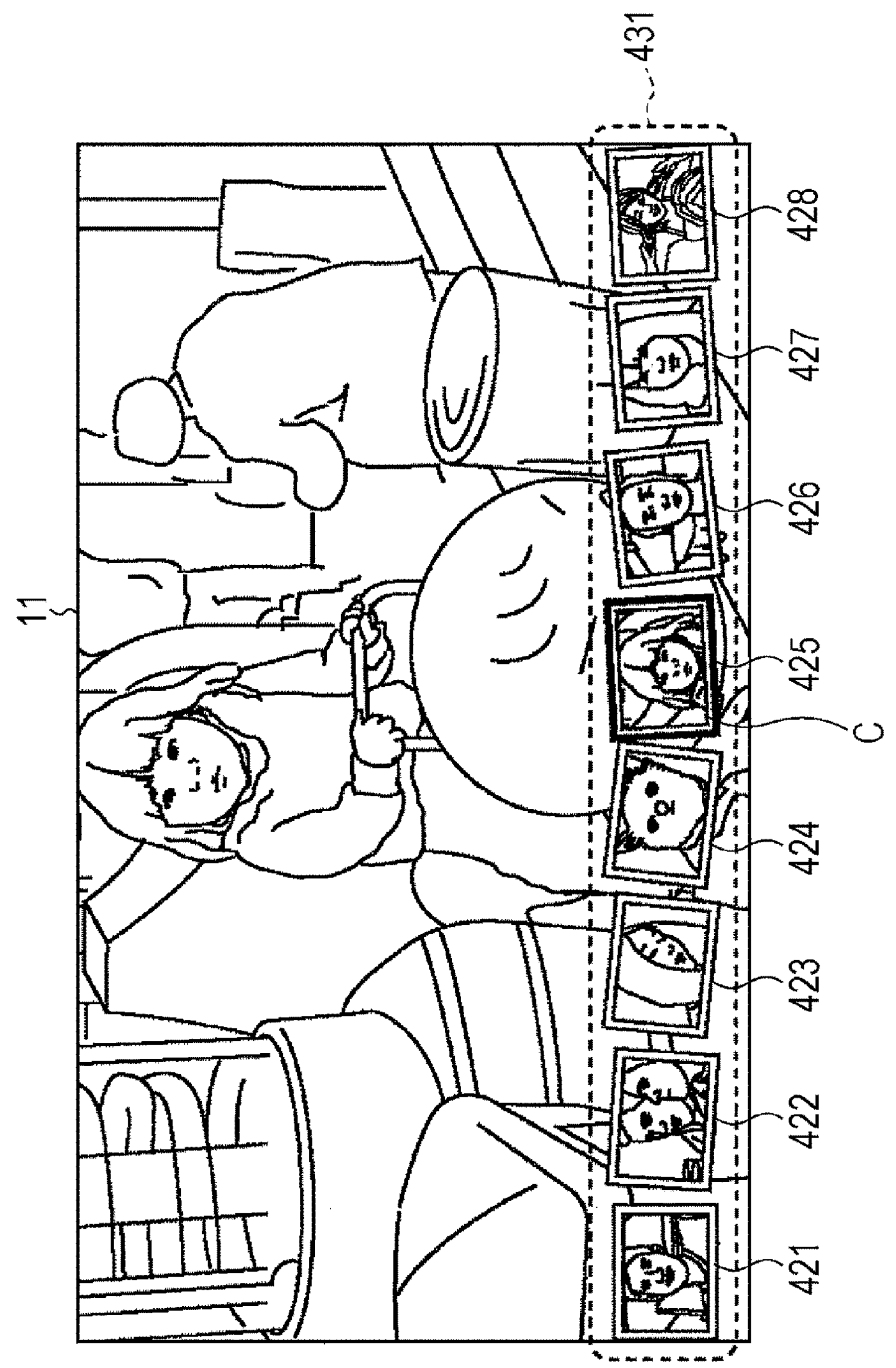
FIG. 40 is a diagram illustrating an example of a tracking reproduction screen.

FIG. 40 is a diagram illustrating an example of a tracking reproduction screen.

The tracking reproduction screen is displayed when a person that is a tracking target is selected. When the person is selected, reproduction is started from time when the selected person is shown up out of all the clips, and a moving image of a range including the person that is the tracking target is cut out from the wide-angle moving image. The cut-out moving image is displayed on the entire screen.

As illustrated in FIG. 40, on the lower side of the tracking reproduction screen, the face images 421 to 428 are aligned to be displayed with overlapping the moving image of the clip that is the reproduction target. In the example illustrated in FIG. 40, a face image display area 431 represented to be enclosed by broken lines is formed inside the entire screen that is the moving image display area of the clip that is the reproduction target.

The face images 421 to 428 are moving images of the current faces of all the persons shown up in the scene that is reproduced. The cursor C is applied to the face image 425, and the person having the face of the face image 425 to which the cursor C is applied is represented to be a tracking target.

By tapping on a face image that is aligned to be displayed under the tracking reproduction screen, the user can perform switching between persons to be a tracking target.

Figure 41:
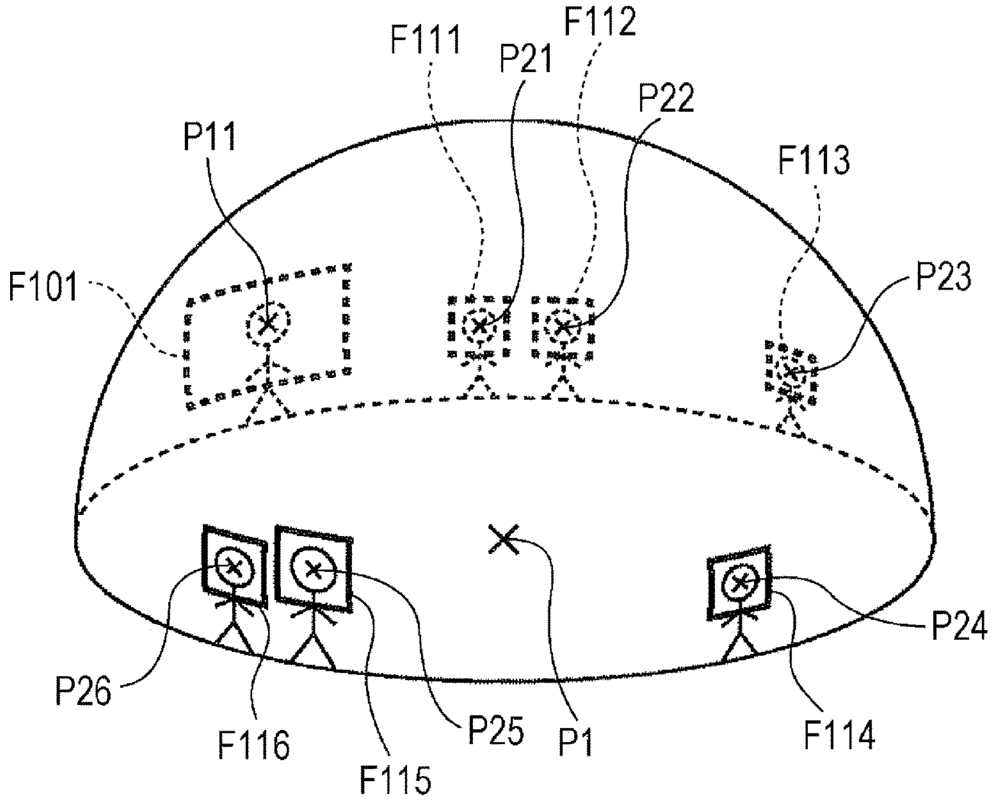
FIG. 41 is a diagram illustrating the cutting out of a face image.

FIG. 41 is a diagram illustrating cutting out a face image to be displayed on the tracking reproduction screen.

The person shown up at a location P11 positioned on the left back side is a person that is currently a tracking target. On the entire tracking reproduction screen, a moving image of a range including a tracking target person that is represented by a frame F101 is displayed.

In the example illustrated in FIG. 41, on the scene that is currently reproduced, six persons positioned at locations P21 to P26 are shown up in addition to the tracking target person (a person positioned at the location P11). Since the six persons other than the tracking target person are present outside the range represented by the frame F101, the six persons are excluded from having faces being displayed based on the face images and are persons who are not displayed on the tracking reproduction screen.

At this time, in addition to the moving image of a range including the person positioned at the location P11 that is the tracking target, moving images of ranges including the faces of six persons represented by the frames F111 to F116 are cut out from the wide-angle moving image. The cut-out moving images are aligned to be displayed as face images as illustrated in FIG. 40 together with the face image of the person that is the tracking target. The face image of the person that is the tracking target, for example, is displayed by limiting the display range of the moving image of the range represented by the frame F101.

For example, in a case where the face image of the person present at location P21 is selected on the tracking reproduction screen, a person that is a new tracking target is the person present at the location P21, and the cutting-out range of the moving image is switched to a range including the person present at the location P21.

On the entire tracking reproduction screen, the moving image on which the person present at the location P21 is shown up is displayed. In addition, on the tracking reproduction screen, the face images of the person present at the location P11 and the persons present at the locations P21 to P26 are aligned to be displayed on the lower side.

In this way, the user can easily select a person other than the person who is tracked and displayed as a new tracking target.

Figure 42:
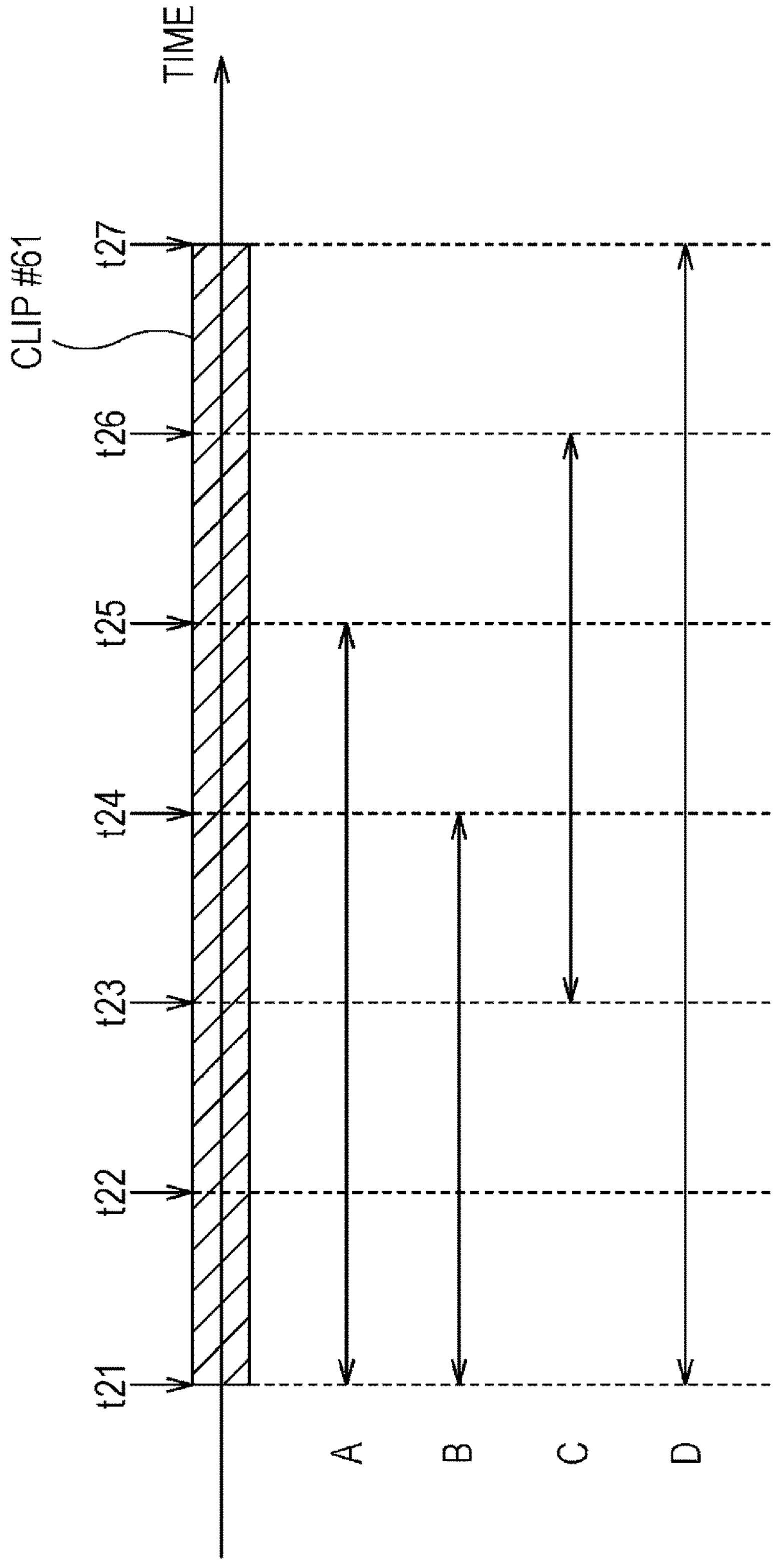
FIG. 42 is a diagram illustrating switching of the display of a face image.

FIG. 42 is a diagram illustrating switching between face images during the reproduction of a clip.

A clip #61 that is a reproduction target clip is a clip having the reproduction time of time t21 to time t27. In the clip #61, four persons A to D appear throughout the entire reproduction time (four persons are shown up).

An arrow represented in the direction of the time axis represents a time at which each person is shown up. The person A is shown up at a time frame of time t21 to time t25, and the person B is shown up at a time frame of time t21 to time t24. In addition, the person C is shown up at a time frame of time t23 to time t26, and the person D is shown up at a time frame of time t21 to time t27. Based on the person IDs included in the metadata, the time frame at which each person is shown up is specified.

Figure 43:
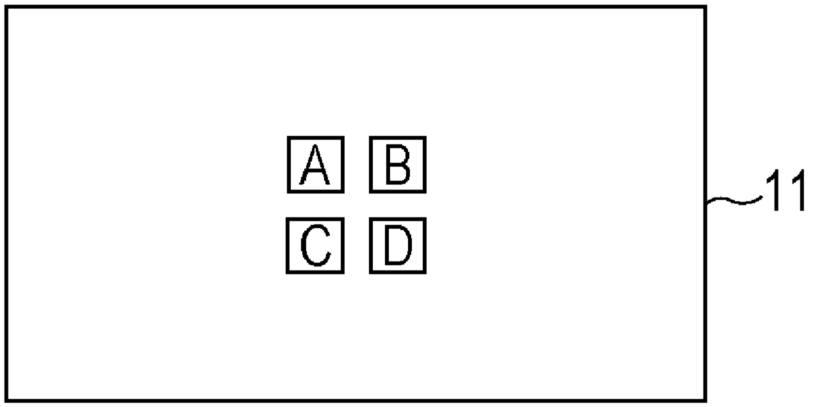
FIG. 43 is a diagram illustrating an example of the face image selection screen.

On the face image selection screen used for selecting a person that is the tracking target, as illustrated in FIG. 43, the face images of the persons A to D are displayed. For example, it is assumed that the face image of the person D is selected, and the person D is selected as the tracking target.

In a case where the person D is selected as the tracking target, the reproduction of the clip #61 is started. Since the person D is shown up from time t21, the reproduction of the clip #61 is started from leading time t21. In a case where the person C is selected as the tracking target, the reproduction of the clip #61 is started from time t23 at which the person C is shown up.

When the reproduction of the clip #61 is started, a moving image of a range including the person D selected as the tracking target is displayed on the tracking reproduction screen. Accordingly, the user can view only the range that includes the person D.

In addition, in the time frame of time t21 to time t23, not only the moving image of the range including the person D but also moving images of the ranges including the faces of the persons A and B shown up at the time frame are cut out. On the lower side of the tracking reproduction screen, as illustrated on the uppermost side illustrated in FIG. 44, the face images of the persons A and B are displayed together with the face image of the person D that is the tracking target. The user can switch the tracking target from the person D to the person A or B.

Figure 44:
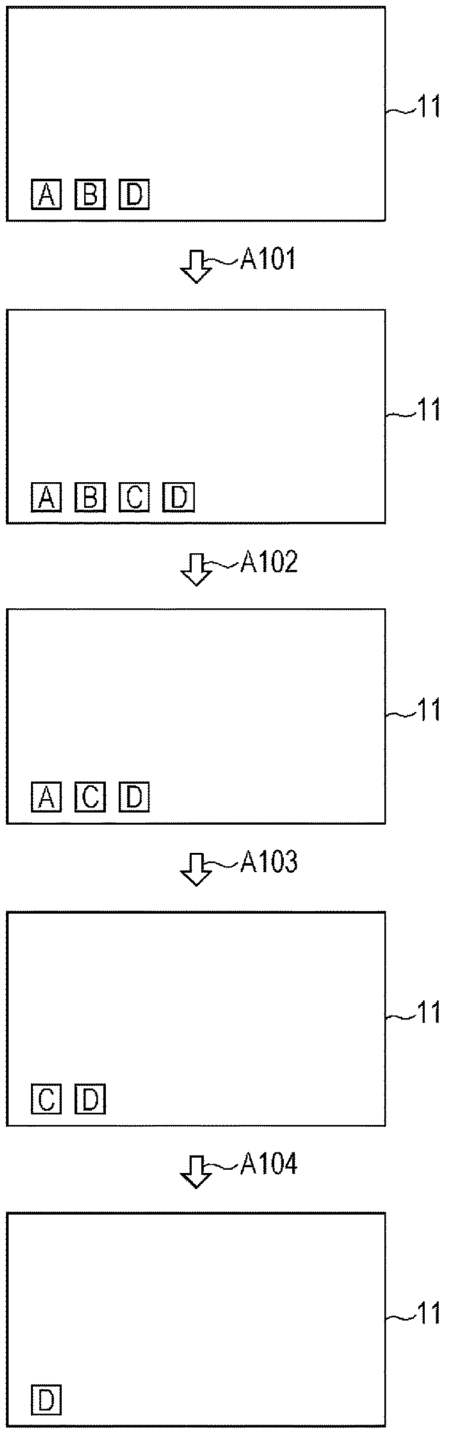
FIG. 44 is a diagram illustrating an example of the switching of the display of a face image on the tracking reproduction screen.

When the reproduction of the clip #61 tracking the person D advances, and it is time t23, the display of the tracking reproduction screen is in a state in which, as illustrated at the tip of the white arrow A101 illustrated in FIG. 44, in addition to the face images of the persons A, B, and D, the face image of the person C are displayed. The person C appears in the wide-angle moving image of the clip #61 from time t23. The display represented at the tip of the white arrow A101 is continued until time t24. The user can switch the tracking target from the person D to the person A, B, or C.

When the reproduction of the clip #61 tracking the person D advances, and it is time t24, the display of the tracking reproduction screen is in a state in which, as indicated by the tip of the white arrow A102 illustrated in FIG. 44, the face image of the person B disappears, and the face images of the persons A, C, and D are displayed. The person B disappears in the wide-angle moving image of the clip #61 from time t24. The display indicated by the tip of the white arrow A102 is continued until time t25. The user can switch the tracking target from the person D to the person A or C.

When the reproduction of the clip #61 tracking the person D advances, and it is time t25, the display of the tracking reproduction screen is in a state in which, as indicated by the tip of the white arrow A103 illustrated in FIG. 44, the face image of the person A disappears, and the face images of the persons C and D are displayed. The person A disappears in the wide-angle moving image of the clip #61 from time t25. The display represented at the tip of the white arrow A103 is continued until time t26. The user can switch the tracking target from the person D to the person C.

When the reproduction of the clip #61 tracking the person D advances, and it is time t26, the display of the tracking reproduction screen is in a state in which, as illustrated at the tip of the white arrow A104 illustrated in FIG. 44, the face image of the person C disappears, and only the face image of the person D is displayed. The person C disappears in the wide-angle moving image of the clip #61 from time t26. The display indicated by the tip of the white arrow A104 is continued until time t27.

When a predetermined operation is performed during the reproduction of the clip #61 tracking the person D, the reproduction of the clip #61 is temporarily stopped, and the face image selection screen illustrated in FIG. 43 is displayed instead of the tracking reproduction screen on the display 11. The user can also select a person that is a new tracking target from the face image selection screen.

In this way, the user can select a person that is the tracking target from the face images of the persons. In addition, a moving image on which a specific person is shown up is continuously displayed, and accordingly, the user can efficiently view a moving image having a wide angle of view.

<Person Tracking Reproduction Process>

Here, a face image generating process of the information processing apparatus 1 will be described with reference to a flowchart illustrated in FIG. 45. The process illustrated in FIG. 45 is performed, for example, before the start of the person tracking reproduction.

Figure 45:
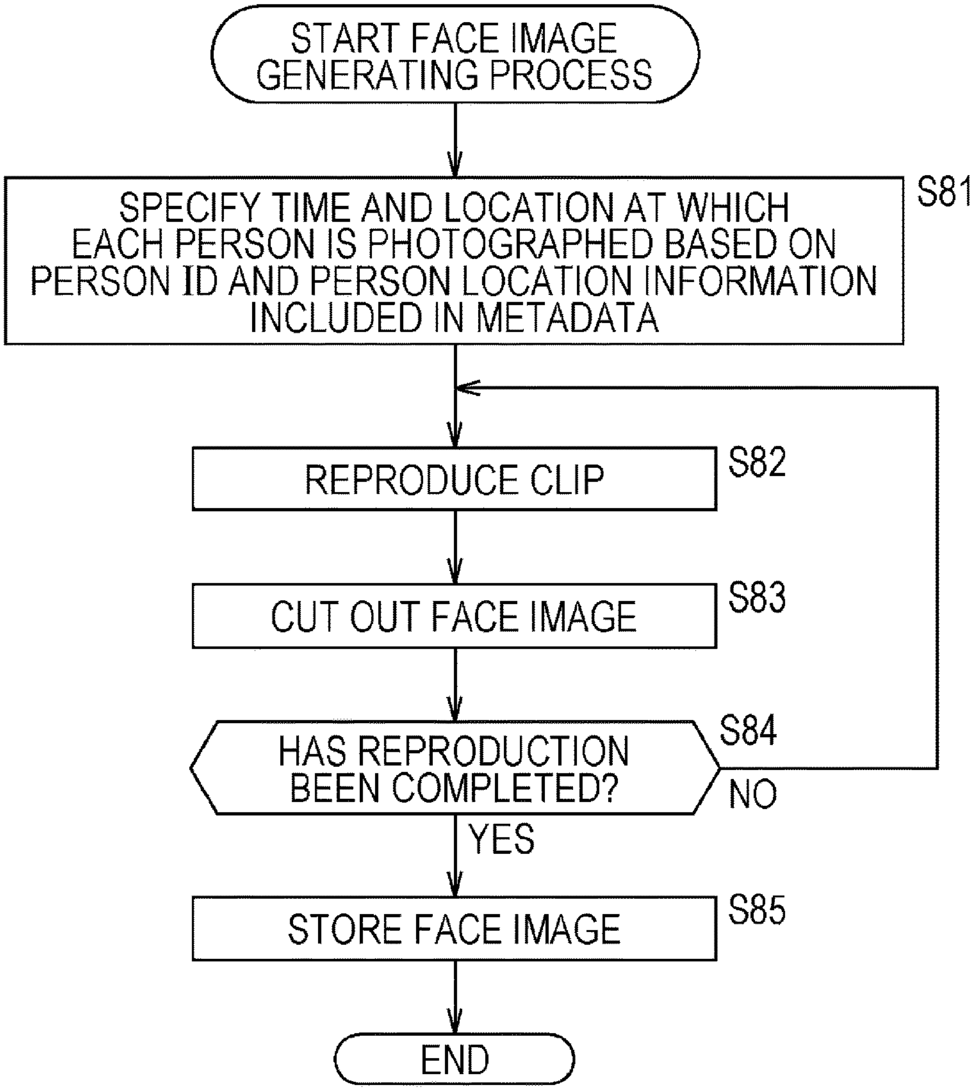
FIG. 45 is a flowchart illustrating a face image generating process.

For example, face images generated by the process illustrated in FIG. 45 are used for the display of the face image selection screen. The face images generated by the process illustrated in FIG. 45 may be used for the display of the screen during the person tracking reproduction.

In Step S81, the data analyzing unit 132 reads the metadata of the clip for which the person tracking reproduction is performed from the clip data storing unit 113. The data analyzing unit 132 specifies the time when each person is shown up and the position in the wide-angle moving image based on the person ID and the person location information included in the read metadata. The data analyzing unit 132 outputs information of the time and the location that have been specified to the cutout unit 133.

In Step S82, the reproduction unit 114 reproduces the clip and outputs the data of the wide-angle moving image to the information processing unit 115.

In Step S83, when the wide-angle moving image at the time specified by the data analyzing unit 132 at which a person is shown up is supplied from the reproduction unit 114, the cutout unit 133 cuts out the face image of the person shown up at a position specified by the data analyzing unit 132 among the wide-angle moving image as a face image. The face image may be either a still image or a moving image.

In Step S84, the reproduction unit 114 determines whether or not the reproduction has been completed. In a case where it is determined that the reproduction has not been completed, the process of Step S82 and subsequent steps is repeated. Through the process that is repeatedly performed, the face images of all the persons shown up in the clip are sequentially cut out from the wide-angle moving image.

On the other hand, in a case where it is determined that the reproduction has been completed in Step S84, in Step S85, the data analyzing unit 132 stores the face images of all the persons cut out from the wide-angle moving image in the clip data storing unit 113 as metadata. Thereafter, the process ends.

Figure 46:
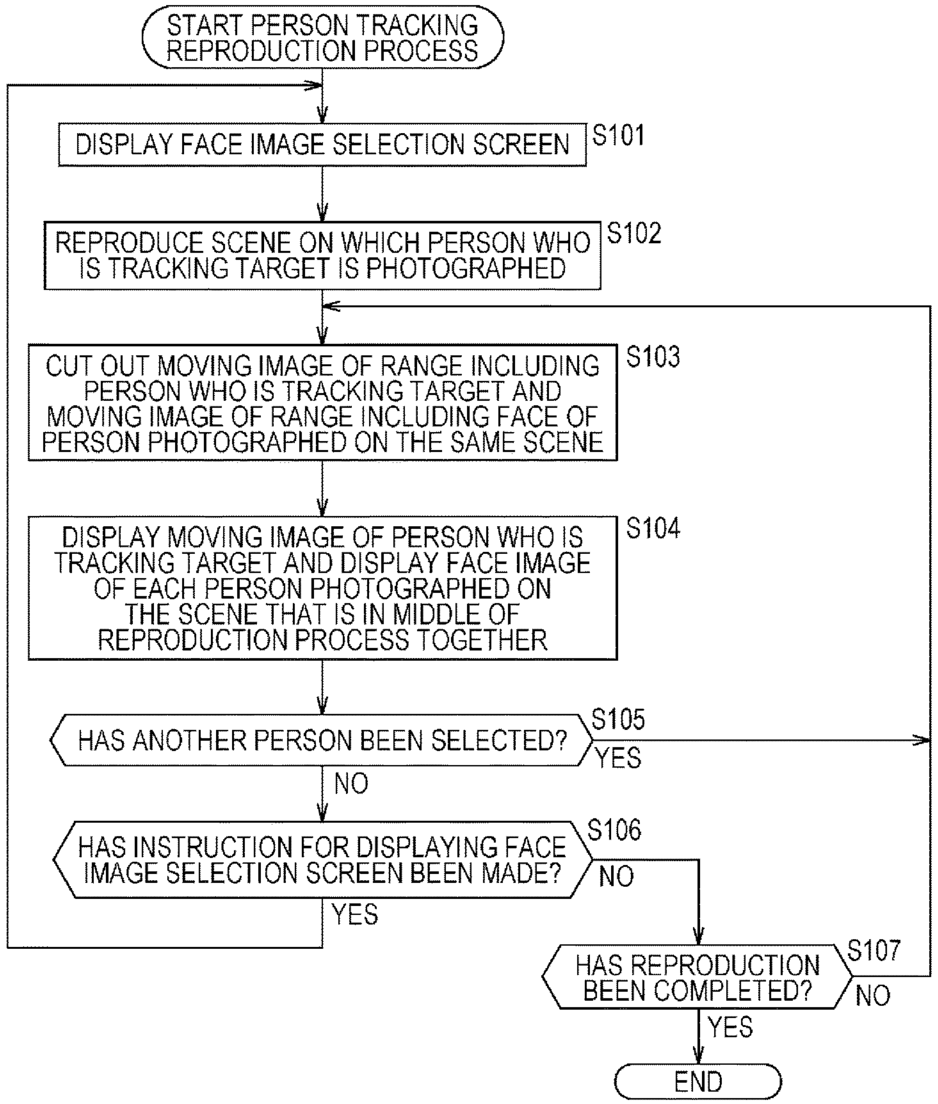
FIG. 46 is a flowchart illustrating a person tracking reproduction process.

Next, a person tracking reproduction process of the information processing apparatus 1 will be described with reference to a flowchart illustrated in FIG. 46. The process illustrated in FIG. 46 is started when a clip that is a target for the person tracking reproduction is selected, for example, from the clip selection screen illustrated in FIG. 5.

In Step S101, the display control unit 116 reads the metadata of the clip that is the target for the person tracking reproduction from the clip data storing unit 113 and displays the face image selection screen using the face images included in the metadata. On the display 11, the face image selection screen as described with reference to FIG. 39 is displayed.

When the person that is the tracking target is selected, in Step S102, the reproduction unit 114 reads information of the reproduction time at which each person is shown up, which is included in the metadata, from the clip data storing unit 113 and starts the reproduction of a scene on which the person that is the tracking target is shown up. The data of the wide-angle moving image of the scene on which the person that is the tracking target is shown up is supplied to the cutout unit 133.

In Step S103, the cutout unit 133 cuts out moving images of the ranges including faces of persons that are shown up on the same scene as that of the moving image of the range in which the person that is the tracking target is shown up from the wide-angle moving image. The location of each person shown up on the scene during the reproduction process is specified by the data analyzing unit 132 based on the person location information that is included in the metadata.

In Step S104, the display control unit 116 displays the moving images of the ranges in which the person that is the tracking target is shown up on the entire tracking reproduction screen and aligns the moving images of the faces of the persons that are shown on the scene during the reproduction process to be displayed as face images.

In Step S105, the display control unit 116 determines whether or not another person is selected as the tracking target by using the face images that are aligned under the tracking reproduction screen to be displayed.

In a case where it is determined in Step S105 that another person has not been selected as the tracking target, in Step S106, the display control unit 116 determines whether or not an instruction for displaying the face image selection screen is made.

In a case where it is determined that the instruction for displaying the face image selection screen is made in Step S106, the display control unit 116 returns the process to Step S101 and displays the face image selection screen again and repeats the above-described process.

On the other hand, in a case where it is determined that the instruction for displaying the face image selection screen is not made in Step S106, the display control unit 116 determines whether or not the reproduction has been completed in Step S107. In a case where it is determined that the reproduction has not been completed in Step S107, the process of Step S103 and subsequent steps is repeated.

Also, in a case where it is determined that another person is selected as the tracking target in Step S105, similarly, the person that is the tracking target is changed, and the process of Step S103 and subsequent steps is repeated. On the other hand, in a case where it is determined that the reproduction has been completed in Step S107, the process ends.

<Second Example of Person Tracking Reproduction>

Figure 47:
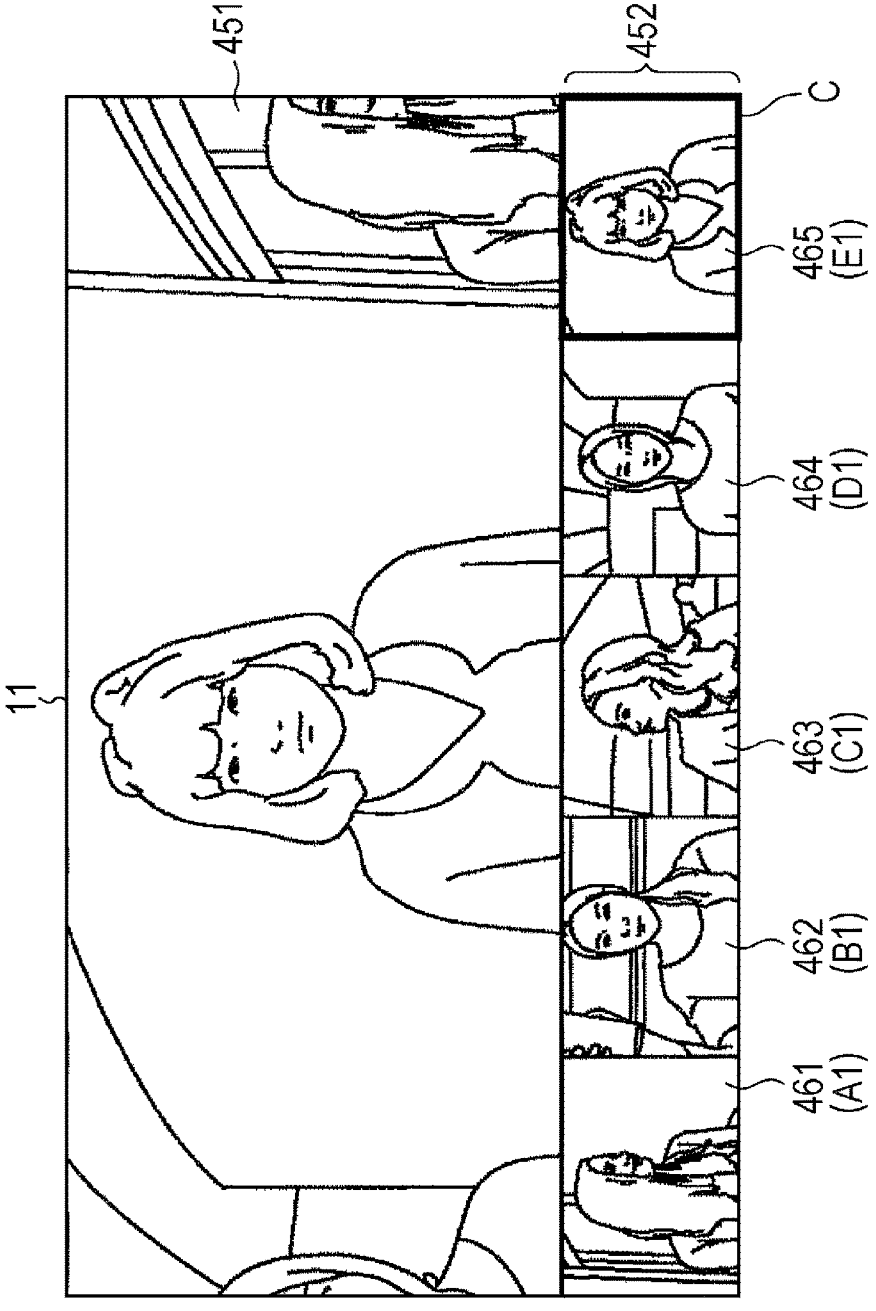
FIG. 47 is a diagram illustrating another example of the tracking reproduction screen.

FIG. 47 is a diagram illustrating another example of the tracking reproduction screen.

In the tracking reproduction screen illustrated in FIG. 47, the entire display 11 is vertically divided into two parts, and areas 451 and 452 are formed. The area 451 is formed on the upper side of the display 11 so as to occupy about ¾ range of the entire display 11. The area 452 is formed on the lower side of the area 451.

In the area 451, a wide range of the moving image cut from the clip that is during the reproduction process is displayed with a specific person being located at the center. By performing a drag operation on the area 451, the user can change the display range.

In the area 452, face images 461 to 465 including faces of five persons are sequentially displayed from the left side. In the example illustrated in FIG. 41, the area 452 that is the face image display area is formed to be adjacent to the area 451 that is the moving image display area of the clip that is the reproduction target. The five persons of whom the face images are displayed are persons shown up on the scene during the reproduction process.

Here, the five persons of which the faces are shown up in the face images 461 to 465 are represented as persons A1 to E1 as is appropriate. It is represented that the cursor C is applied to the face image 465, and the person E1 is set as the tracking target. The person displayed at the center of the area 451 is the person E1.

By tapping on the face image that is aligned to be displayed in the area 451, the user can change the person that is the tracking target.

Figure 48:
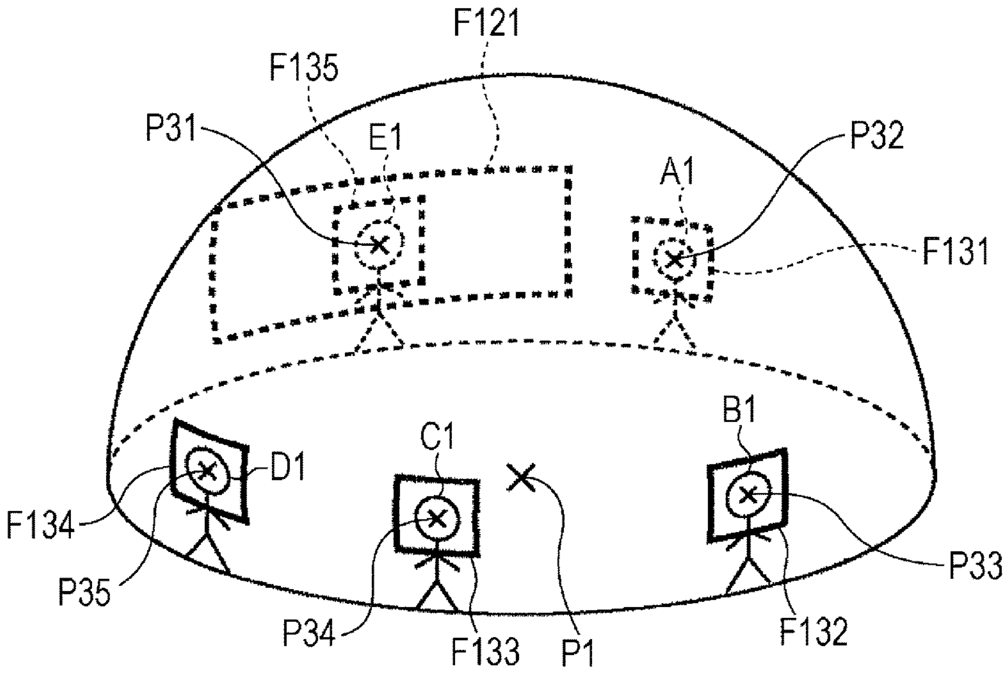
FIG. 48 is a diagram illustrating the cutting out of a face image.

FIG. 48 is a diagram illustrating the cutting out of face images.

A person that is shown up at a location P31 is the person E1 that is currently the tracking target. In the area 451, a moving image of a range including the person E1 that is represented by a frame F121 is displayed.

In the example illustrated in FIG. 48, on the scene that is currently reproduced, in the clockwise direction from the location of the person E1 set as the reference, the persons A1, B1, C1, and D1 are shown up. The locations of the persons A1 to D1 are respectively the locations P32 to P35.

At this time, also the moving images of the ranges including the persons A1 to D1 that are represented by the frames F131 to F134 are cut out from a wide-angle moving image. The cut-out moving images are aligned in the area 452 and are displayed as face images 461 to 464. The face image 465 of the person E1 that is disposed neighbor to the right of the face image 464, for example, is displayed by limiting the display range of the moving image of the range represented by the frame F121 to the range represented by the frame F135.

In this way, in the area 452, the face images of the persons shown up on the scene that is during the reproduction process are displayed in the order of the actual alignment of the persons. The user can check the positional relation of each person among the wide-angle moving image of the clip that is during the reproduction process based on the order of the alignment of the face images displayed in the area 452.

Figure 49:
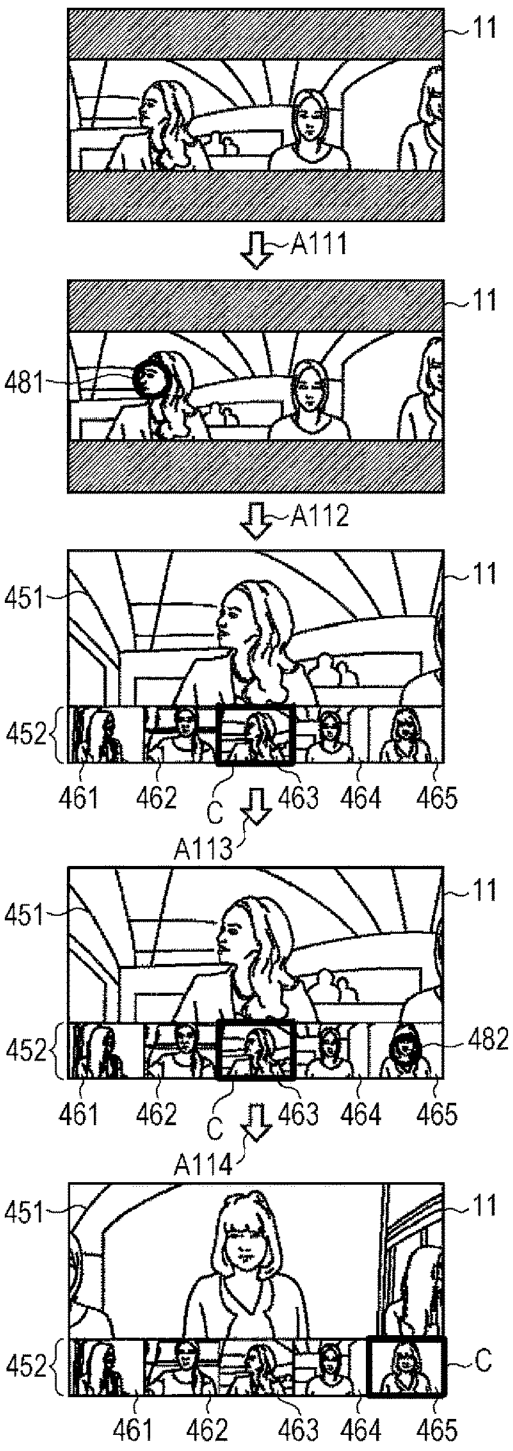
FIG. 49 is a diagram illustrating an example of the switching of the tracking reproduction screen.

FIG. 49 is a diagram illustrating an example of the switching of the display of the tracking reproduction screen.

When a clip that is the reproduction target is selected, as illustrated on the uppermost side of FIG. 49, the entire photographing range of the wide-angle moving image is panned in the horizontal direction, and a moving image cut out from the wide-angle moving image is displayed. As the image, the frame F121 illustrated in FIG. 48 is moved on the sphere in the horizontal direction, and the moving image disposed inside the frame F121 is cut out to be displayed. On the upper and lower sides of the tracking reproduction screen, black band-shaped areas are formed.

When the user taps on, for example, the person C1 shown up in the moving image displayed on the tracking reproduction screen, as indicated by the tip of a white arrow A111, an icon 481 representing that a person that is the tracking target has been selected is displayed to overlap the person C1. On the tracking reproduction screen indicated by the tip of the white arrow A111, a person on whom a circular icon 481 is displayed is the person C1. The tapping on the person C1 is specified based on the person location information.

In a case where the person C1 is selected as the tracking target, as indicated by the tip of a white arrow A112, the tracking reproduction screen described with reference to FIG. 47 is displayed. In the area 451, a moving image of the range including the person C1 is displayed. In addition, in order to represent that the person C1 is selected as the tracking target, the cursor C is applied to the face image 463 that is the face image of the person C1.

The user can view the clip with focusing on the person C1 from the display of the area 451 and can check the faces of the other persons at each timing from the display of the area 452.

In a case where the face image 465 that is the face image of the person E1 displayed at the right end of the area 452 is selected, as indicated by the tip of a white arrow A113, an icon 482 is displayed to overlap the face image 465 (person E1).

At this time, by panning from the range in which the person C1 is shown up to the range in which the person E1 is shown up, the display of the area 451 is changed. When the cutting-out range of the moving image is moved up to the range including the person E1, as indicated by the tip of a white arrow A114, a moving image of the range including the person E1 is displayed in the area 451. In addition, in order to represent that the person E1 is selected as the tracking target, the cursor C is applied to the face image 465 that is the face image of the person E1.

In this way, the face images used for the switching of the tracking target may be displayed by being aligned in the order of the alignment of actual persons.

The display of the face image in the area 452, as described with reference to FIG. 44, is also switched in accordance with the showing-up or no showing-up thereof in the wide-angle moving image.

Modified Example

While the above-described screen display has been described to be performed by the information processing apparatus 1 based on the wide-angle moving image that is photographed by the digital camera 2, it may be configured such that the photographing function of a wide-angle moving image is built in the information processing apparatus 1, and various screen displays are performed based on the wide-angle moving image photographed by the information processing apparatus 1.

Example Applied to Network System

The above-described screen display may be configured to be performed on a browser built in the information processing apparatus 1 based on data transmitted from a server through the Internet.

Figure 50:
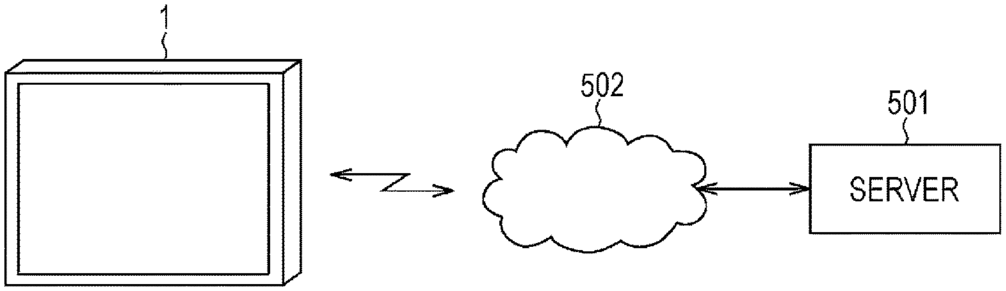
FIG. 50 is a diagram illustrating an example of the configuration of a network system.

FIG. 50 is a diagram illustrating an example of the configuration of a network system.

The network system illustrated in FIG. 50 is configured by interconnecting the information processing apparatus 1 and a server 501 through a network 502 that is formed by the Internet or the like.

The server 501 manages data of a clip that is uploaded from the information processing apparatus 1 or the like. The server 501 performs the time shift reproduction process, the multi-screen display process, the person tracking reproduction process, and the like described above in accordance with a user's operation that is represented by information transmitted from the information processing apparatus 1 and transmits data of the display screen to the information processing apparatus 1.

The server 501 has the same configuration as that of the information processing apparatus 1 illustrated in FIG. 9. By executing a predetermined program in the server 501, each functional unit illustrated in FIG. 10 is realized.

In this case, the image data acquiring unit 111 that is realized in the server 501 acquires data of the wide-angle moving image transmitted from the information processing apparatus 1. In addition, the display control unit 116 displays each screen on the display 11 of the information processing apparatus 1 by transmitting the data of each screen to the information processing apparatus 1. The other functional units illustrated in FIG. 10 basically perform the same processes as described above.

The information processing apparatus 1 displays the time shift reproduction screen illustrated in FIG. 19, the multi-screen display screen illustrated in FIG. 27, the person tracking reproduction screen illustrated in FIG. 38, and the like on the display 11 based on the data transmitted from the server 501.

Accordingly, the user can efficiently view a moving image having a wide angle of view on the browser of the information processing apparatus 1.

<Programs and the Like>

The series of the processes described above may be performed by either the hardware or the software. In a case where the series of the processes are performed by the software, a program configuring the software is installed to a computer built in dedicated hardware, a general-purpose personal computer, or the like from a program recording medium.

The program to be installed is provided with being recorded in a removable medium such as a memory card 101 illustrated in FIG. 9. In addition, the program may be provided through a wired or wireless transmission medium such as a local area network, the Internet, or digital broadcasting.

The programs to be executed by the computer may be programs for performing operations in chronological order in accordance with the sequence described in this specification, or may be programs for performing operations in parallel or performing an operation when necessary, such as when there is a call.

In addition, in the description presented here, a system represents a set of a plurality of constituent elements (an apparatus, a module (component), and the like), and it is not necessary to include all the constituent elements in the same casing. Thus, a plurality of apparatuses that are housed in separate casings and are connected through a network or one apparatus in which a plurality of modules are housed in one casing is a system.

It should be noted that embodiments of the present technique are not limited to the above described embodiments, and various modifications may be made to them without departing from the scope of the present technique.

For example, each step described in the above-described flowcharts may be performed by one apparatus or may be performed by a plurality of apparatuses in a divisional manner.

In addition, in a case where a plurality of processes are included in one step, the plurality of processes included in the one step may be performed by one apparatus or may be performed by a plurality of apparatuses in a divisional manner.

<Example of Combination of Configuration>

The present technology may employ the following configurations.

(1) A display control unit that simultaneously displays a plurality of cut-out images cut out from respective ranges of a wide-angle moving image.

(2) The display control unit according to (1), wherein the ranges are determined based on sensor data detected at the time the wide-angle moving image was captured.

(3) The display control unit according to (1) or (2), wherein the ranges include a plurality of ranges corresponding to a traveling direction of an image capture apparatus that captured the wide-angle moving image.

(4) The display control unit according to any of (1) to (3), wherein the ranges further include at least one range corresponding to a direction opposite the traveling direction.

(5) The display control unit according to any of (1) to (4), wherein the ranges include at least one range corresponding to a direction of a sound source.

(6) The display control unit according to any of (1) to (5), wherein the ranges further include at least one range corresponding to a direction opposite the direction of the sound source.

(7) The display control unit according to any of (1) to (6), wherein at least two of the ranges overlap.

(8) The display control unit according to any of (1) to (7), wherein at least one of the ranges corresponds to a portion of the wide-angle moving image including an image of a person at the time the wide-angle moving image was captured.

(9) The display control unit according to any of (1) to (8), wherein at least one of the ranges corresponds to a portion of the wide-angle moving image including an image of a subject having a large motion at the time the wide-angle moving image was captured.

(10) An image processing apparatus including a processor for controlling simultaneous display of a plurality of cut-out images cut out from respective ranges of a wide-angle moving image.

(11) The image processing apparatus according to (10), wherein the ranges are determined based on sensor data detected at the time the wide-angle moving image was captured.

(12) The image processing apparatus according to (10) or (11), wherein the ranges include a plurality of ranges corresponding to a traveling direction of an image capture apparatus that captured the wide-angle moving image.

(13) The image processing apparatus according to any of (10) to (12), further including a display for simultaneously displaying the plurality of cut-out images.

(14) The image processing apparatus according to any of (10) to (13), further including a communication unit for communicating with an imaging apparatus.

(15) An imaging apparatus including a processor for controlling simultaneous display of a plurality of cut-out images cut out from respective ranges of a wide-angle moving image.

(16) The imaging apparatus according to (15), wherein the ranges are determined based on sensor data detected at the time the wide-angle moving image was captured.

(17) The imaging apparatus according to (15) or (16), further including a photographing unit to capture the wide-angle moving image, and wherein the ranges include a plurality of ranges corresponding to a traveling direction of the imaging apparatus at the time the wide-angle moving image was captured by the photographing unit.

(18) The imaging apparatus according to any of (15) to (17), further including a display for simultaneously displaying the plurality of cut-out images.

(19) An image processing method including simultaneously displaying a plurality of cut-out images cut out from respective ranges of a wide-angle moving image.

(20) A non-transitory computer-readable medium having stored thereon a computer-readable program for implementing an image processing method, the method including simultaneously displaying a plurality of cut-out images cut out from respective ranges of a wide-angle moving image.

(21) A display control apparatus including a display control unit that assigns images of a plurality of partial ranges that are ranges different from each other within a photographing range of a moving image to display areas configuring a display screen based on sensor data detected at the time of photographing the moving image and displays the images of the plurality of partial ranges in the display areas.

(22) The display control apparatus according to (21) described above, wherein the display control unit assigns the images of the plurality of the partial ranges to the display areas having at least mutually different shapes or sizes and displays the images of the plurality of the partial ranges in the display areas.

(23) The display control apparatus according to (21) or (22) described above, further including an analysis unit that analyzes the sensor data.

(24) The display control apparatus according to (23) described above, wherein the analysis unit specifies a traveling direction at the time of photographing the moving image by analyzing the sensor data, and the display control unit displays the images of the partial ranges in the traveling direction in the display areas larger than the display areas of the images of the partial ranges in a direction different from the traveling direction.

(25) The display control apparatus according to (23) or (24) described above, wherein the analysis unit specifies a moving speed at the time of photographing the moving image by analyzing the sensor data, and the display control unit changes a configuration of the display areas in accordance with the moving speed.

(26) The display control apparatus according to any one of (23) to (25) described above, wherein the analysis unit specifies a motion of a subject shown up in the moving image by analyzing the moving image, and the display control unit assigns the images of the partial ranges in which the subject is photographed to the display areas based on a result of the analysis of the sensor data and the magnitude of the motion of the subject and displays the images of the partial ranges in the display areas.

(27) The display control apparatus according to (26) described above, wherein the display control unit displays the images of the partial ranges in which the subject having a large motion is photographed in the display areas larger than the display areas of the images of the partial ranges in which the subject having a small motion is photographed.

(28) The display control apparatus according to any one of (23) to (27) described above, wherein the analysis unit specifies a distance from a photographing location of the moving image to a subject shown up in the moving image by analyzing the moving image, and the display control unit assigns the images of the partial ranges in which the subject is photographed to the display areas based on a result of the analysis of the sensor data and the distance to the subject and displays the images of the partial ranges in the display areas.

(29) The display control apparatus according to (28) described above, wherein the display control unit displays the images of the partial ranges in which the subject to which the distance is long is photographed in the display areas that are larger than the display areas of the images of the partial ranges in which the subject to which the distance is short is photographed.

(30) The display control apparatus according to any one of (21) to (29) described above, wherein the display control unit displays information relating to the moving image in the display area together with the images of the partial ranges.

(31) The display control apparatus according to any one of (21) to (30) described above, wherein the images of the partial ranges are moving images.

(32) The display control apparatus according to any one of (21) to (31) described above, wherein an angle of view of the moving image in at least one of the horizontal direction and the vertical direction is 360 degrees.

(33) A display control method including assigning images of a plurality of partial ranges that are ranges different from each other within a photographing range of a moving image to display areas configuring a display screen based on sensor data detected at the time of photographing the moving image and displaying the images of the plurality of partial ranges in the display areas.

(34) A program that causes a computer to perform a process including assigning images of a plurality of partial ranges that are ranges different from each other within a photographing range of a moving image to display areas configuring a display screen based on sensor data detected at the time of photographing the moving image and displaying the images of the plurality of partial ranges in the display areas.

REFERENCE SIGNS LIST

1 Information processing apparatus
2 Digital camera
111 Image data acquiring unit
112 Clip generating unit
113 Clip data storing unit
114 Reproduction unit
115 Information processing unit
116 Display control unit
131 Image analyzing unit
131A Person detecting unit
132 Data analyzing unit
133 Cutout unit

The invention claimed is:

1. A display control unit comprising:

an interface for receiving image data; and a processor configured to simultaneously display a plurality of cut-out images cut out from respective ranges of a wide-angle moving image, wherein the simultaneous display is automatically performed in response to selection of a thumbnail image representing the wide-angle moving image, the thumbnail image being a still image and having been generated according to at least one portion of the wide-angle moving image that was cut-out from a frame of the wide-angle moving image, wherein the at least one portion of the wide-angle moving image cut out from the frame is determined according to a result of an automatic person detection operation, and wherein display of the plurality of cut-out images comprises display of at least one of the plurality of cut-out images so as to track a person based on a person ID and person location information generated according to the automatic person detection operation.

2. The display control unit as recited in claim 1, wherein the ranges are determined based on sensor data detected at the time the wide-angle moving image was captured.

3. The display control unit as recited in claim 2, wherein the ranges comprise a plurality of ranges corresponding to a traveling direction of an image capture apparatus that captured the wide-angle moving image.

4. The display control unit as recited in claim 3, wherein the ranges further comprise at least one range corresponding to a direction opposite the traveling direction.

5. The display control unit as recited in claim 2, wherein the ranges comprise at least one range corresponding to a direction of a sound source.

6. The display control unit as recited in claim 5, wherein the ranges further comprise at least one range corresponding to a direction opposite the direction of the sound source.

7. The display control unit as recited in claim 2, wherein at least two of the ranges overlap.

8. The display control unit as recited in claim 7, wherein at least one of the ranges corresponds to a portion of the wide-angle moving image including an image of a person at the time the wide-angle moving image was captured.

9. The display control unit as recited in claim 2, wherein at least one of the ranges corresponds to a portion of the wide-angle moving image including an image of a subject having a large motion at the time the wide-angle moving image was captured.

10. An image processing apparatus comprising:

an interface for receiving image data; and a processor for controlling simultaneous display of a plurality of cut-out images cut out from respective ranges of a wide-angle moving image, wherein the simultaneous display is automatically performed in response to selection of a thumbnail image representing the wide-angle moving image, the thumbnail image being a still image and having been generated according to at least one portion of the wide-angle moving image that was cut-out from a frame of the wide-angle moving image, wherein the at least one portion of the wide-angle moving image cut out from the frame is determined according to a result of an automatic person detection operation, and wherein display of the plurality of cut-out images comprises display of at least one of the plurality of cut-out images so as to track a person based on a person ID and person location information generated according to the automatic person detection operation.

11. The image processing apparatus as recited in claim 10, wherein the ranges are determined based on sensor data detected at the time the wide-angle moving image was captured.

12. The image processing apparatus as recited in claim 11, wherein the ranges comprise a plurality of ranges corresponding to a traveling direction of an image capture apparatus that captured the wide-angle moving image.

13. The image processing apparatus as recited in claim 10, further comprising a display for simultaneously displaying the plurality of cut-out images.

14. The image processing apparatus as recited in claim 10, further comprising a communication unit for communicating with an imaging apparatus.

15. An imaging apparatus comprising:

a memory for storing image data; and a processor for controlling simultaneous display of a plurality of cut-out images cut out from respective ranges of a wide-angle moving image, wherein the simultaneous display is automatically performed in response to selection of a thumbnail image representing the wide-angle moving image, the thumbnail image being a still image and having been generated according to at least one portion of the wide-angle moving image that was cut-out from a frame of the wide-angle moving image, wherein the at least one portion of the wide-angle moving image cut out from the frame is determined according to a result of an automatic person detection operation, and wherein display of the plurality of cut-out images comprises display of at least one of the plurality of cut-out images so as to track a person based on a person ID and person location information generated according to the automatic person detection operation.

16. The imaging apparatus as recited in claim 15, wherein the ranges are determined based on sensor data detected at the time the wide-angle moving image was captured.

17. The imaging apparatus as recited in claim 16, further comprising a photographing unit to capture the wide-angle moving image, and wherein the ranges comprise a plurality of ranges corresponding to a traveling direction of the imaging apparatus at the time the wide-angle moving image was captured by the photographing unit.

18. The imaging apparatus as recited in claim 15, further comprising a display for simultaneously displaying the plurality of cut-out images.

19. An image processing method comprising simultaneously displaying a plurality of cut-out images cut out from respective ranges of a wide-angle moving image, wherein the simultaneously displaying is automatically performed in response to selection of a thumbnail image representing the wide-angle moving image, the thumbnail image being a still image and having been generated according to at least one portion of the wide-angle moving image that was cut-out from a frame of the wide-angle moving image, wherein the at least one portion of the wide-angle moving image cut out from the frame is determined according to a result of an automatic person detection operation, and wherein simultaneously displaying the plurality of cut-out images comprises displaying at least one of the plurality of cut-out images so as to track a person based on a person ID and person location information generated according to the automatic person detection operation.

20. A non-transitory computer-readable medium having stored thereon a computer-readable program for implementing an image processing method, the method comprising simultaneously displaying a plurality of cut-out images cut out from respective ranges of a wide-angle moving image, wherein the simultaneously displaying is automatically performed in response to selection of a thumbnail image representing the wide-angle moving image, the thumbnail image being a still image and having been generated according to at least one portion of the wide-angle moving image that was cut-out from a frame of the wide-angle moving image, wherein the at least one portion of the wide-angle moving image cut out from the frame is determined according to a result of an automatic person detection operation, and wherein simultaneously displaying the plurality of cut-out images comprises displaying at least one of the plurality of cut-out images so as to track a person based on a person ID and person location information generated according to the automatic person detection operation.

* * * * *